US008685325B2

(12) United States Patent
Wang et al.

(10) Patent No.: US 8,685,325 B2
(45) Date of Patent: Apr. 1, 2014

(54) FIELD-PROGRAMMABLE LAB-ON-A-CHIP BASED ON MICROELECTRODE ARRAY ARCHITECTURE

(75) Inventors: Gary Chorng-Jyh Wang, Cupertino, CA (US); Ching Yen Ho, Los Gatos, CA (US); Wen Jang Hwang, Fremont, CA (US); Wilson Wen-Fu Wang, San Jose, CA (US)

(73) Assignee: Sparkle Power Inc., San Jose, CA (US)

( * ) Notice: Subject to any disclaimer, the term of this patent is extended or adjusted under 35 U.S.C. 154(b) by 159 days.

(21) Appl. No.: 13/029,138

(22) Filed: Feb. 17, 2011

(65) Prior Publication Data

US 2011/0247938 A1 Oct. 13, 2011

Related U.S. Application Data

(60) Provisional application No. 61/312,240, filed on Mar. 9, 2010, provisional application No. 61/312,242, filed on Mar. 9, 2010, provisional application No. 61/312,244, filed on Mar. 10, 2010.

(51) Int. Cl.
*G01N 27/447* (2006.01)

(52) U.S. Cl.
USPC .......................................... 422/81; 204/643

(58) Field of Classification Search
USPC .................................. 204/643; 422/81, 189
See application file for complete search history.

(56) References Cited

U.S. PATENT DOCUMENTS

2007/0242111 A1* 10/2007 Pamula et al. ................. 347/81

OTHER PUBLICATIONS

M.G. Pollack, et al., "Electrowetting-base actuation of droplets for integrated microfluidics", Lab on a Chip, vol. 2, 2002, p. 96-101.*

* cited by examiner

*Primary Examiner* — J. Christopher Ball
(74) *Attorney, Agent, or Firm* — Grace Lee Huang; Arch Equity Holdings, LLC

(57) ABSTRACT

The system relates to filed-programmable lab-on-chip (FPLOC) microfluidic operations, fabrications, and programming based on Microelectrode Array Architecture are disclosed herein. The FPLOC device by employing the microelectrode array architecture may include the following: (a) a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) a field programmability mechanism for programming a group of configured-electrodes to generate microfluidic components and layouts with selected shapes and sizes; and, (c) a FPLOC functional block, comprising: (i) I/O ports; (ii) a sample preparation unit; (iii) a droplet manipulation unit; (iv) a detection unit; and (iv) a system control unit.

23 Claims, 64 Drawing Sheets

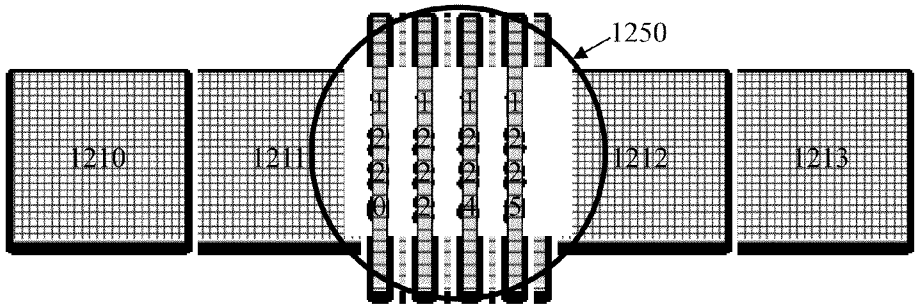
FIG. 12A
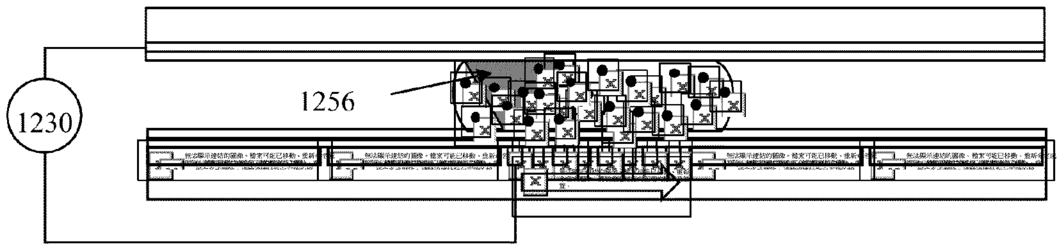

FIELD-PROGRAMMABLE LAB-ON-A-CHIP BASED ON MICROELECTRODE ARRAY ARCHITECTURE

CROSS REFERENCE TO RELATED APPLICATIONS

The present application claims benefit of priority under 35 U.S.C. 119(e) to: U.S. Patent Application 61/312,240, entitled "Field-Programmable Lab-on-a-Chip and Droplet Manipulations Based on EWOD Micro-Electrode Array Architecture" and filed Mar. 9, 2010; U.S. Patent Application 61/312,242, entitled "Droplet Manipulations on EWOD-Based Microelectrode Array Architecture" and filed Mar. 9, 2010; U.S. Patent Application 61/312,244, entitled "Micro-Electrode Array Architecture" and filed Mar. 10, 2010. The foregoing applications are hereby incorporated by reference into the present application in their entireties.

The present application also incorporates by reference in its entirety co-pending U.S. patent application Ser. No. 13/029,137, entitled "Droplet Manipulations on EWOD Microelectrode Array Architecture", and filed on the same date as the present application, namely, Feb. 17, 2011; co-pending U.S. patent application Ser. No. 13/029,140, entitled "Microelectrode Array Architecture", and filed on the same date as the present application, namely, Feb. 17, 2011.

FIELD OF THE INVENTION

The present invention relates to lab-on-a-chip (LOC) microfluidic systems and methods. More specifically, the present invention relates to the field-programmable lab-on-a-chip (FPLOC) system employing the Microelectrode Array architecture.

FPLOC can be field-programmed to serve microfluidic applications including but not limited to: droplet-based microfluidic operations, continuous-based microfluidic operations, Electrowetting-on-dielectric (EWOD) based actuations, or (dielectrophoresis) DEP based actuations.

FPLOC provides a more convenient solution to the LOC designer by leveraging a field-programmable gate array (FPGA)-like architecture. In contrast to unique hardwired solutions, a field-programmable microfluidic platform allows LOC designs by software programming without sophisticated hardware design and packaging techniques, this provides a significant advantage compared with other platforms. The FPLOC allows the implementation of different application specific systems (assays) in an easy and flexible way much like well-characterized, mass-produced, packaged FPGAs. As a result, time-to-market, mass production, fault tolerance, low cost, and many other benefits by leveraging semiconductor industry experiences can be realized in the microfluidics field.

BACKGROUND OF THE INVENTION

Microfluidics technology has grown explosively over the last decade for the potential to carry out certain chemical, physical or biotechnological processing techniques. Microfluidics refers to the manipulation of minute quantities of fluid, typically in the micro- to nano-liter range. The use of planar fluidic devices for performing small-volume chemistry was first proposed by analytical chemists, who used the term "miniaturized total chemical analysis systems" (μTAS) for this concept. An increasing number of researchers from many disciplines other than analytical chemistry have embraced the fundamental fluidic principle of μTAS as a way of developing new research tools for chemical and biological applications. To reflect this expanded scope, the broader terms "microfluidics" and "Lab-on-a-chip (LOC)" are now often used in addition to μTAS.

The first generation microfluidic technologies are based on the manipulation of continuous liquid flow through microfabricated channels. Actuation of liquid flow is implemented either by external pressure sources, integrated mechanical micropumps, or by electrokinetic mechanisms. Continuous-flow systems are adequate for many well-defined and simple biochemical applications, but they are unsuitable for more complex tasks requiring a high degree of flexibility or complicated fluid manipulations. Droplet based microfluidics is an alternative to the continuous-flow systems, where the liquid is divided into discrete independently controllable droplets, and these droplets can be manipulated to move in channels or on a substrate. By using discrete unit-volume droplets, a microfluidic function can be reduced to a set of repeated basic operations, i.e., moving one unit of fluid over one unit of instance. A number of methods for manipulating microfluidic droplets have been proposed in the literature. These techniques can be classified as chemical, thermal, acoustical, and electrical methods. Among all methods, electrical methods to actuate droplets have received considerable attention in recent years.

In droplet-based microfluidic devices, a liquid is sandwiched between two parallel plates and transported in the form of droplets. Droplet-based microfluidic systems offer many advantages: they have low power consumption and require no mechanical components such as pumps or valves. In recent years, droplet-based microfluidic systems have been broadly utilized in applications such as the mixing of analytes and reagents, the analysis of biomolecules, and particle manipulation. In digital microfluidic systems, electro-wetting-on-dielectric (EWOD) and liquid dielectrophoresis (LDEP) are the two main mechanisms that are used to dispense and manipulate droplets. EWOD and LDEP both exploit electromechanical forces to control the droplet. EWOD microsystems are usually utilized to create, transport, cut, and merge liquid droplets. In these systems, the droplet is sandwiched between two parallel plates and actuated under the wettability differences between the actuated and nonactuated electrodes. In LDEP microsystems, the droplet is placed on coplanar electrodes. When a voltage is applied, the liquids become polarizable and flow toward regions of stronger electric field intensity. The differences between LDEP and EWOD actuation mechanisms are the actuation voltage and the frequency. In EWOD actuation, DC or low-frequency AC voltage, typically <100 V, is applied, whereas LDEP needs higher actuation voltage (200-300 Vrms) and higher frequency (50-200 kHz).

Electrowetting-on-dielectric (EWOD) is one of the most common electrical methods. Digital microfluidics such as the Lab-on-a-chip (LOC) generally means the manipulation of droplets using EWOD technique. The conventional EWOD based LOC device generally includes two parallel glass plates. The bottom plate contains a patterned array of individually controllable electrodes, and the top plate is coated with a continuous ground electrode. Electrodes are preferably formed by a material like indium tin oxide (ITO) that have the combined features of electrical conductivity and optical transparency in thin layer. A dielectric insulator coated with a hydrophobic film is added to the plates to decrease the wettability of the surface and to add capacitance between the droplet and the control electrode. The droplet containing biochemical samples and the filler medium are sandwiched between the plates while the droplets travel inside the filler medium. In order to move a droplet, a control voltage is applied to an electrode adjacent to the droplet and at the same time the electrode just under the droplet is deactivated.

In recent years, LDEP has also attracted considerable interest because it is easily implemented and it can dispense and manipulate tiny droplets, ranging from nanoliters to picoliters. Liquid DEP actuation is defined as the attraction of polarizable liquid masses into the regions of higher electric-field intensity. The basic structure of the liquid DEP droplet dispenser consists of two coplanar electrodes coated with a dielectric layer to protect them from electrolysis. Ahmed and Jones optimized liquid DEP droplet dispensing and created a picoliter droplet on coplanar electrodes. The effects of surface coatings and critical factors on the reliable actuation of the liquid DEP using coplanar electrodes have been reported. Fan et al. transformed coplanar LDEP electrodes into two parallel LDEP electrodes. The parallel structure of LDEP devices was employed for a micromixer and integrated with an EWOD microsystem. Transporting, splitting, and merging dielectric droplets are achieved by DEP in a parallel-plate (bi-planar) device, which expands the fluids of digital microfluidics from merely being conductive and aqueous to being non-conductive. Bi-planar DEP actuation of dielectric droplets is achieved by applying voltage between parallel electrodes, a liquid dielectric droplet of a higher relative permittivity is pumped by DEP into the region of a lower relative permittivity (e.g., air).

Unfortunately, the conventional LOC systems employing EWOD technique built to date are still highly specialized to particular applications. The current LOC systems rely heavily on the manual manipulation and optimization of the bioassays. Moreover, current applications and functions in the LOC system are time-consuming and require costly hardware design, testing and maintenance procedures. The biggest disadvantage about these systems is the "hardwired" electrodes. "Hardwired" means the shapes, the sizes, locations, and the electrical wiring traces to the controller of the electrodes are physically confined to permanently etched structures. Regardless of their functions, once the electrodes are fabricated, their shapes, sizes, locations and traces can't be changed. So this means high non-recurring engineering costs relative to LOC designs and the limited ability to update the functionality after shipping or partial re-configuration of the portion of the LOC.

There is a need in the art for a system and method for reducing the labor and cost associated with generating the microfluidic systems with the droplet manipulation. The art raises the LOC designs to the application level to relieve LOC designers from the burden of manual optimization of bioassays, time consuming hardware design, costly testing and maintenance procedures.

There is a need in the art for a system and method for reducing the labor and cost associated with generating the microfluidic systems with the droplet manipulation. Microelectrode array architecture technique can provide the field-programmability that the electrodes and the overall layout of the LOC can be software programmable. A microfluidic device or embedded system is said to be field-programmable or in-place programmable if its firmware (stored in non-volatile memory, such as ROM) can be modified "in the field," without disassembling the device or returning it to its manufacturer. This is often an extremely desirable feature, as it can reduce the cost and turnaround time for replacement of buggy or obsolete firmware. The ability to update the functionality after shipping, partial re-configuration of the portion of the design and the low non-recurring engineering costs relative to an LOC design offer advantages for many applications.

Also, based on the novel Microelectrode Array Architecture, the art to manipulate droplets in LOC systems can be dramatically improved. There are various embodiments of present invention in the advanced manipulations of droplets in creating, transportation, mixing and cutting based on the EWOD Microelectrode Array Architecture.

It is believed that a Field-Programmable Lab-on-chip (FPLOC) employing the Microelectrode Array Architecture can provide a number of advantages over the conventional digital fluidic system due to its ability of programming a new LOC system dynamically based on field applications. The field-programmability can dramatically improve the turn-around time of the LOC designs and it also raises the LOC designs to the applications level to relieve LOC designers from the burden of manual optimization of bioassays, time consuming hardware design, costly testing and maintenance procedures.

SUMMARY

Disclosed herein is a device of field-programmable lab-on-a-chip (FPLOC) by employing the microelectrode array architecture, including: (a) a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with the droplets; (b) a field programmability mechanism for programming a group of configured-electrodes to generate microfluidic components and layouts with selected shapes and sizes; and, (c) a FPLOC functional block, comprising: (i) I/O ports; (ii) a sample preparation unit; (iii) a droplet manipulation unit; (iv) a detection unit; and (iv) a system control unit.

In another embodiment, a FPLOC device employing the CMOS technology fabrication, including: (a) a CMOS system control block, comprising: (i) a controller block for providing the processor unit, memory spaces, interface circuitries and the software programming capabilities; (b) a chip layout block for storing the configured-electrode configuration data and the FPLOC layout information and data; (c) a droplet location map for storing the actual locations of the droplets; (d) a fluidic operations manager for translating the layout information, the droplet location map and the FPLOC applications from the controller block into the physical actuations of the droplets; and, a (b) plurality of fluidic logic blocks, comprising one microelectrode on the top surface of the CMOS substrate, one memory map data storage unit for holding the activation information of the microelectrode, and the control circuit block for managing the control logics.

Still in another embodiment, a FPLOC device employing the thin-film transistor TFT technology fabrication, including: (a) a TFT system control block, comprising: (i) a controller block for providing the processor unit, memory spaces, interface circuitries and the software programming capabilities; (ii) a chip layout block for storing the configured-electrode configuration data and the FPLOC layout information and data; (iii) a droplet location map for storing the actual locations of the droplets; (iv) a fluidic operations manager for translating the data from the layout information, the droplet location map, and the FPLOC applications from the controller block, to the physical droplet actuation data for activating microelectrodes, wherein the physical droplet actuation data comprises grouping, activating, deactivating of configured-electrodes sent to an active-matrix block by a frame-by-frame manner; and, (b) an active-matrix block, comprising: (i) an active-matrix panel comprising a gate bus-line, a source bus-line, thin-film transistors, storage capacitors, microelectrodes to individually activate each microelectrode; (ii) an active-matrix controller using the data from the TFT system control block to drive the TFT-array by sending driving data to driving chips, comprising the source driver and the gate driver; (iii) a DC/DC converter for applying driving voltage to the source driver and the gate driver.

Still in another embodiment, a method of bottom-up programming and designing a FPLOC device, including: (a) erasing the memory in the FPLOC; (b) configuring the microfluidic components of the group of configured-electrodes in selected shapes and sizes, comprising multiple microelectrodes arranged in array in the field programmability mechanism comprising reservoirs, electrodes, mixing chambers, detection windows, waste reservoirs, droplet pathways and special functional electrodes; (c) configuring the physical allocations of the microfluidic components; and (d) designing the microfluidic operations for the sample preparations, the droplet manipulations, and detections.

Still in another embodiment, a method of top-down programming and designing a FPLOC device, comprising: (a) designing the functions of FPLOC by a hardware description language; (b) generating the sequencing graph model from the hardware description language; (c) performing the simulation to verify the functions of FPLOC by the hardware description language; (d) generating the detailed implementations by architectural-level synthesis from the sequencing graph model; (e) inputting design data from a microfluidic module library and from a design specification to the synthesis procedure; (f) generating files of the mapping of assay operations of on-chip resources and the schedule for the assay operations, and a build-in self-test from the synthesis procedure; (g) performing a geometry-level synthesis with the input of the design specification to generate a 2-D physical design of the biochip; (h) generating a 3-D geometrical model from the 2-D physical design of the biochip coupled with the detailed physical information from the microfluidic module library; (i) performing a physical-level simulation and design verification using the 3-D geometrical model; and, (j) loading the FPLOC design into the blank FPLOC.

Still in another embodiment, a method of designing FPLOC libraries, comprising: (a) simulating the functional module description of the microfluidic operations written by the hardware description languages comprising VHDL or Verilog by creating test benches to compose a test system for simulating the system and for observing results; (b) mapping the functional module description to a netlist by the synthesis engine; (c) translating the netlist to a gate level description; (d) simulating the gate level description; (e) adding the propagation delays to the netlist by physical simulation; and, (f) running the overall system simulation by the netlist with the propagation delays.

In another embodiment, The EWOD Microelectrode Array Architecture of the present invention employs the "dot matrix printer" concept that a plurality of microelectrodes (e.g., "dots") are grouped and are simultaneously activated/deactivated to form varied shapes and sizes of electrodes to meet the requirements of fluidic operational functions in field applications.

In another embodiment, all EWOD microfluidic components can be generated by the microelectrodes, including, but not limit to, reservoirs, electrodes, mixing chambers, droplet pathways and others. Also physical layouts of the LOC for the locations of I/O ports, reservoirs, electrodes, pathways and electrode networks all can be done by configurations of microelectrodes.

In yet another embodiment, besides the conventional control of the "configured electrodes" to perform typical microfluidic operations, special control sequences of the microelectrodes can offer advanced microfluidic operations in the manipulations of droplets.

In another embodiment, methods of the droplet manipulation based on the EWOD Microelectrode Array Architecture may include creating the droplets; transporting the droplets; cutting in the coplanar; and mixing the liquid droplets.

Various embodiments of a FPLOC are disclosed. In one embodiment, the design of FPLOC is based on EWOD Microelectrode Array Architecture. FPLOC can be dynamically field-programmed according to different applications and functions wherein all the electrodes, consist of many microelectrodes, can be software designed and re-configured. After the configuration or re-configuration, the fluidic operations in EWOD-based technique in the LOC design are then accomplished by controlling and manipulating of the electrodes, similar to general concept of EWOD based LOC system.

In another embodiment, the varied shapes of sizes of electrodes such as reservoirs, electrodes, mixing chambers, droplet pathways and others of the FPLOC system are able to be software programmed or re-configured to meet the requirements of operational functions in field applications.

Also a software programming or re-configuration can perform the physical layouts of the FPLOC for the locations of input ports, reservoirs, electrodes, pathways and electrode networks.

In yet another embodiment, FPLOC encapsulates the low-level microfluidic operations into application level representations for designers to focus on the high-level aspect of applications. Configuration data and activation control sequences of microelectrodes to perform specific fluidic operations are created and tested as library items that FPLOC designers can pick and choose to assemble their microfluidic applications.

In other embodiments, the design of the EWOD Microelectrode Array Architecture in the manipulation of droplets can be based on a coplanar structure in which the EWOD actuations can occur in the single plate configuration without the top plate.

Still in another embodiment, the bi-planar structure can be employed in the design of EWOD Microelectrode Array Architecture in the manipulation of droplets in which the upper top plate is implemented in the system.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 12A illustrates the top view that droplet and suspended particles are actuated by configured-square-electrodes and configured-strip-electrodes by EWOD and DEP, respectively.

DETAILED DESCRIPTION

Figure 1A:
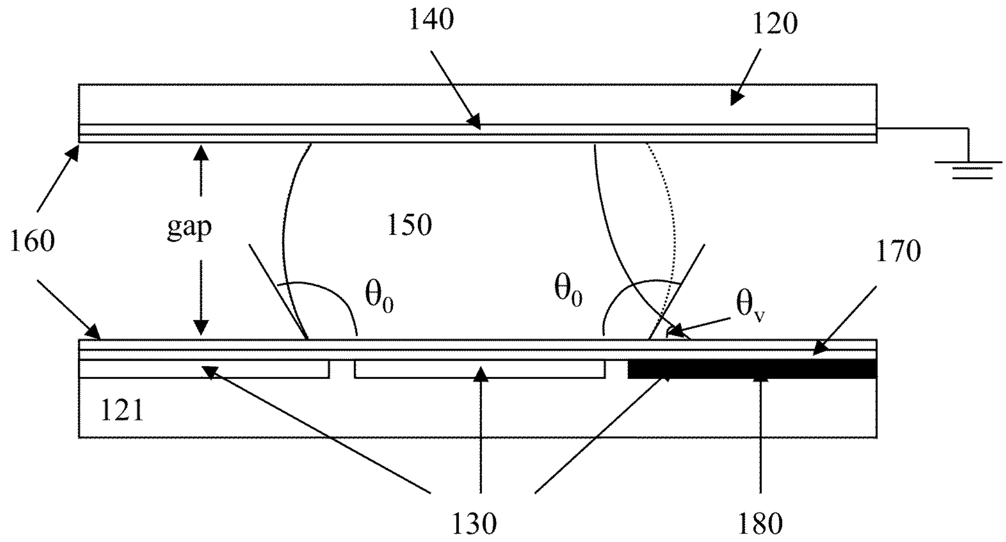
FIG. 1A is a cross-section view generally illustrating the conventional sandwiched EWOD system.

A conventional electrowetting microactuator mechanism (in small scale for illustration purposes only) is illustrated in FIG. 1A. EWOD-based digital microfluidic device consists of two parallel glass plates 120 and 121, respectively. The bottom plate 121 contains a patterned array of individually controllable electrodes 130, and the top plate 120 is coated with a continuous ground electrode 140. Electrodes are preferably formed by a material, such as indium tin oxide (ITO)

that has the combined features of electrical conductivity and optical transparency in thin layer. A dielectric insulator 170, e.g., parylene C, coated with a hydrophobic film 160 such as Teflon AF, is added to the plates to decrease the wettability of the surface and to add capacitance between the droplet and the control electrode. The droplet 150 containing biochemical samples and the filler medium, such as the silicone oil or air, are sandwiched between the plates to facilitate the transportation of the droplet 150 inside the filler medium. In order to move a droplet 150, a control voltage is applied to an electrode 180 adjacent to the droplet and at the same time the electrode just under the droplet 150 is deactivated.

Figure 1B:
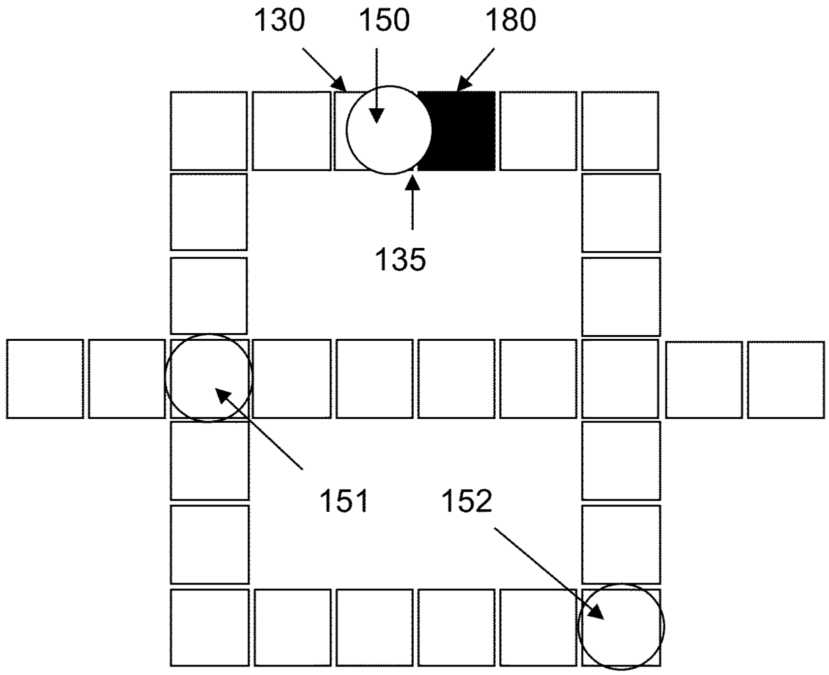
FIG. 1B is a top view generally illustrating the conventional EWOD on a two-dimensional electrode array.

FIG. 1B is a top view generally illustrating the conventional EWOD on a two dimensional electrode array 190. A droplet 150 is moving from electrode 130 into an activated electrode 180. The black color of electrode 180 indicates a control voltage is applied. The EWOD effect causes an accumulation of charge in the droplet/insulator interface, resulting in an interfacial tension gradient across the gap 135 between the adjacent electrodes 130 and 180, which consequently causes the transportation of the droplet 150. By varying the electrical potential along a linear array of electrodes, electrowetting can be used to move nanoliter volume liquid droplets along this line of electrodes. The velocity of the droplet can be controlled by adjusting the control voltage in a range from 0-90 V, and droplets can be moved at speeds of up to 20 cm/s. Droplets 151 and 152 can also be transported, in user-defined patterns and under clocked-voltage control, over a 2-D array of electrodes without the need for micropumps and microvalves.

EWOD based LOC devices use the interfacial tension gradient across the gap between the adjacent electrodes to actuate the droplets. The designs of electrodes include the desired shapes, sizes of each of the electrode and the gaps between each of the two electrodes. In the EWOD based LOC layout design, the droplet pathways generally are composed of a plurality of electrodes that connect different areas of the LOC. These electrodes can be used either for transporting procedure or for other more complex operations such as mixing and cutting procedures in the droplet manipulation.

Figure 2:
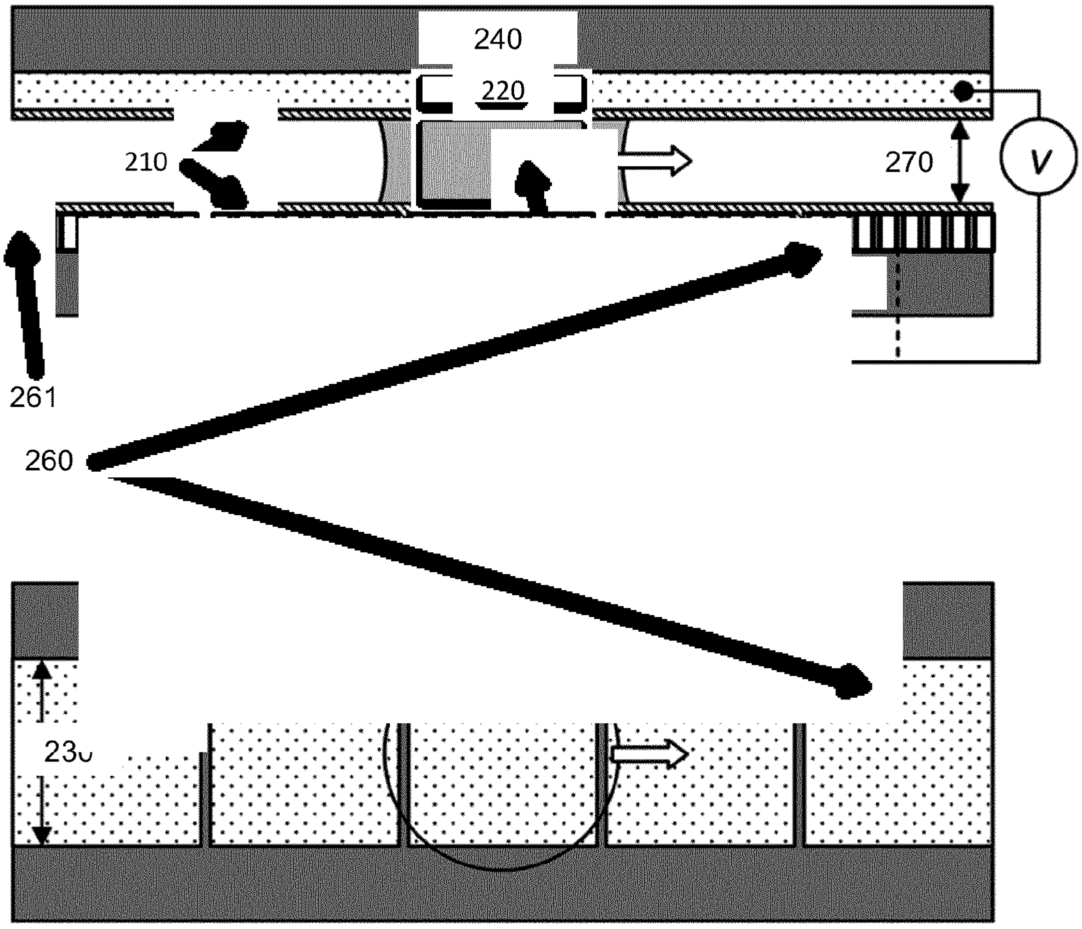
FIG. 2 is a diagram of a bi-planar DEP device to manipulate dielectric droplets.

In one embodiment, a bi-planar DEP device to manipulate dielectric droplets can be constructed as shown in FIG. 2. A plurality of microelectrodes 261 were patterned on the bottom substrate 245. And each configured-electrode 260 comprises multiple microelectrodes 261. The top plate 240 contained an unpatterned reference electrode 220. A layer of low surface energy material (such as Teflon) 210 was coated on both plates to reduce the interfacial force between the droplets 250 and the solid surfaces, which facilitates reproducible droplet handling and eliminates residues of the dielectric liquids during operations. The gap height or droplet thickness 270 is determined by the thickness of the spacer. By applying voltage between the reference electrode 220 and one of the driving microelectrodes, a dielectric droplet would be pumped onto the energized microelectrode as the arrow indicates in FIG. 2. Actuation of dielectric droplets Dielectric droplets of decane (350 $V_{DC}$), hexadecane (470 $V_{DC}$), and silicone oil (250 $V_{DC}$) were tested in parallel-plate devices with a gap height of 150 mm. The polarity of the applied DC voltage has no influence on droplet driving, while AC signals tested up to the frequency of 1 kHz actuated dielectric droplets successfully.

The differences between LDEP and EWOD actuation mechanisms are the actuation voltage and the frequency. So sharing the physical bi-planar electrode structure and configurations between EWOD and DEP is doable. Typically, in EWOD actuation, DC or low-frequency AC voltage, typically <100 V, is applied, whereas LDEP needs higher actuation voltage (200-300 Vrms) and higher frequency (50-200 kHz). In the followed disclosures of the invention, EWOD techniques will be used to demonstrate the embodiments of the invention but the invention covers the DEP actuation by appropriate changes of the actuation voltages and the frequencies in most cases.

The present invention employs the "dot matrix printer" concept that each microelectrode in the Microelectrode Array Architecture is a "dot" which can be used to form all microfluidic components. In other words, each of the microelectrodes in the microelectrode array can be configured to form various microfluidic components in different shapes and sizes. According to customer's demand, multiple microelectrodes can be deemed as "dots" that are grouped and can be activated simultaneously to form different electrodes and perform microfluidic operations. Activate means to apply necessary electrical voltages to the electrodes that the EWOD effect causes an accumulation of charge in the droplet/insulator interface, resulting in an interfacial tension gradient across the gap between the adjacent electrodes, which consequently causes the transportation of the droplet; or the DEP effect that the liquids become polarizable and flow toward regions of stronger electric field intensity. Deactivate means to remove the applied electrical voltages from the electrodes.

Figure 3:
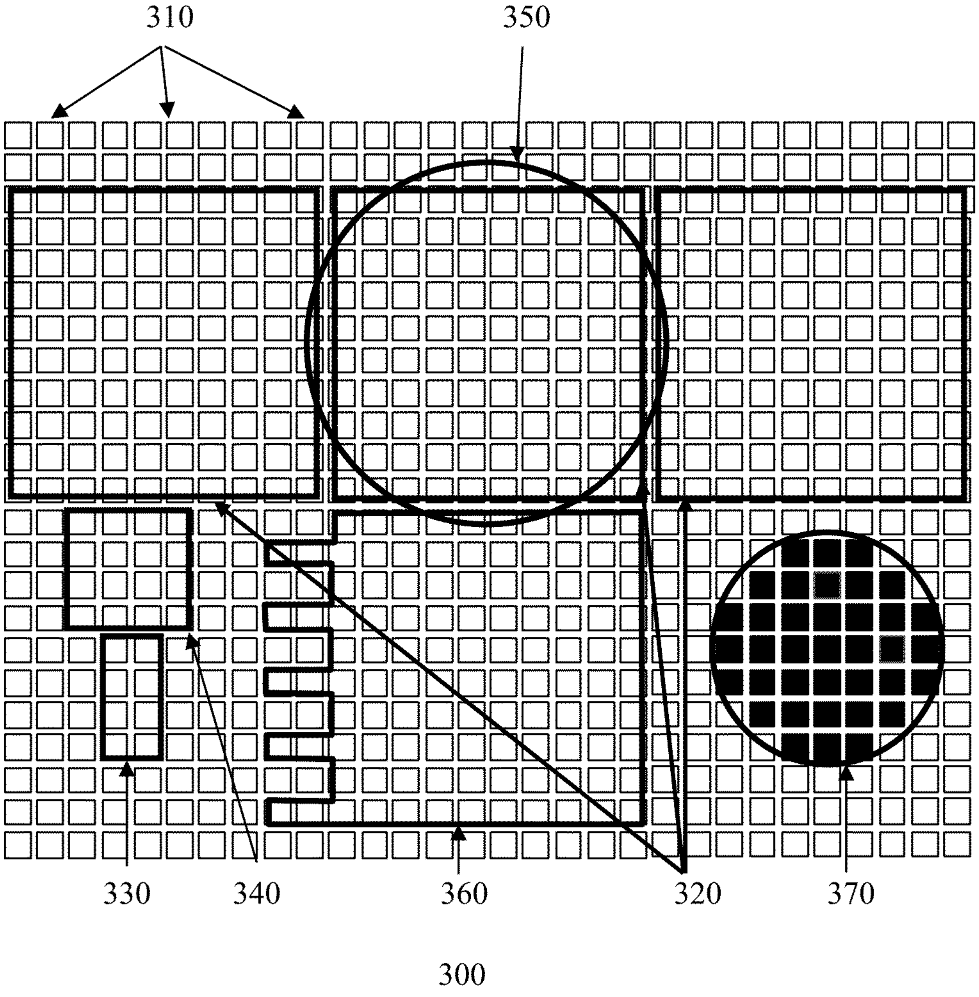
FIG. 3 is a diagram illustrating the microelectrode array that can be configured into various shape and size of configured-electrodes.

FIG. 3 illustrates one embodiment of the FPLOC based on Microelectrode Array Architecture of the present invention. In this embodiment, the microelectrode array 300 is composed of a plurality (30×23) of identical microelectrodes 310. This microelectrode array 300 is fabricated based on the standard microelectrode specification (shown here as microelectrode 310) and fabrication technologies that are independent from the ultimate LOC applications and the detail microfluidic operation specifications. In another word, this microelectrode array 300 is a "blank" or "pre-configuration" FPLOC. Based on the application needs, then this microelectrode array can be configured or software programmed into the desired LOC. As shown in FIG. 3, each of the configured-electrode 320 is composed of 100 microelectrodes 310 (i.e., 10×10 microelectrodes). "Configured-electrode" means the 10×10 microelectrodes 310 are grouped together to perform as an integrated electrode 320 and will be activated or deactivated together at the same time. Normally, the configuration data is stored in non-volatile memory (such as ROM) and can be modified "in the field," without disassembling the device or returning it to its manufacturer. FIG. 3 shows a droplet 350 sits on the center configured-electrode 320.

As shown in FIG. 3, the sizes and shapes of the configured-electrodes of the present invention can be designed based on application needs. The volume of the droplet 350 is proportional to the size of the electrode 320. In other words, by controlling the size of the electrode 320, the volume of the droplet 350 is also limited to fit into the designed size of the electrode 320; therefore to control of droplet volume. Examples of the control of the sizes of the configured-electrodes are electrodes 320 and 340. Electrode 320 has the size of 10×10 microelectrodes and electrode 340 has the size of 4×4 microelectrodes. Besides the configuration of the sizes of the electrodes, different shapes of the electrodes also can be configured by using the microelectrode array. While electrode 320*s* are square, electrode 330 is composed of 2×4 microelectrodes in rectangular shape. Electrode 360 is left-side-toothed-square, and electrode 370 is round shape.

Figure 4A:
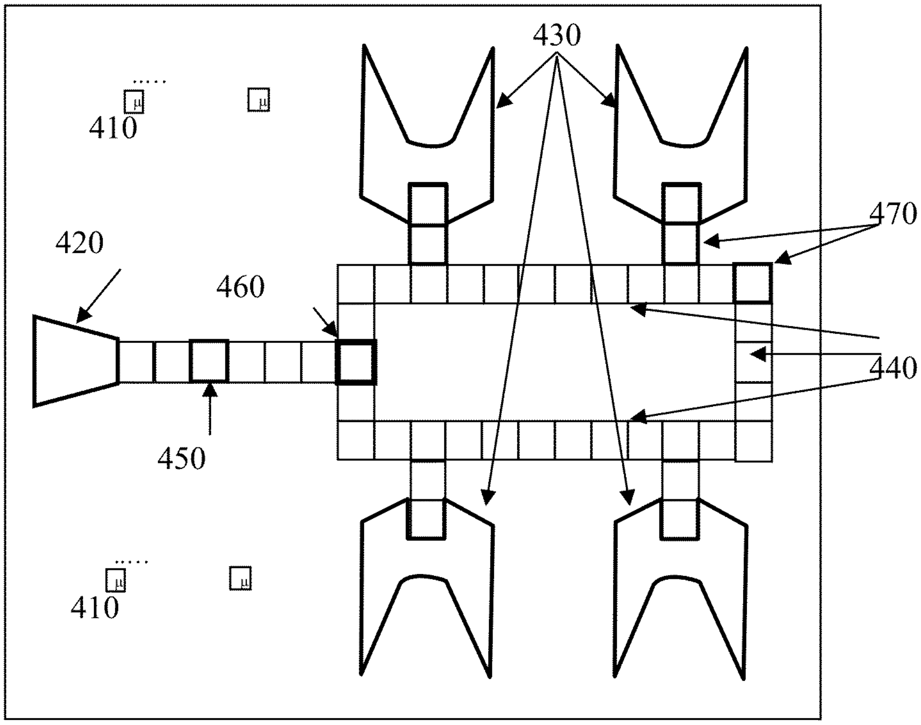
FIG. 4A is the diagram of LOC layout using the microelectrode array architecture.

As the number of the microelectrodes increased, entire LOC design can be programmed from a FPLOC as shown in FIG. 4A, the shapes of configured-electrodes of the transportation path 440, detection window 450 and the mixing chamber 460 are square. The reservoir 430 is special-shaped large sized configured-electrode. The waste reservoir 420 is tetragon shaped.

Figure 4B:
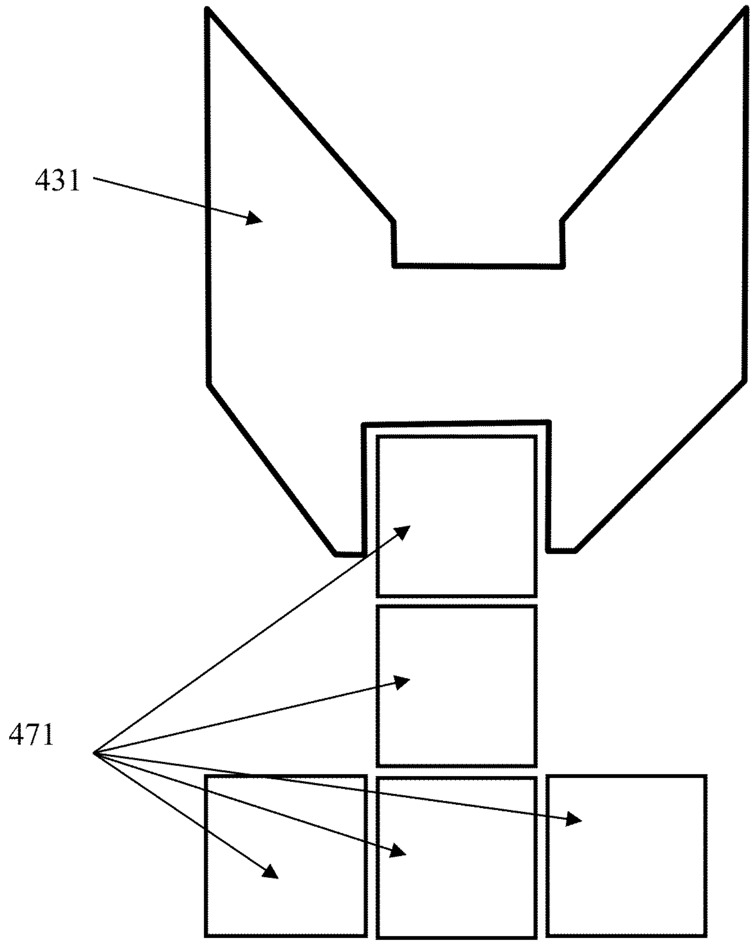
FIG. 4B is the diagram of a conventional physically etched structure.
Figure 4C:
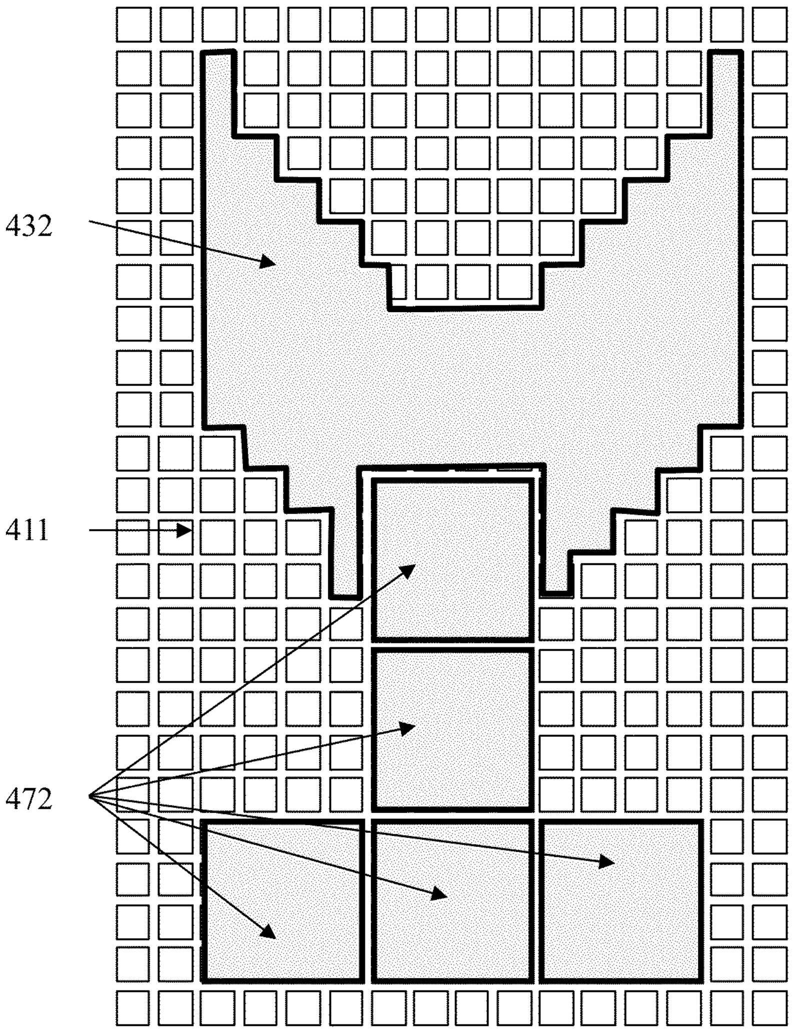
FIG. 4C is the diagram of configured-electrodes for the enlarged section of the reservoir and configured-electrodes.

FIGS. 4B and 4C shows the enlarged version of the reservoir 430 from FIG. 4A. FIG. 4B is illustrated as a physically etched reservoir structure 431 manufactured by conventional EWOD-LOC systems. The components show permanently etched reservoir 431 and the four permanently etched electrodes 471. In comparison of FIG. 4B (conventional design), FIG. 4C is a field-programmed LOC structure with similar sized configured reservoir 432 grouped electrodes 472. The configured reservoir 432 can be made by grouping multiple microelectrodes 411 into desired size and shape to make such reservoir component. The grouped electrodes 471 contain 4×4 microelectrodes 411.

After defining the shapes and sizes of the necessary microfluidic components, it's also important to define the locations of the microfluidic components and how these microfluidic components connected together as a circuitry or network. FIG. 4A shows where the physical locations of these microfluidic components are positioned and how these microfluidic components are connected together to perform as a functional LOC. These microfluidic components are: configured-electrodes 470, reservoirs 430, waste reservoir 420, mixing chamber 460, detection window 450 and transportation paths 440 that connect different areas of the LOC. If it's a Field-Programmable LOC then after the layout design, there are some unused microelectrodes 410. Designers can go for a hard-wired version to save cost after the FPLOC is fully verified then unused microelectrodes 410 can be removed.

Figure 5A:
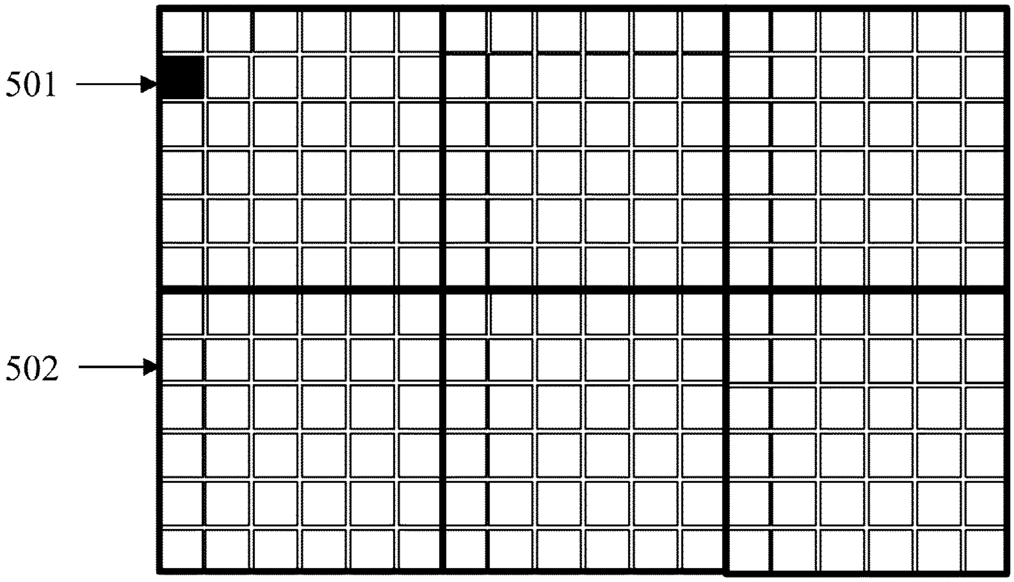
FIG. 5A illustrates an array of square microelectrodes and one of them is highlighted.
Figure 5B:
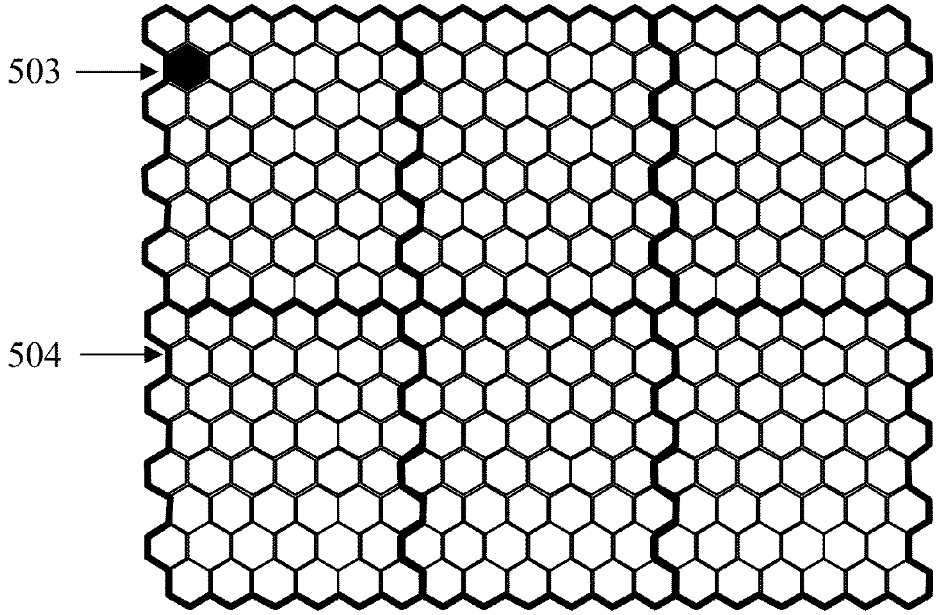
FIG. 5B shows an array of hexagon microelectrodes and one of them is highlighted.
Figure 5C:
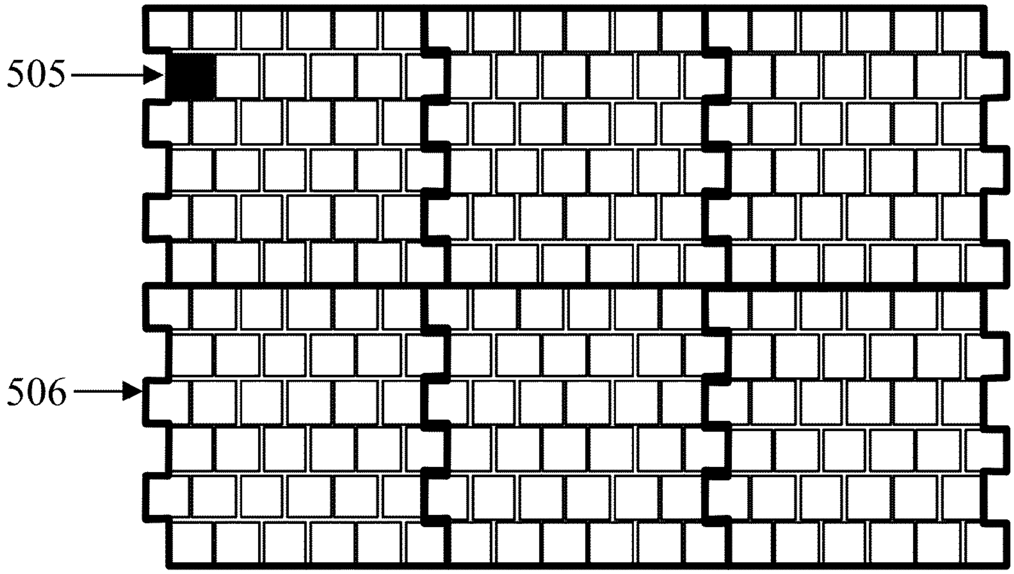
FIG. 5C shows an array of square microelectrodes that are arranged in a wall-brick layout and one of them is highlighted.

The shape of the microelectrode in FPLOC can be physically implemented in different ways. In one embodiment of the invention, FIG. 5A illustrates an array of square microelectrodes and one of them is highlighted as 501. And 6×6 microelectrodes form the configured-electrode 502. FIG. 5A totally have a 3×2 configured-electrodes. In another embodiment, FIG. 5B shows an array of hexagon microelectrodes and one of them is highlighted as 503. And 6×6 microelectrodes form the configured-electrode 504 and there are 3×2 configured-electrodes in FIG. 5B. The interdigital edge of the hexagon microelectrode has the advantage in moving the droplet across the gap between the configured-electrodes. Yet in another embodiment, FIG. 5C shows an array of square microelectrodes that are arranged in a wall-brick layout and one of them is highlighted as 505. And 6×6 microelectrodes form the configured-electrode 506 and there are 3×2 configured-electrodes in FIG. 5C. The interdigital edge of the hexagon microelectrode has the advantage in moving the droplet across the gap between the configured-electrodes, but this only happens on the x-axis. There are many other shapes of the microelectrodes can be implemented and not only limited to the three shapes discussed here.

The conventional LOC design is based on either a bi-planar structure that has a bottom plate containing a patterned array of electrodes, and a top plate coated with a continuous ground electrode or a coplanar structure in which the actuations can occur in a single plate configuration without the top plate. The coplanar design can accommodate a wider range of different volume sizes of droplets without the constrained of the top plate. The bi-planar structure has a fixed gap between the top plates and has the limitation to accommodate wide range of the volume size of droplets but bi-planar structure does provide more reliable microfluidic operations. LOC devices based on the coplanar structure still can add a passive top plate to seal the test surface for the protection of the fluidic operations or for the purpose of protecting the test medium for a longer shelf storage life.

Figure 6A:
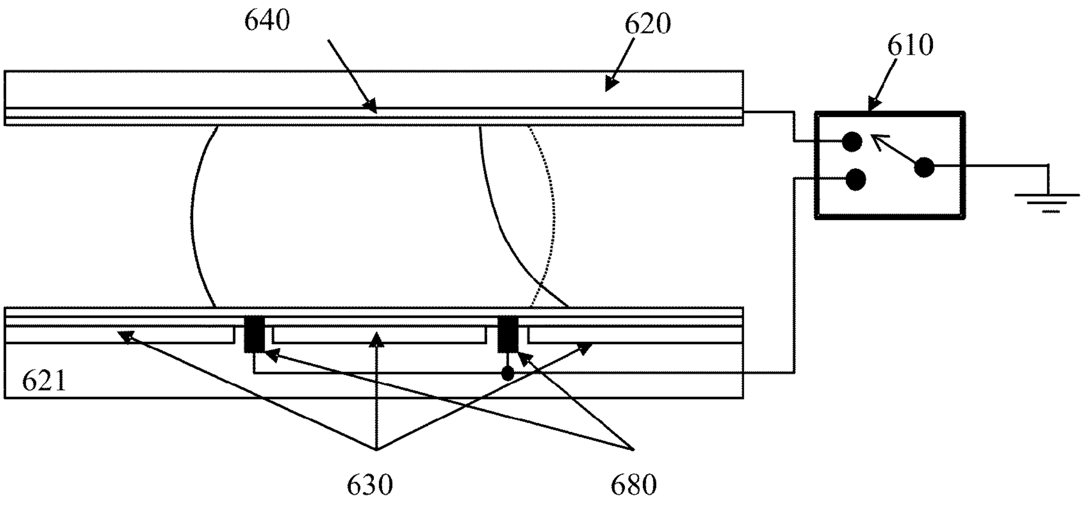
FIG. 6A illustrates a hybrid plate structure that can be controlled to switch the microelectrode structure between the coplanar mode and the bi-planar mode.

To accommodate a widest range of application of the FPLOC, in one embodiment of the present invention, the FPLOC device is based on a hybrid plate structure in which the actuations can occur either in a coplanar configuration or in a bi-planar configuration. FIG. 6A illustrates a switch 610 that can be controlled to switch the microelectrode structure between the coplanar mode and the bi-planar mode. In a bi-planar mode the continuous ground electrode 640 on the cover plate 620 is connected to the ground and the ground grids 680 on the electrode plate 621 is disconnected from the ground. On the other hand, in a coplanar mode the ground grids 680 on the electrode plate 621 is connected to the ground and the ground electrode 640 on the cover plate 620 is disconnected from the ground.

Figure 6B:
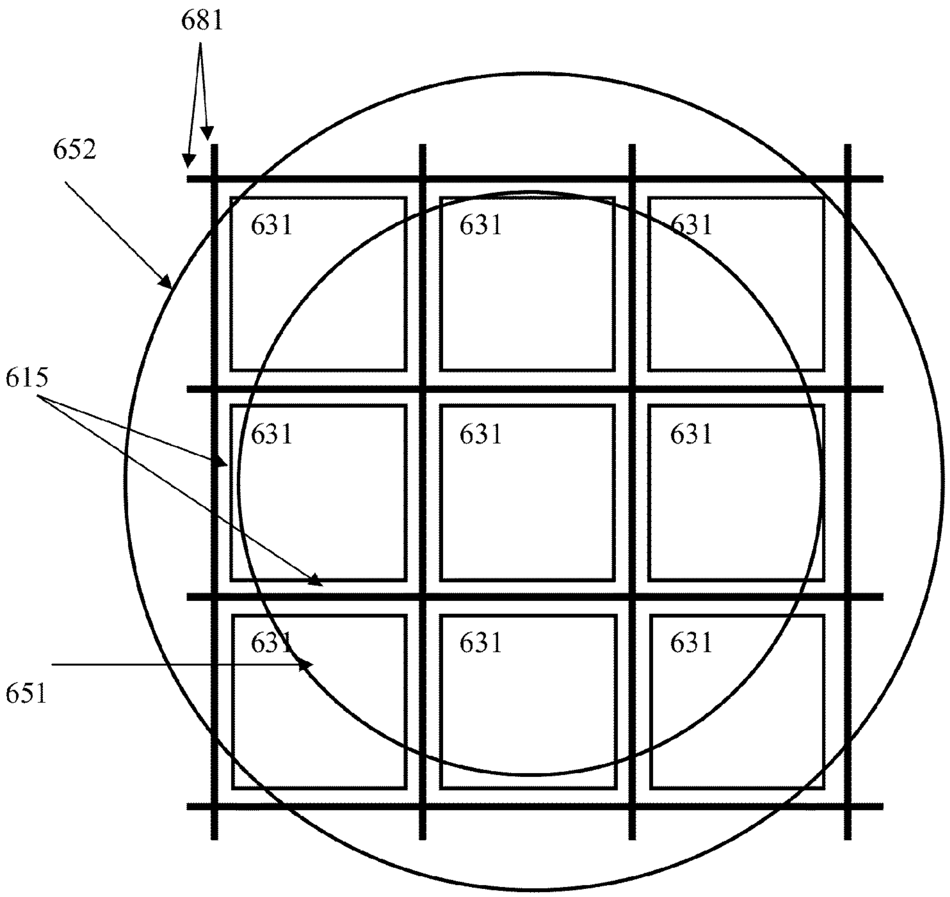
FIG. 6B is an illustration of a ground grids microelectrode coplanar structure.

In one embodiment, one physically coplanar microelectrode (630 and 680) shown in FIG. 6A can be ground grids structure. A ground grids structure is illustrated in FIG. 6B, where driving-microelectrodes 631, ground lines 681, and gaps 615 between 631 and 681. When the electrode is activated, the driving-microelectrodes 631 are charged by a DC or square-wave driving voltage. The ground lines 681 are on the same plate with the driving-microelectrodes 631 to achieve the coplanar structure. The gap 681 is to ensure no overlap vertically between 631 and 681. Two droplets 651 and 652 in different sizes are shown in FIG. 6B that both have sufficient overlaps with ground grid 681 and adjacent microelectrodes 631, and can be manipulated effectively. In another embodiment, the coplanar ground grids might not be disconnected from the ground, as long as the extra grounding doesn't cause any issues in bi-planar structure operations.

Figure 6C:
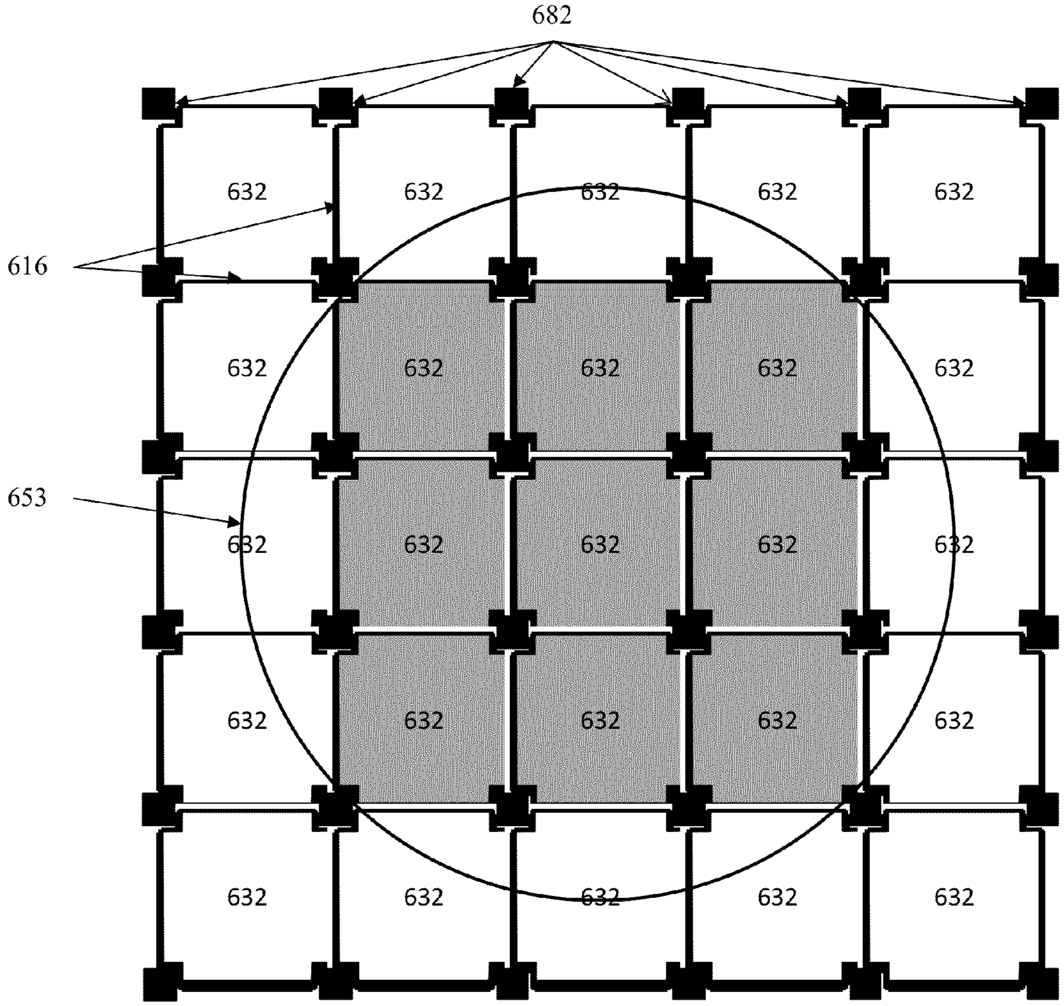
FIG. 6C illustrates another FPLOC microelectrode coplanar structure with the ground pads.

FIG. 6C illustrates another embodiment of the FPLOC microelectrode structure. The driving-microelectrodes 632 with the ground pads 682 at the four corners and the gap 616 between 632 and 682. Instead of the ground lines in the embodiment shown in FIG. 6B, this embodiment uses ground pads to achieve the coplanar structure. This embodiment of the invention is using group grounding so consistent overlaps of ground pads, microelectrodes, and droplet 653 guarantee the reliable droplet operations. Also, in another embodiment, the coplanar ground grids might not be disconnected from the ground, as long as the extra grounding doesn't cause any issues in bi-planar structure operations.

Figure 6D:
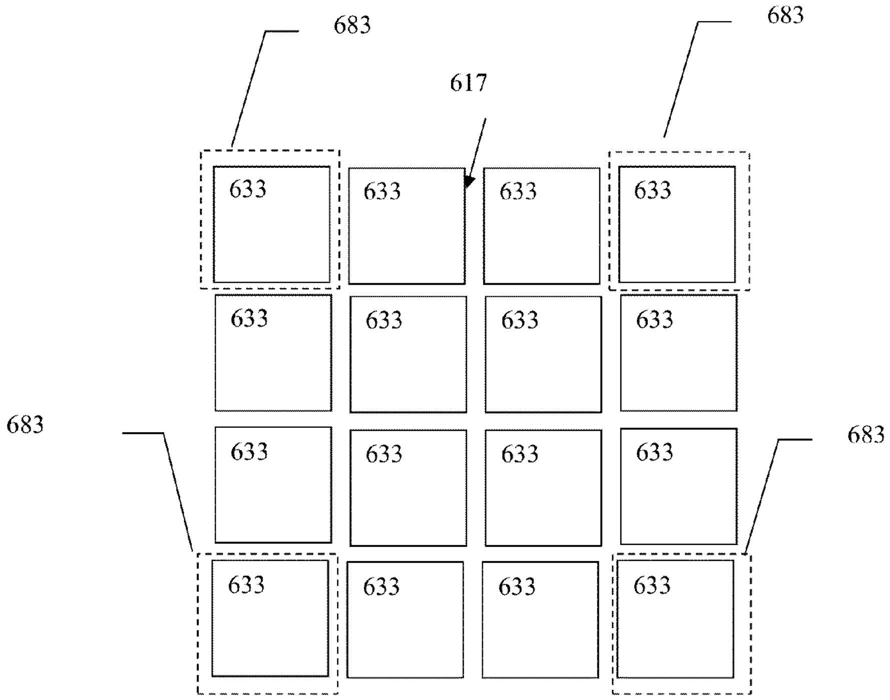
FIG. 6D illustrates another FPLOC microelectrode coplanar structure with programmed ground pads.

FIG. 6D illustrates another embodiment of the FPLOC microelectrode "configured ground pads" coplanar structure. There are no ground lines or ground pads on the same plate with microelectrodes. Instead, some microelectrodes are used as the ground pads to achieve a coplanar electrode structure. FIG. 6D shows 4×4 identical square microelectrodes 633 with gap 617 in between. In this embodiment, any one of the microelectrodes 633 can be configured to act as the ground electrode by physically connected to the electrical ground. In this embodiment, the microelectrodes at the four corners are configured as ground electrodes 683. Also, the field-programmability and the miniature microelectrodes provide more flexibility and more granularities in the dynamic configuration of the "configured-electrodes" and the "configured-ground pads". For the illustrating purpose, the ground microelectrodes are programmed on the four corners but this is not a fixed layout. Interim steps including changes on the ground electrodes or the activating electrodes can be implemented for the best results of the manipulations of the droplet. This "field-programmable" microelectrode ground structure is the most flexible way of implementing the hybrid plate structure of FPLOC, but higher driving voltage will be required to actuate the droplet.

Figure 7:
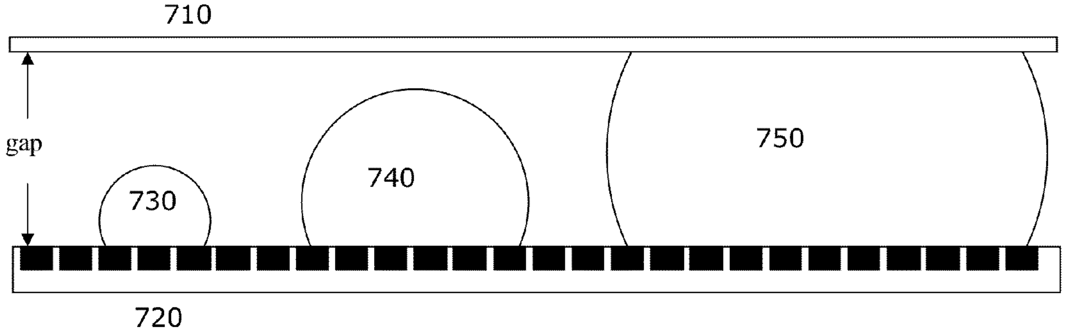
FIG. 7 is a diagram showing a hybrid system structure with a removable, adjustable and transparent top plate to accommodate the widest range of droplet sizes and volumes.

In another embodiment, a removable, adjustable and transparent top plate is employed in the hybrid structure for FPLOC to optimize the gap distance between the top plate 710 and the electrode plate 720 as shown in FIG. 7. The electrode plate 720 is implemented by the microelectrode array architecture technique that the side view of the configured-electrode for droplet 730 includes three microelectrodes (shown in black). The configured-electrode for droplet 740 includes six microelectrodes and the configured-electrode for droplet 750 includes eleven microelectrodes. This embodiment is especially useful in the application such as FPLOC. While microelectrode array architecture provides the field-programmability in configuring the shapes and the sizes of the configured-electrode, a system structure that can accommodate the widest ranges of sizes and volumes of the droplets is highly desirable. Because the wider the droplet sizes and volumes a FPLOC can accommodate, the more applications can be implemented. The optimized gap distance can be adjusted to fit the desired sizes of the droplets. In the present invention, the optimized gaps can be implemented in three approaches: First, all the droplets can be manipulated without touching the top plate 710. This approach is generally applied to the coplanar structure. In a second approach, all droplets can be manipulated by touching the top plate 710 that droplets are sandwiched between the top plate 710 and the electrode plate 720. The second approach is generally applied to bi-planar structure. The third approach or a hybrid approach incorporates the functions of coplanar structure and an adjustable gap between the top cover 710 and the coplanar electrode plate 720. This hybrid approach can be used to provide the droplets with the widest range. As shown in FIG. 7, the droplet 730 and droplet 740 sit within the gap are manipulated without touching the top plate 710. The droplet 750 is manipulated to be sandwiched between the top plate 710 and the electrode plate 720. This invention is not limited to the EWOD microelectrode array architecture technique. It can also be applied to other conventional electrode plates while the applicable ranges of the droplet sizes may be limited.

Figure 8:
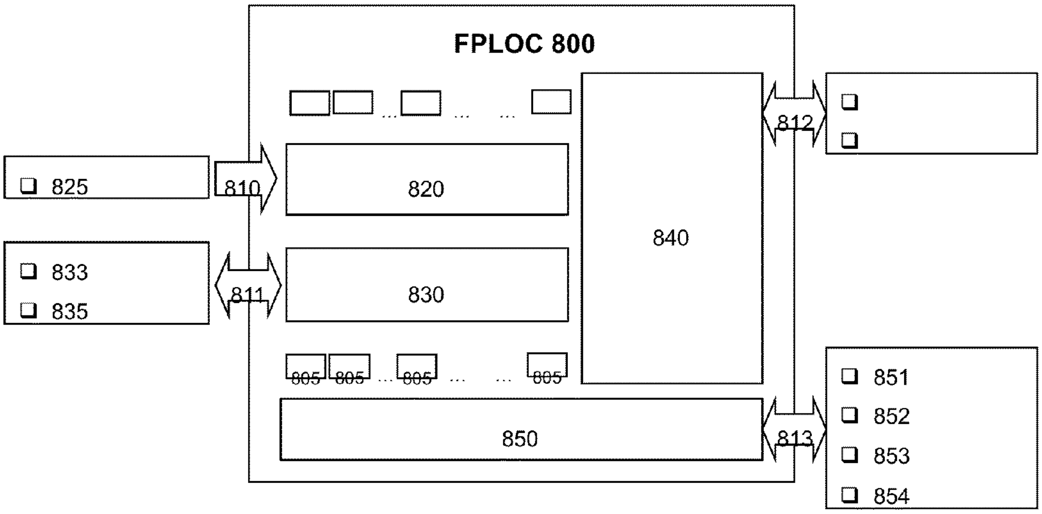
FIG. 8 is a diagram showing the five fundamental functional blocks needed for a FPLOC.

In one embodiment of the FPLOC 800, there are five fundamental functional blocks needed for a FPLOC as shown in FIG. 8, including I/O ports (810, 811, 812, and 813), sample preparation 820, droplet manipulations 830, detection 840 and system control 850. Embodiments of the five functional blocks of FPLOC are disclosed in details in following sections.

The input/output ports (810, 811, 812, and 813) are the interface between the external world and the FPLOC 800. In another embodiment, there are four types of input/output ports for the FPLOC that associated with the four functional blocks: Sample Input port 810, Droplet I/O port 811, Detection I/O port 812, and System Control I/O port 813 as indicated in FIG. 8.

Figure 9A:
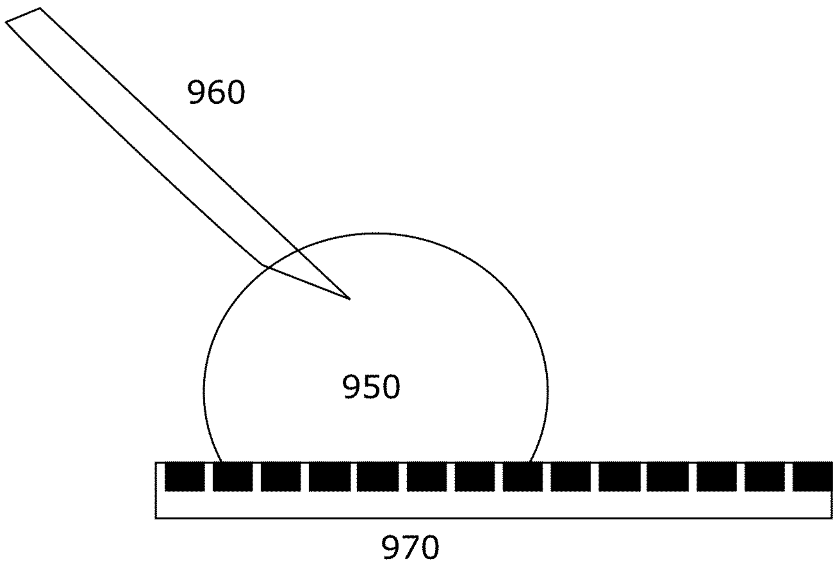
FIGS. 9A, 9B, 9C, and 9D show the loading of the sample with an adjustable and another hinged passive cover.
Figure 9B:
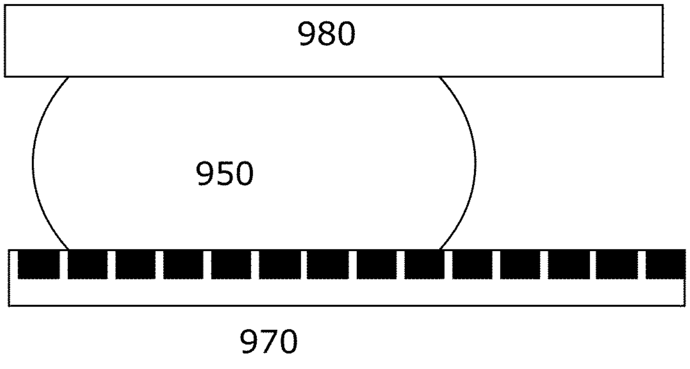
Figure 9C:
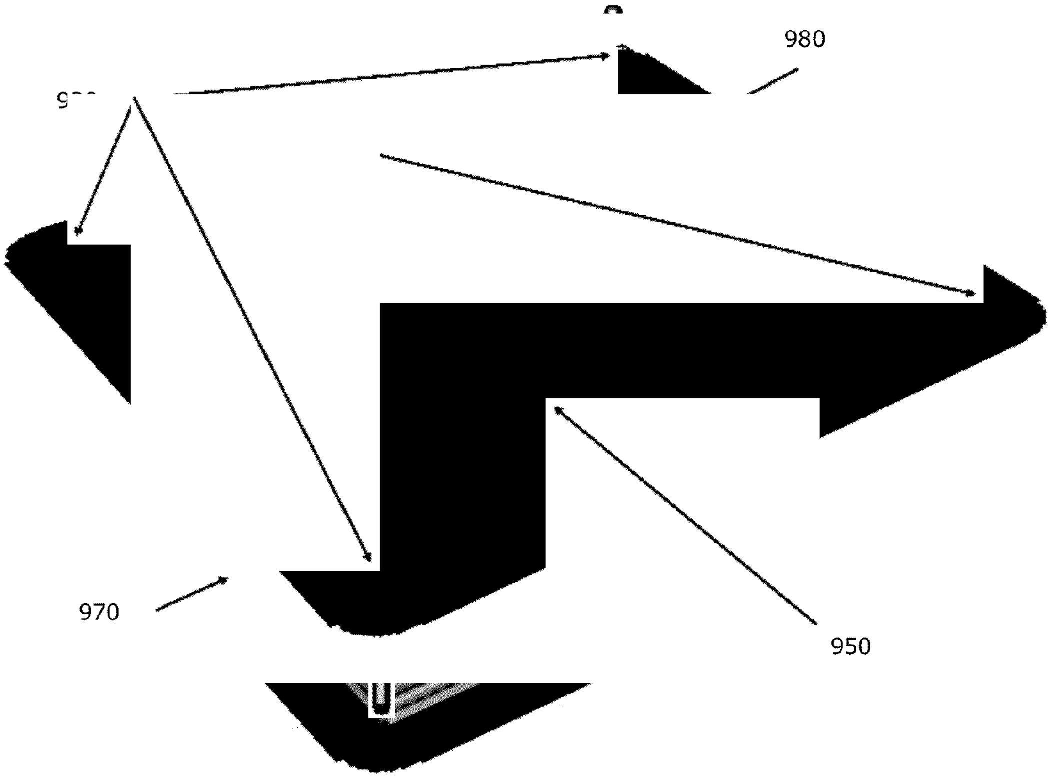
Figure 9D:
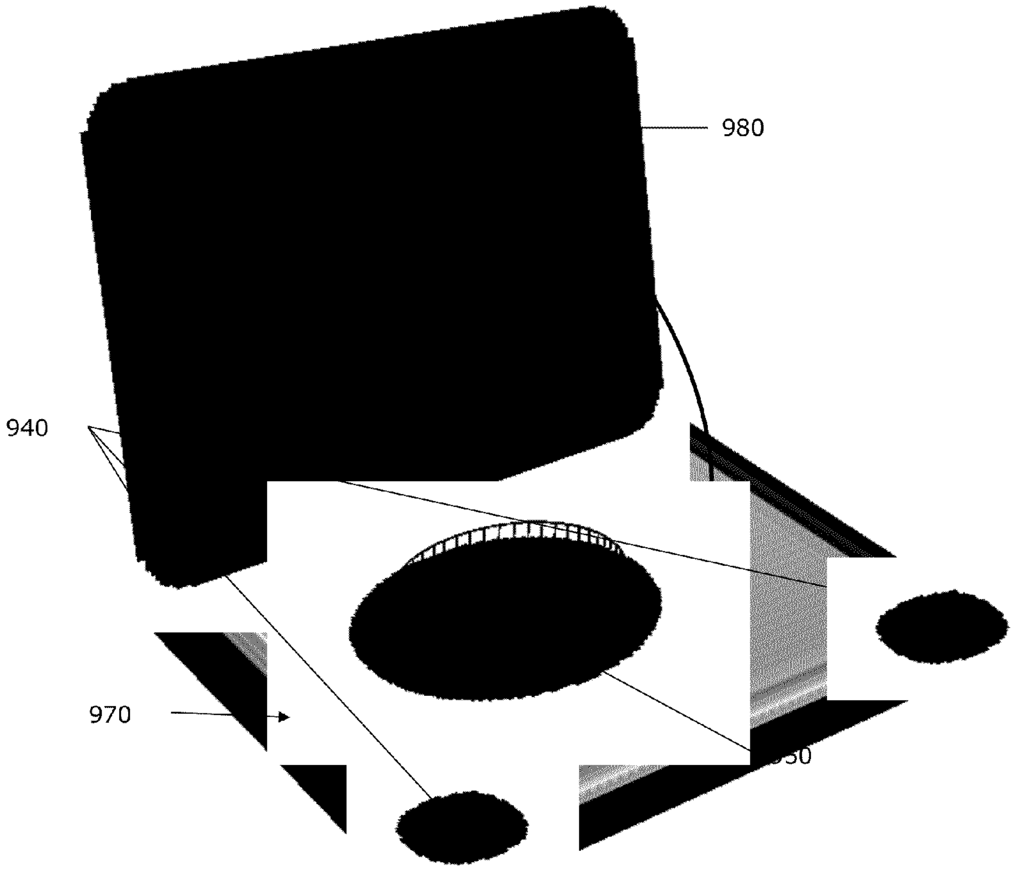

Sample Input port (810 in FIG. 8): The design of the fluidic input port is challenging due to the huge discrepancy in the scales of real world samples (microliters) and the lab-on-a-chip (nanoliters). Loading samples (825 in FIG. 8) and reagents (833 in FIG. 8) onto LOC requires an interface between the microfluidic device and the outside world. One embodiment of the present invention is based on the hybrid plate structure that the cover can be added after the samples or reagents are loaded onto the FPLOC so there is no need for fixed input ports. FIG. 9A shows the loading of the sample 950 by a needle 960 directly onto the coplanar electrode plate 970. The loading of the sample don't have to be very precise because if necessary the locations of the reservoirs can be adjusted dynamically to compensate the physical loading deviation. FIG. 9B indicates a passive cover 980 is put on after the sample 950 is loaded. FIG. 9C shows one embodiment of the invention that adjustable spacers 930 at the four corners of FPLOC to adjust the gap height between the cover plate 980 and the electrode plate 970. Droplet 950 is sandwiched in between. FIG. 9D shows another embodiment of the invention that FPLOC employing a hinge device 940 to connect the cover plate 980 and the electrode plate 970 for the convenient loading of samples and reagents 950, and a better physical system integration.

Droplet I/O port (811 in FIG. 8): In one embodiment of the invention, reagent cartridges (833 in FIG. 8) are connected to FPLOC through Droplet I/O ports. Wastes (835 in FIG. 8) can be stored in waste reservoirs on FPLOC 800 or can be flushed out through the waste ports (811 in FIG. 8).

Figure 10:
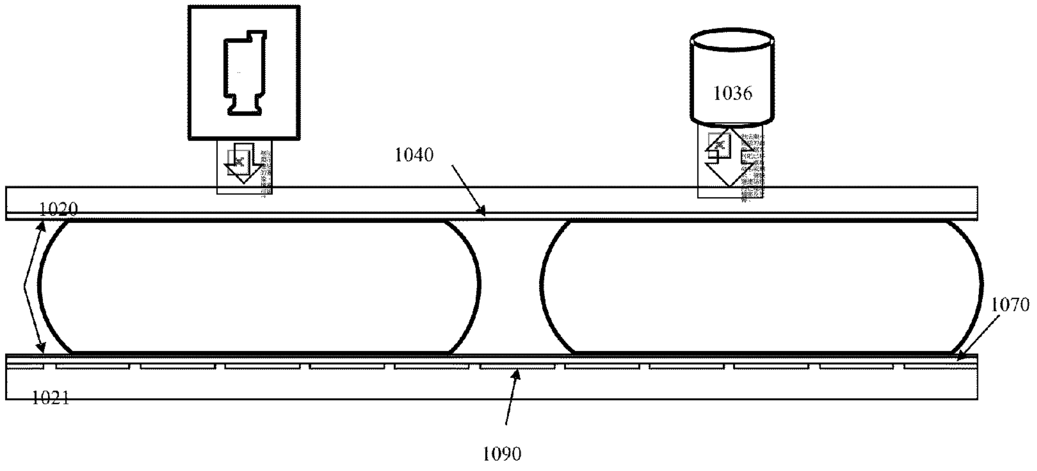
FIG. 10 is a diagram showing the Detection I/O port

Detection I/O port (812 in FIG. 8): An increasing number of research papers looking at the integration of detections into microfluidic chips especially for those technologies that scale better upon miniaturization than absorbance or fluorescence detection. Nonetheless, some mature and stable detection technologies like optical detections (1035 in FIG. 10) which may include use of Video detection and Laser induced fluorescence analysis (LIF) and magnetic nanoparticle detections (1036 in FIG. 10) will not be easy to be integrated into the FPLOC. Due to the robustness, high signal-to-noise ratio, and sensitivity, the optical detection methods still dominate over others for LOC. Optical detection is easiest to integrate with the electrowetting-based LOC platform. It only requires making all the materials including top plate 1020, bottom plate 1021, dielectric layers 1040 and 1070, and the electrodes 1090 clear in areas that are to be used for optical detection. The coplanar design can accommodate more sensing mechanisms from above and thus allows increased flexibility for system development. We will have the detection I/O ports (812 in FIG. 8) for the external detection purpose. Detection I/O ports may also serve the purpose of optical sensing and feedback to control the rapid liquid motions inside the FPLOC.

System Control I/O port (813 in FIG. 8): In one embodiment of the invention, System Control I/O port 813 is needed for programming the chip 851, displaying the test results 852, data management 853 and many other system works as shown in FIG. 8. If necessary peripherals 854 such as a printer, USB memory storages, or a network interface can be connected to the FPLOC through the system control I/O port. FPLOC also connects to power sources through System control I/O port to provide the necessary AC/DC powers.

Figure 11A:
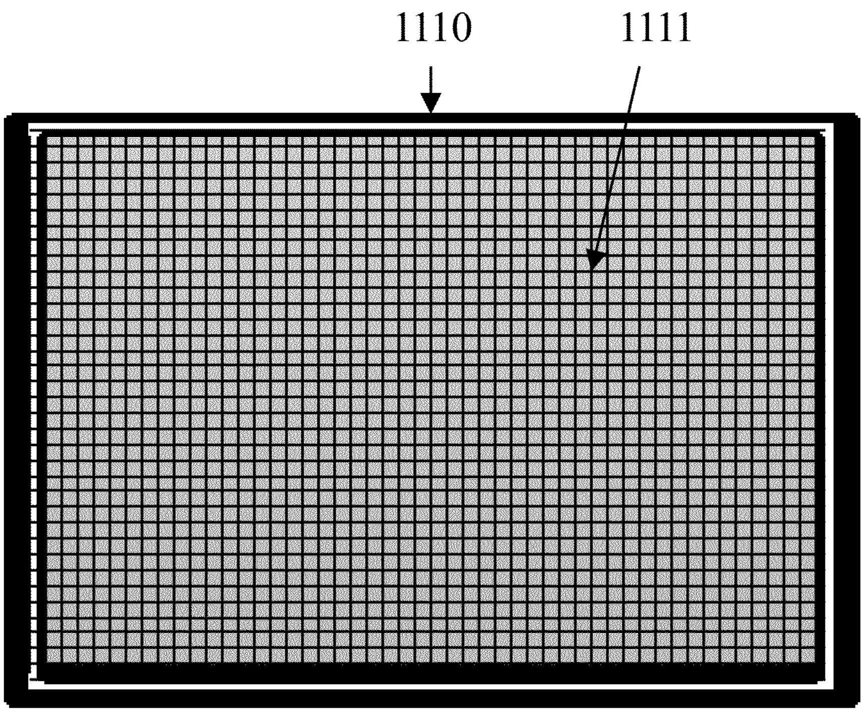
FIGS. 11A and 11B show FPLOC uses the Field-programmable Permanent Display technique to display the test results or other important messages.
Figure 11B:
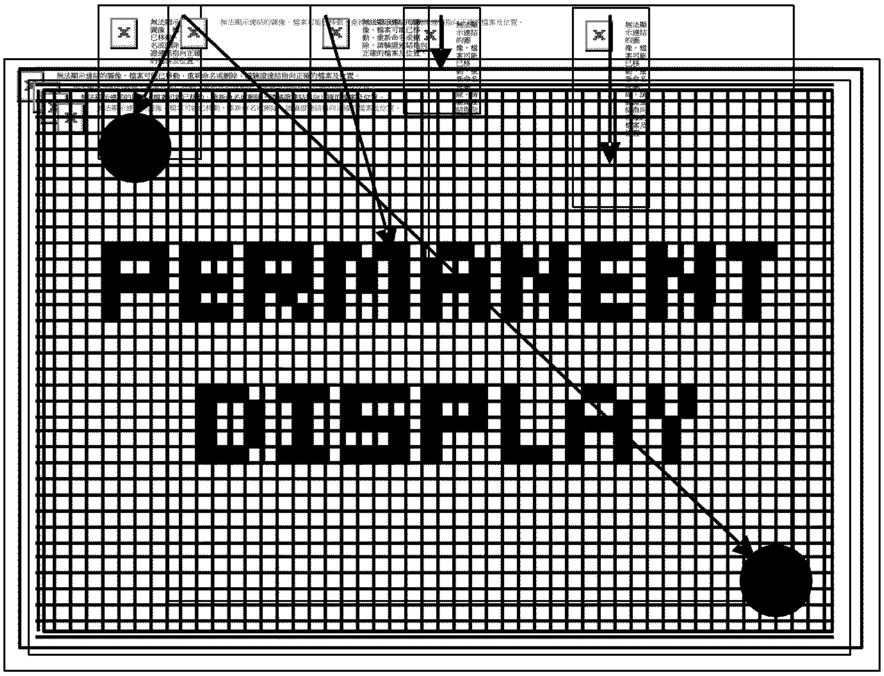

In one embodiment of the invention, FPLOC uses the Field-programmable Permanent Display technique to display the test results or other important messages as illustrated in FIGS. 11A and 11B and no external display devices required. In FIG. 11A, the display ink frame 1110 is not touched when the system is performing other microfluidic operations by activating or deactivating microelectrodes 1111. After the test or targeted microfluidic operations are done, then droplets created from the black ink (or other colors and liquids) frame 1114 in FIG. 11B are moved into the right locations to display graphics or texts. Two advantages of this embodiment: (1) almost no extra cost for displaying the test results or other massages because the electrodes for test or other microfluidic operations are used as the display pixels, and (2) the display is permanent even if the power is cut off from the microactuators, so it can be used as a test records.

Figure 12B:
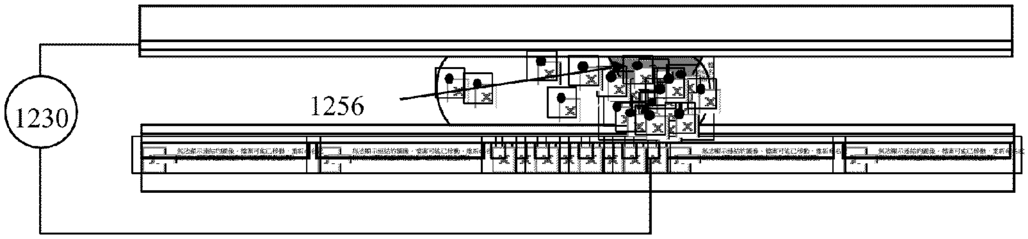
FIGS. 12B and 12C are the cross section views showing a high frequency signal applied to the strip configured-electrodes from left to right; the non-uniform electric field inside the droplet drives the particles to the right by DEP.
Figure 12C:
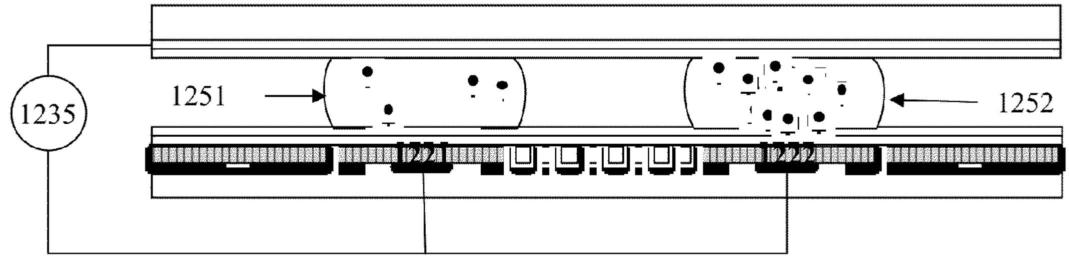
Figure 12D:
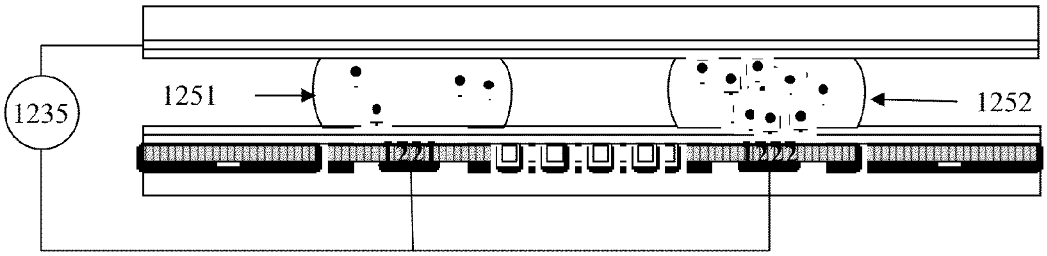
FIG. 12D shows a low frequency signal applied on the square configured-electrodes to generate two sub droplets with different particle concentrations by EWOD.

Sample Preparation (820 in FIG. 8): The main topics under sample preparation would be the separation of cells from whole blood to obtain serum or plasma, and sample pre-concentration. Sample pre-concentration becomes essential in assays where the molecules which to be detected are very small in number. Sample dilution is done primarily for two reasons: to reduce the effect of interfering substances and to increase the linear range of operation of devices. To date, a wide variety of techniques have been employed for the separation of particles and cells, utilizing acoustic forces, magnetic forces, optical forces, Capillary Electrophoresis (CE), dielectrophoretic (DEP) forces, etc. One embodiment of the invention is illustrated as top view in FIG. 12A that droplet 1250 and suspended particles are actuated by configured-square-electrodes (1210, 1211, 1212, and 1213) and configured-strip-electrodes (1220, 1221, 1222, 1223, 1224, 1225, and 1226) by EWOD and DEP, respectively. "Configured" means the FIGS. 12B and 12C are the cross section views that by applying a high frequency signal (VHF) 1230 on the strip electrodes from left to right (1220 to 1226), the non-uniform electric field 1256 inside the droplet drives the particles to the right by DEP. By applying a low frequency signal (VLF) 1235 on the square electrodes 1221 and 1222, two subdroplets 1251 and 1252 are obtained by EWOD with different particle concentrations. As examples, the particles attracted by positive DEP when a 2 MHz and 60 Vrms signal 1230 is applied on one of the strip electrodes from left to right. After the cells are concentrated to the right side in the droplet, the droplet is split into two sub-droplets by EWOD with 80 Vrms and 1 kHz applied on the two configured-square-electrodes. As a result, by energizing the strip electrodes with a single cycle from left to right, the cells are concentrated (right sub-droplet 1251) or diluted (left sub-droplet 1251) as in FIG. 12D.

Figure 13:
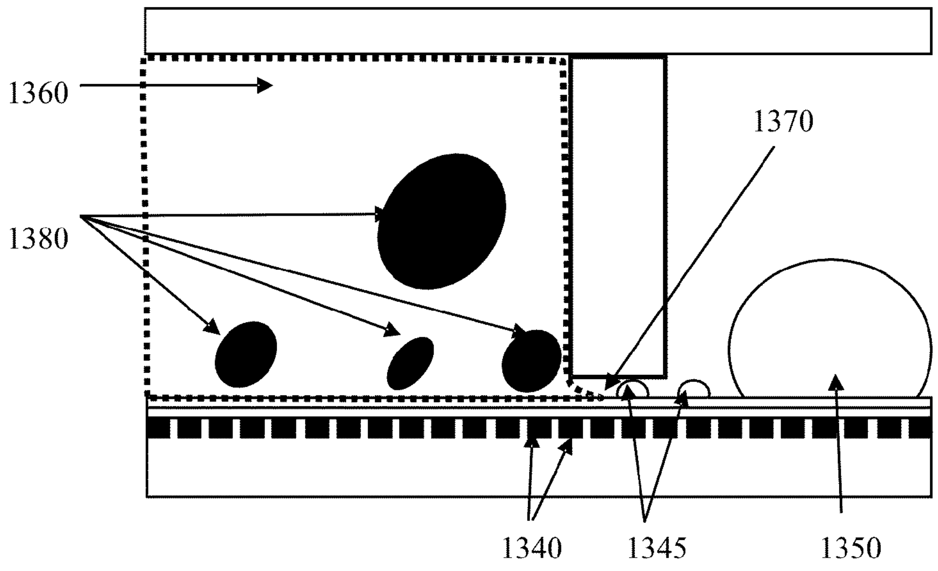
FIG. 13 illustrates another embodiment of FPLOC sample preparation using droplet aliquots technique.

FIG. 13 illustrates another embodiment of FPLOC sample preparation using droplet aliquots technique. One of the common sample preparation steps is the removing of blood cells from the full blood to get plasma for the immunoassay. As shown in FIG. 13, using the droplet aliquots technique through microelectrodes 1340 to create smaller droplet which is too small to carry some or any of the blood cells 1380 then move the small droplets 1345 through the small-scaled vertical gap 1370 to form a desire droplet 1350. The combination of the droplet aliquots technique and the small gap 1370 can efficiently move the small droplets 1345 from the reservoir/droplet 1360 through the channel 1370 to form a bigger droplet 1350 while blood cells 1380 are blocked. The physical obstacle here is mainly used to help droplet aliquots technique and it could be different shapes than square to create smaller droplet with microelectrode. It is not used as the main cause of the removal of the blood cells. By using droplet aliquots technique, this sample preparation invention not only can remove the particles from the droplet but also can prepare the right-sized droplets for diagnostic test.

Droplet Manipulation (830 in FIG. 8): In yet other embodiments, all typical microfluidic operations can be performed by configuring and controlling of the "configured-electrodes" of FPLOC. "Microfluidic operations" means any manipulation of a droplet on FPLOC. A microfluidic operation may, for example, include: loading a droplet into the FPLOC; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; disposing of a droplet; transporting a droplet out of FPLOC; other microfluidic operations described herein; and/or any combination of the foregoing.

In yet another embodiment, besides the conventional control of the "configured-electrodes" of FPLOC to perform typical microfluidic operations, special control sequences of the microelectrodes can offer advanced microfluidic operations in manipulations of droplets. Advanced microfluidic operations of FPLOC may include: transporting droplets diagonally or in any directions; transporting droplets through the physical gaps by Interim Bridging technique; transporting droplets by Electrode Column Actuation; Washing out dead volumes; transporting droplets in lower driving voltage situation; transporting droplets in controlled low speed; performing precise cutting; performing diagonal cutting; performing coplanar cutting; merging droplets diagonally; deforming droplets to speed mixing; improving mixing speed by uneven back-and-forth mixer; improving mixing speed by circular mixer; improving mixing speed by multilaminates mixer; other advanced microfluidic operations described herein; and/or any combination of the foregoing.

Liquid Storage and Droplet Creating: Liquids from the input ports are stored in reservoirs. Reservoirs can be created on EWOD devices in the form of large electrode areas that allow liquid droplet access and egress. The basic LOC should have a minimum of three reservoirs—one for sample loading, one for the reagent, and one for collecting waste droplets, but this depends on the application. A fourth reservoir might be needed for a calibrating solution. Each reservoir should have independent control to allow either creating of droplets or their collection.

Figure 14A:
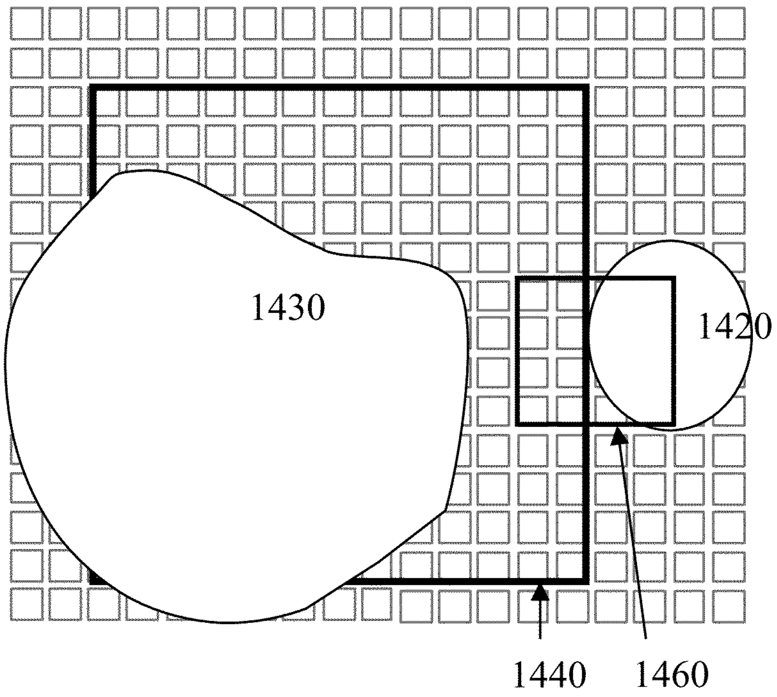
FIGS. 14A and 14B show the capability to self-adjust the position of the loaded samples or reagents to the reservoirs.
Figure 14B:
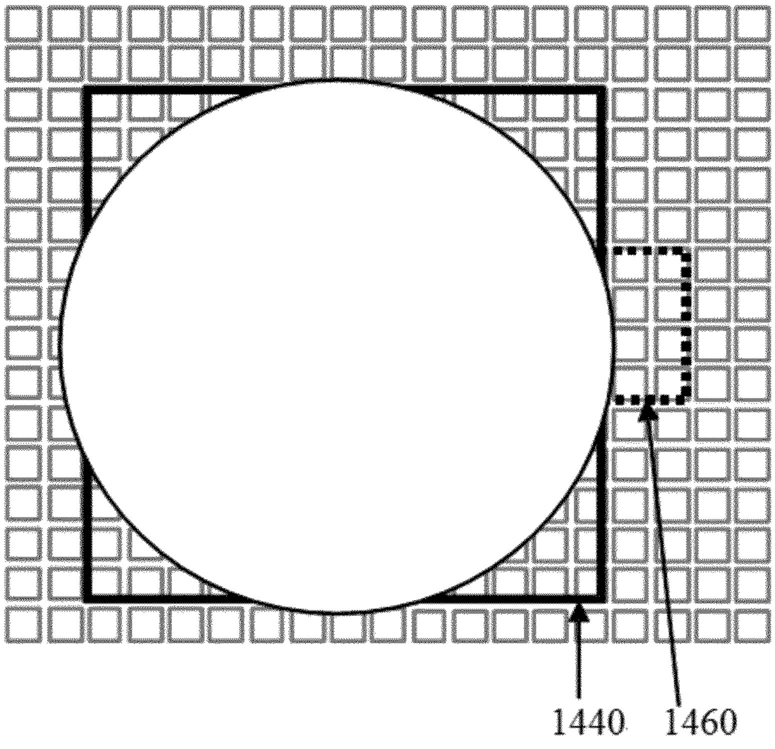

In another embodiment, FPLOC has the capability to self-adjust the position of the loaded samples or reagents to the reservoirs. This means the need of a precisely positioned input port and the difficulties to handle the samples and reagents through the input port to the reservoir can be avoided. FIG. 14A shows the loaded samples are broken into droplet 1420 and droplet 1430 and both are not precisely positioned on top of the reservoir 1440. Droplet 1420 doesn't even have any overlap with reservoir 1440. For a conventional LOC, it's difficult to re-position the droplet 1420 into the reservoir 1440. This self-positioning embodiment of the invention can be done even if the sample droplet 1420 is loaded away from the reservoir by activating an interim configured-electrode 1460 to pull the droplet 1420 into the overlap of reservoir 1440. Then subsequently deactivating interim configured-electrode 1460 and activating reservoir 1440 to position sample correctly into the reservoir as indicated in FIG. 14B.

Figure 15:
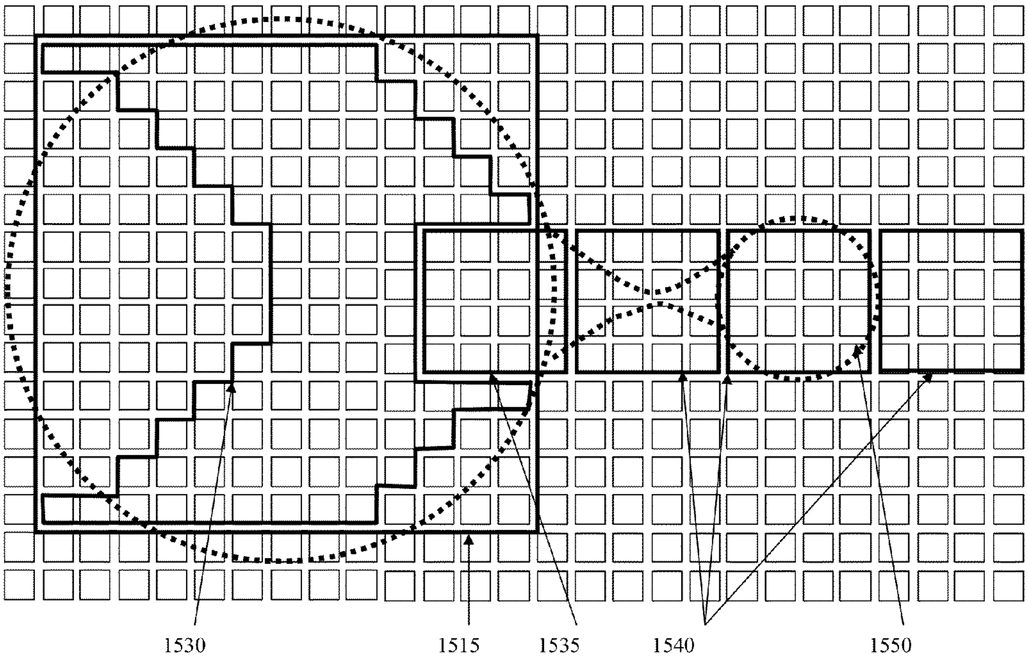
FIG. 15 represents the one embodiment of FPLOC droplet creation procedure.

FIG. 15 represents the one embodiment of FPLOC droplet creation procedure. Conventionally, special shaped reservoir 1530 and an overlapped electrode 1535 are a must to create droplets. In the present invention, the shape of the reservoir 1530 can be a square-shaped reservoir 1515 and don't need an overlapped electrode 1535. In another embodiment, the shape of the reservoir 1515 can be any other shape depending on the design needs by designing the array of the microelectrodes. As shown in FIG. 15, the creation of the droplet refers to the process of extruding the droplet 1550 out from the square-shaped reservoir 1515. To start the droplet creation procedure, interim electrode 1530 is activated first as the pull-back electrode and then another interim electrode 1535 is activated to extrude the liquid. Subsequently, through the activation of adjacent serial configured-electrodes 1540 by extruding a liquid finger from the reservoir 1515 and eventually creating droplet 1550. Each of the configured-electrodes 1540 is composed of a configured 4×4 microelectrode square. In the present invention, the dimensions of the configured-electrodes 1540 can be in a range from tens of micro-meters to several mini-meters but not limited to this range. The shape of the configured-electrodes can be square or other shapes. In the present invention, the reservoirs can be square, round or special-shaped.

Figure 16:
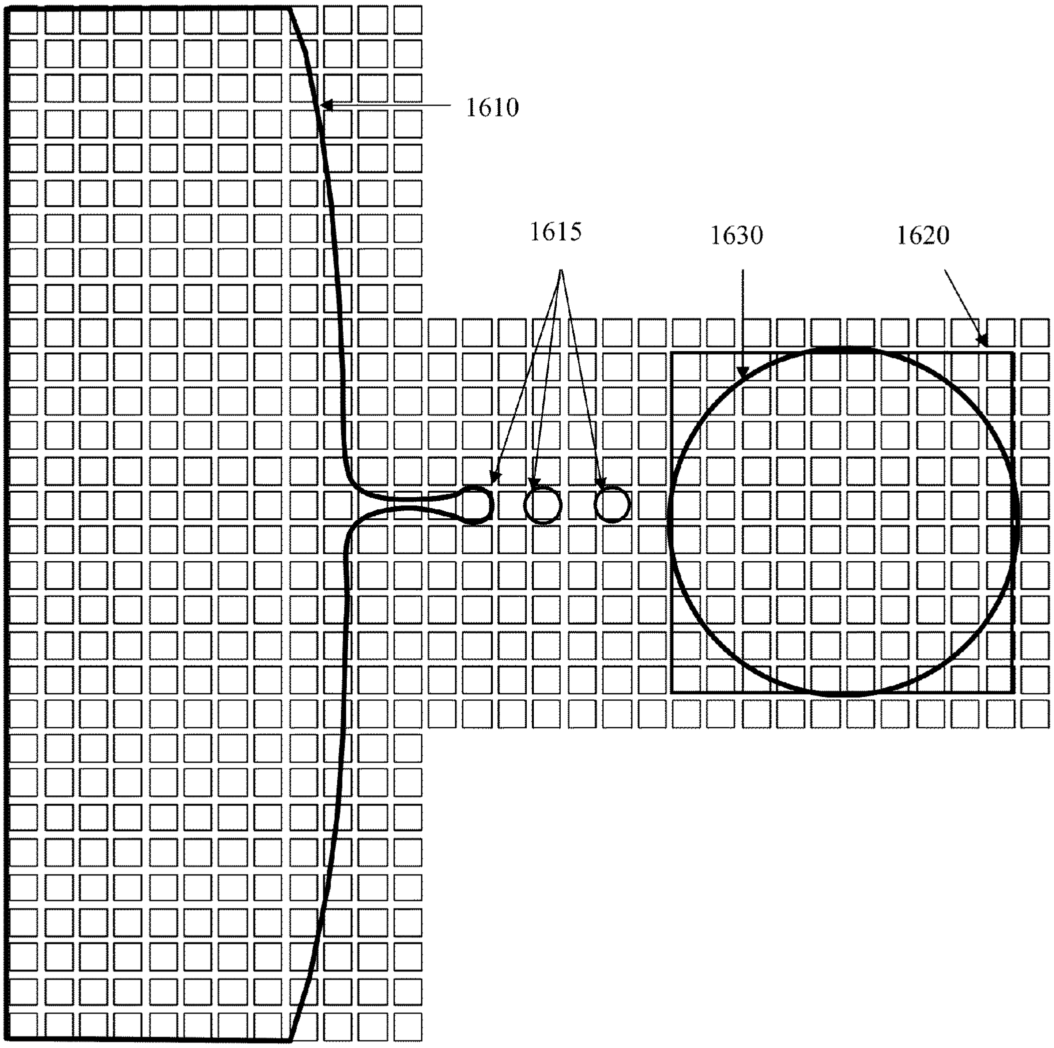
FIG. 16 illustrates the special droplet creation procedure called "droplet aliquots".

FIG. 16 illustrates the embodiment of a special droplet creation procedure called "droplet aliquots" of the present invention. Droplet aliquots is to use the Microelectrode Array Architecture to create smaller droplets 1615 first from reservoir 1610 by microelectrodes or smaller configured-electrodes and then collect the smaller droplets 1615 together by activating configured-electrode 1620 to form a bigger droplet 1630. Conventionally, droplet sizes are approximated to the sizes of the electrodes and a more precise way to control the volumes of the droplets doesn't exist. Droplet aliquots can be used to do more precise control of the volumes of the droplets. Also, in a reverse way, this technique can be used to measure the volume of the bigger droplet 1630, in a way to count how many smaller droplets 1615 can be created from droplet 1630 as indicated in FIG. 16.

Figure 17:
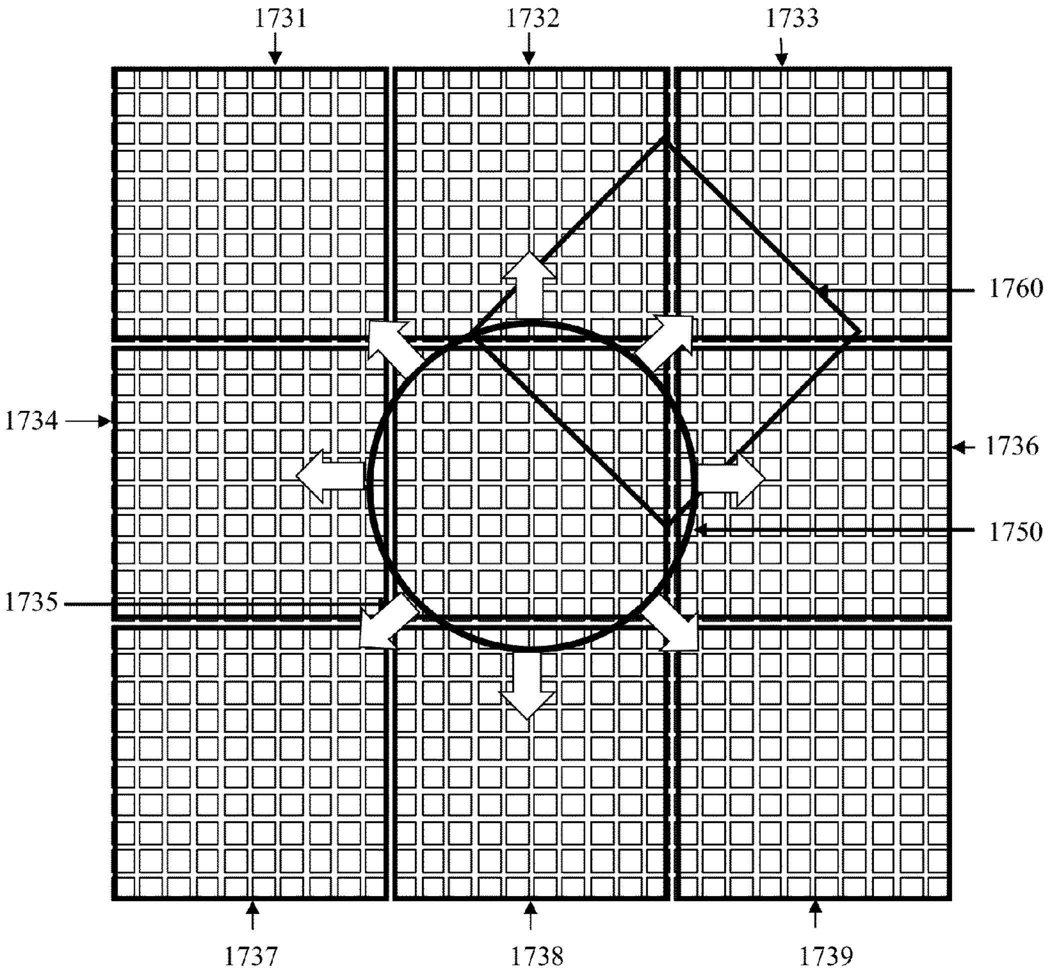
FIG. 17 is a diagram showing the transportation of droplet of FPLOC.

Transport of droplets: FIG. 17 is a diagram showing the embodiment of the transportation of droplet of FPLOC. As illustrated there are 9 adjacent configured-electrodes 1731 to 1739. Each of the configured-electrodes is composed of a configured 10×10 microelectrode squares. The droplet 1750 lies on top of the center configured-electrode 1735. In a conventional microfluidic transportation operation, droplet 1750 can only be actuated from configured-electrode 1735 in north-south and east-west directions under this square-electrode setting. For example by activating configured-electrode 1734 and deactivating configured-electrode 1735 will move the droplet from configured-electrode 1735 onto configured-electrode 1734. Nonetheless, this conventional operation will not be able to move droplet 1750 diagonally from configured-electrode 1735 onto anyone of configured-electrodes 1731, 1733, 1737, or 1739 because these four configured-electrodes have no physical overlap with droplet 1750. This droplet-doesn't-cover-the-4-corners limitation is always true for droplets created from typical droplet creation processes. In order to move diagonally, one embodiment is to activate configured-electrode 1760 as the interim step, and then subsequently activate the desired configured-electrode 1733 and deactivate the interim configured-electrode 1760 so therefore can move the droplet 1750 diagonally into the desired configured-electrode 1733. As shown in FIG. 17, based on this invention the droplet 1750 can be moved in all 8 directions in a square-electrode setting. Also, the transportation of the droplet is not limited to the 8 directions. If a adjacent configured-electrode is outside of these 8 directions, an interim configured-electrode still can be activated to transport the droplet into the destination.

Figure 18:
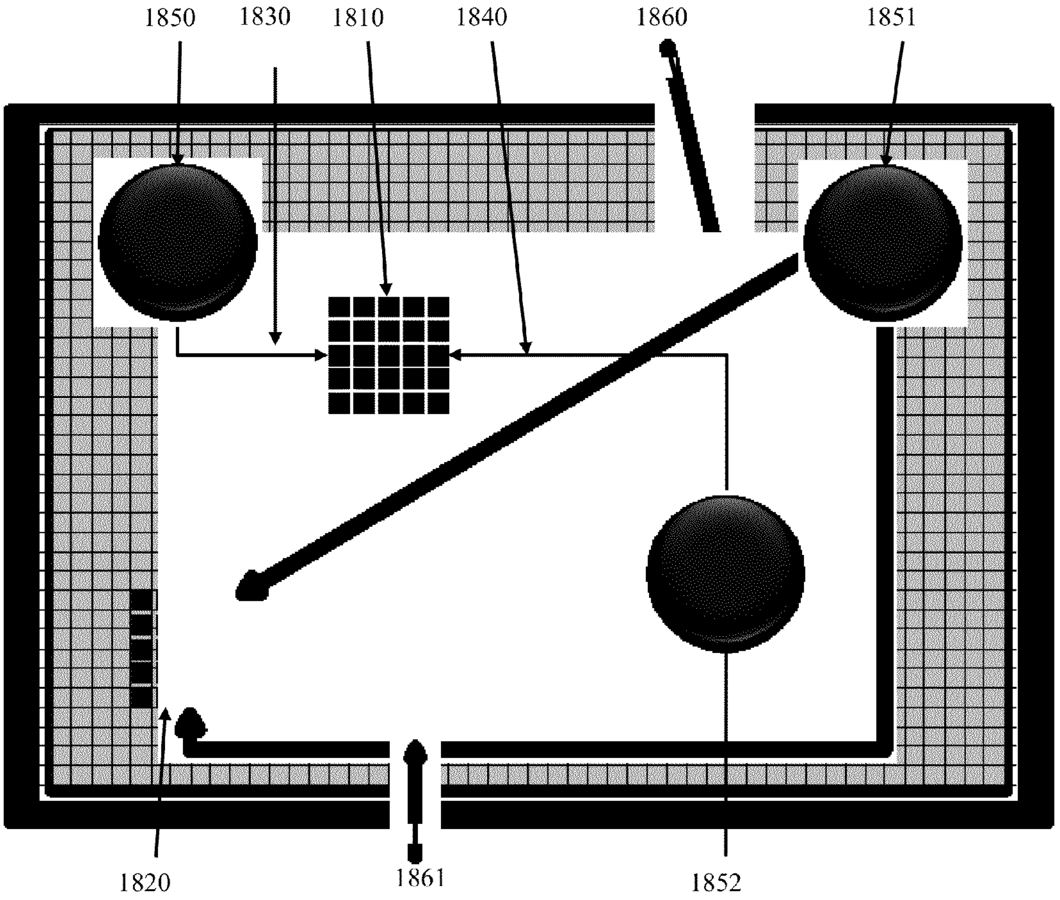
FIG. 18 is a diagram showing the Droplet routing of FPLOC.

Droplet routing: Conventionally, a LOC has transportation path electrode 440 to connect different parts of the LOC to transport the droplets as shown in FIG. 4A. One embodiment of the droplet routing for LOC doesn't require the fixed transportation paths for transporting droplets as illustrated in FIG. 18. Instead, droplet routing is used to move multiple droplets simultaneously from multiple beginning locations to the destinations. Notably the routing process for FPLOC will be very different and efficient than the conventional microfluidic designs, because by activating different microelectrodes virtually can move in any directions including diagonal moves. Droplets 1850, 1851 and 1852 are at their beginning positions as indicated in FIG. 18. Droplet 1850 and droplet 1852 will be mixed at configured-electrode 1810 and droplet 1851 will be transported to configured-electrode 1820. Unlike traditional VLSI routing problems, in addition to routing path selection, the biochip routing problem needs to address the issue of scheduling droplets under the practical constraints imposed by the fluidic property and the timing restriction of the synthesis result. If contamination is not a concern then droplet 1851 can be moved 1$^{st}$ by taking the route of 1860 and droplet 1852 can be moved by taking the route of 1840. Cares needed here to arrange the transporting timing of droplet 1851 and 1852 so they don't collide together while moving to their destinations. If contamination is a concern then 1851 might take the route of 1861 to avoid any overlap of droplet moving routes. Also, for the two droplets 1850 and 1852 to merge at configured-electrode 1810, cares might be needed to arrange the timing of droplet actuations so the lengths differences of route 1830 and route 1840 can be taken into consideration and to have a best mixing result. When the applications performed on FPLOC becoming more sophisticated, top-down design automation will be require defining the routing and timing of droplets on FPLOC. After the biomedical microfluidic functions have been defined then architectural-level synthesis is used to provide the microfluidic functions to FPLOC resources and to map the microfluidic functions to the time steps of actuations.

Figure 19A:
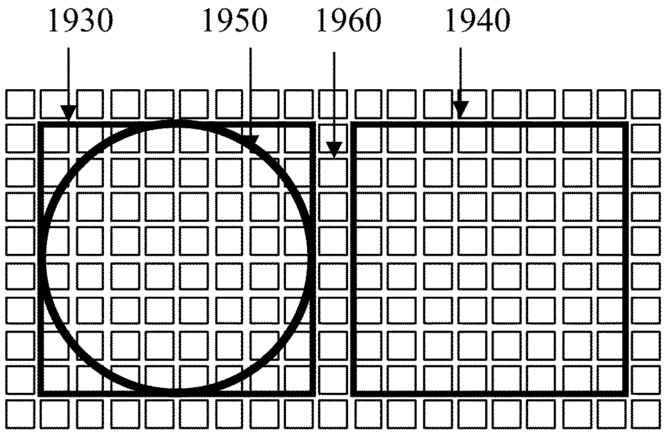
FIGS. 19A, 19B and 19C are diagrams showing the transportation of a droplet using interim bridging procedure of FPLOC.
Figure 19B:
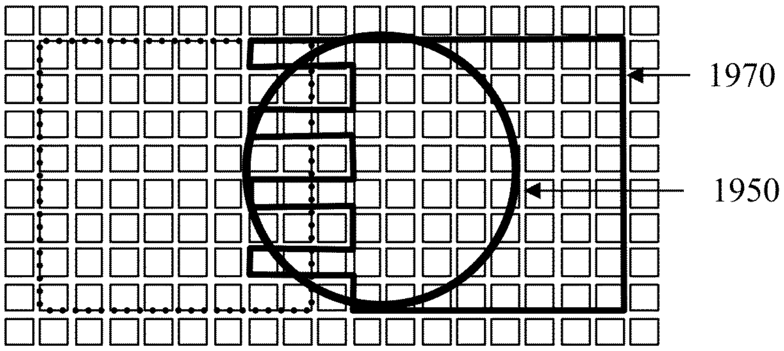
Figure 19C:
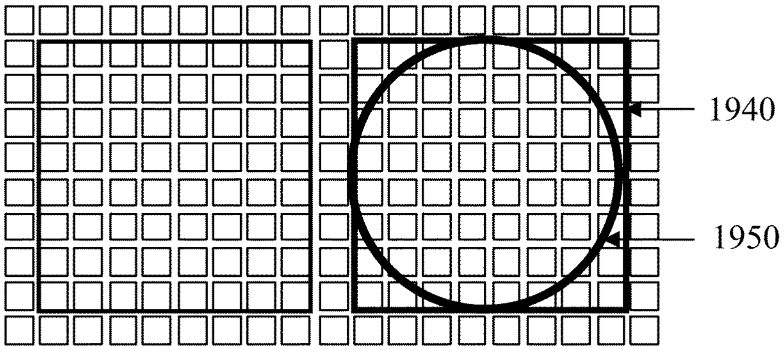

Interim Bridging: Another embodiment of the invention in the transportation and movement of the droplet with FPLOC called "Interim bridging technique" is illustrated in FIGS. 19A-19C. Droplet cutting and evaporation sometimes can make the droplet too small and the droplet can't be actuated reliably by electrodes. FIG. 19A indicates two configured-electrodes 1930, 1940, respectively, which are separated by a gap 1960. The droplet 1950 sits on the left-side configured-electrode 1930. The gap 1960 between the two configured-electrodes 1930 and 1940 is wide enough to segregate the two configured-electrodes 1930, 1940 so the droplet 1950 sits on the left-side configured-electrode 1930 would not touch the next adjacent configured-electrode 1940. FIG. 19A shows that under the conventional droplet transportation, the movement of droplet 1950 from configured-electrode 1930 into configured-electrode 1940 generally fails since the configured-electrode 1940 doesn't have a physical overlap with droplet 1950 to change its surface tension. FIG. 19B illustrates the transportation of the droplet 1950 from FIG. 19A into the desired configured-electrode 1940. In this procedure, the microelectrodes covered by the "toothed" area 1970 are activated. The toothed configured-electrode 1970 covers partially the left-side configured-electrode 1930, gap 1960, and the entire next configured-electrode 1940. As shown in FIG. 19B, the "toothed" configured-electrode 1970 has a physical overlap with droplet 1950 and the activation of configured-electrode 1970 will move the droplet 1950 on top of configured-electrode 1970 as shown in FIG. 19B. FIG. 19C illustrates the completion of the droplet transportation to the desired configured-electrode 1940. After the droplet 1950 is moved to the desired configured-electrode 1970, the "toothed" configured-electrode 1970 is de-activated and the next configured-electrode 1940 is activated to position and locate the droplet 1950 into the desired square-shaped configured-electrode 1940.

Figure 20A:
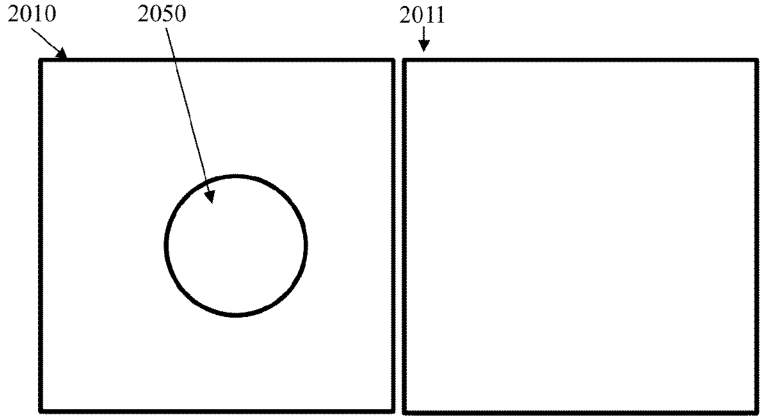
FIGS. 20A, 20B and 20C are diagrams showing the Electrode Column Actuation.
Figure 20B:
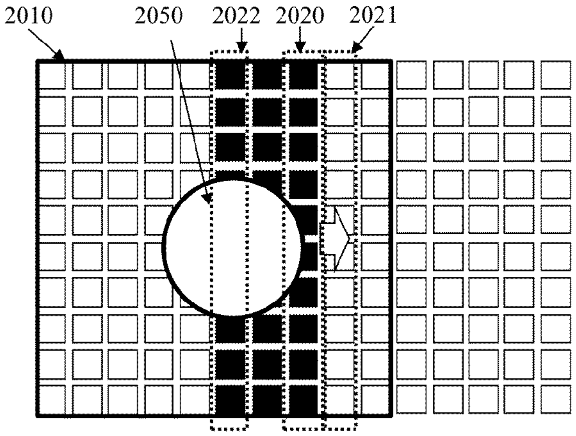
Figure 20C:
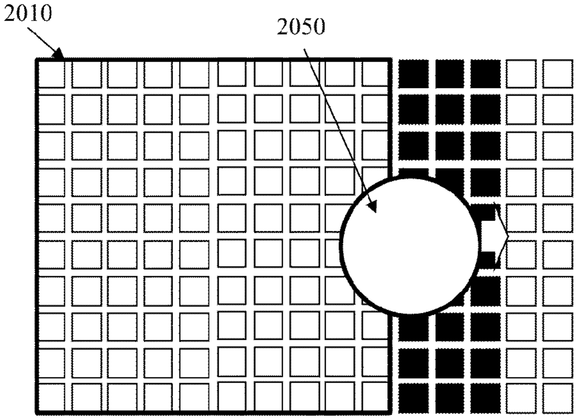

Electrode Column Actuation: Yet, another embodiment of the invention in the transportation and movement of the droplet with FPLOC is called "electrode column actuation". Droplet cutting and evaporation sometimes can make the droplet too small and the droplet can't be actuated reliably by electrodes. As illustrated in FIG. 20A, sometimes the droplet 2050 becomes so small that it is smaller than the electrode 2010 and has no physical overlap with the adjacent electrode 2011. In this situation even if electrode 2011 is activated the droplet 2050 still can't be moved into electrode 2011 and the droplet is stuck in the system. One effective way to flush out the stuck droplets is to use the electrode column actuation. The actuating electrodes are arranged into columns to perform the electrode column actuation as shown in FIG. 20B. Here, each configured-electrode column 2020 is composed of 1×10 microelectrodes and 3 configured-electrode columns are grouped together to perform the electrode column actuation as marked black in FIG. 20B. The default column width is one microelectrode but can be other numbers depends on the applications. The most effective electrode column actuation is to have a group of columns that has the width a little bit larger than the radius of the droplet. This is the reason why 3 columns are grouped together here. And the length of the column depends on the application and normally the longer the better. For this 3-column configuration to move the droplet 2050, the configured-electrode column 2021 in front of the leading configured-electrode column 2020 is activated and the trailing configured-electrode column 2022 is deactivated. In this way, regardless the sizes of the droplets, the 3 configured-electrode column always provides a maximum effective length of the contact line. As a result, the droplet can be moved efficiently and smoothly because the capillary force on the droplet is consistent and maximized. So the droplet can be moved in a much lower driving voltage than the conventional droplet operations. This electrode column actuation technique can be used to transport droplets with smooth movement in much lower driving voltage. Also, because the consistent capillary force of this technique, it can be used to do the control of the droplet speed especially in low speed situations by advancing the configured-electrode column in low speed. Experiments showed that under marginal driving voltages, this smooth and effective driving capability of the electrode column actuation is more obvious. Slowly but steadily moving DI water droplet (1.1 mm diameter) in 10 cSt silicon oil has been observed below 8 Vp-p 1 k Hz square driving voltage with 80 μm gap. The length can be configured to be the full length of the LOC that a single sweep of the electrode column actuation can wash out all dead droplets in the LOC. FIG. 20C shows the small droplet 2050 is moved out of configured-electrode 2010.

Figure 21A:
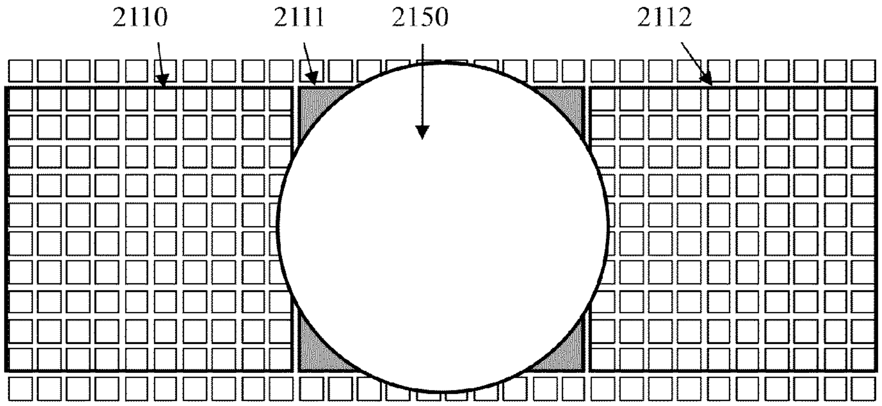
FIGS. 21A, 21B and 21C are diagrams showing the cutting of a droplet of FPLOC.
Figure 21B:
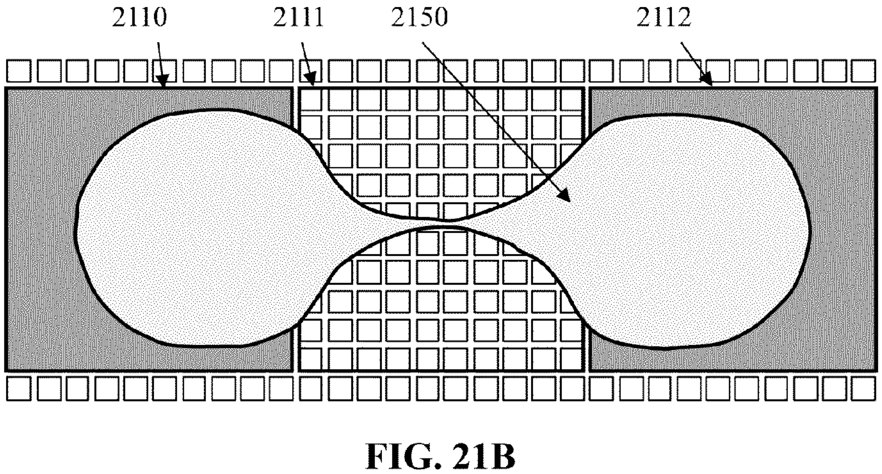
Figure 21C:
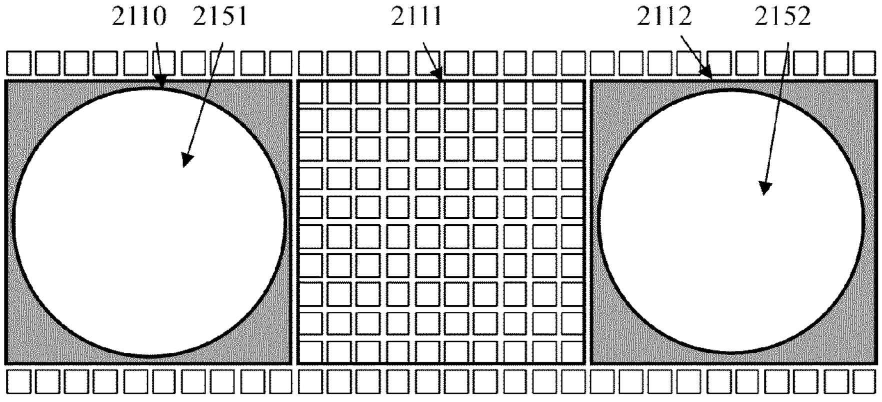

Droplet Cutting: For cutting a droplet three configured-electrodes are used for FPLOC. One embodiment of the present invention for performing a typical 3-electrode cutting of a droplet of FPLOC is shown in FIGS. 21A-21C. Three configured-electrodes are used and the droplet to be cut sitting on top of the inner configured-electrode 2111 in FIG. 21A and has partial overlaps with outer configured-electrodes 2110 and 2112. During cutting, the outer two configured-electrodes 2110 and 2112 are activated and with the inner configured-electrode 2111 deactivated and the droplet 2150 expands to wet the outer two electrodes. In general, the hydrophilic forces induced by the two outer configured-electrodes 2110 and 2112 stretch the droplet while the hydrophobic forces in the center pinch off the liquid into two daughter droplets. 2151 and 2152 as shown in FIG. 21C.

Figure 22A:
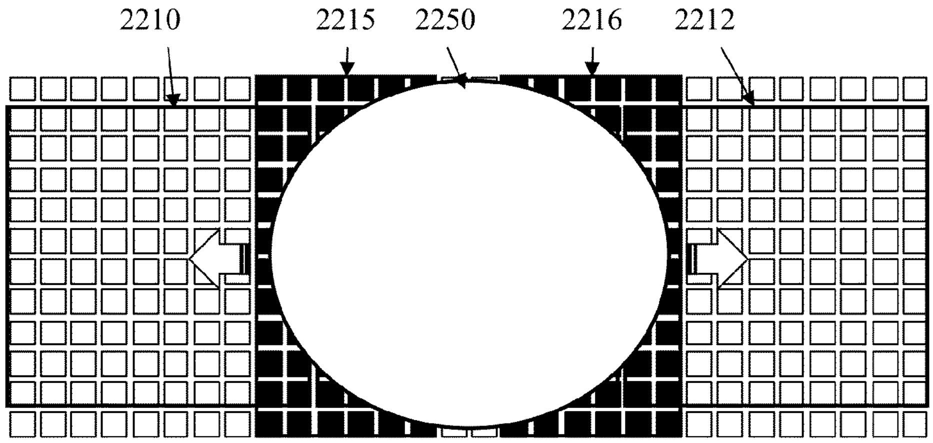
FIGS. 22A, 22B and 22C are diagrams showing the precise cutting of a droplet of FPLOC.
Figure 22B:
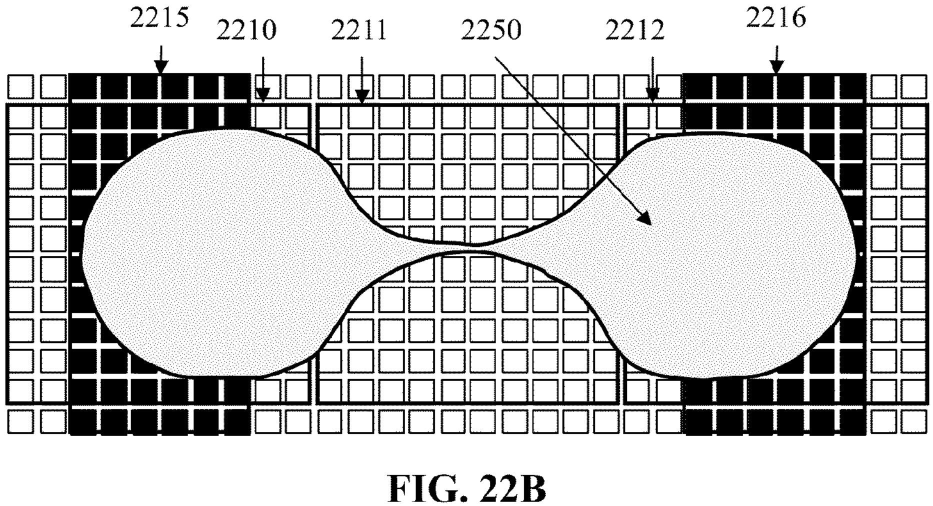
Figure 22C:
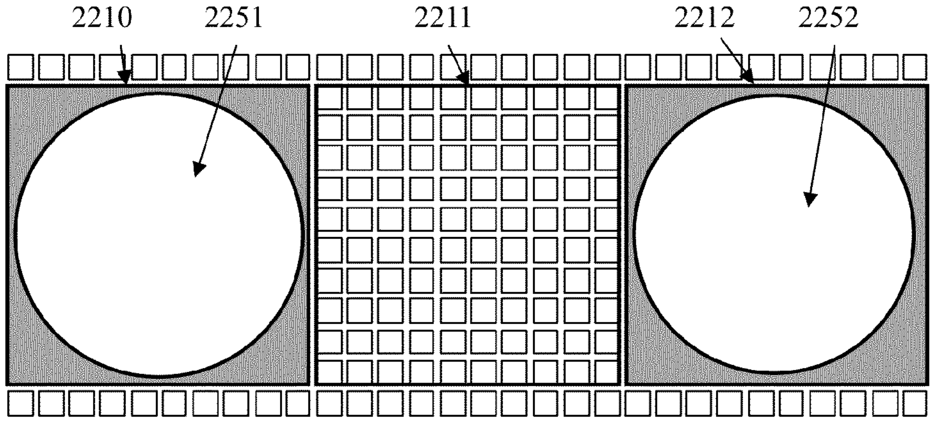

Precise cutting: One embodiment of the present invention doing a precise cutting which is similar to the 3-electrode cutting is illustrated in FIGS. 22A-22C. The precise cutting also starts with the droplet to be cut sitting on top of the inner configured-electrode. But instead of using outer two configured-electrodes 2210 and 2212 to cut the droplet, the electrode column actuation technique is used to slowly but firmly pull the droplet 2250 toward configured-electrodes 2210 and 2212 as shown in FIG. 22A. Here two groups of 5 configured-electrode columns 2215 and 2216 (marked as black in FIG. 22A) are used to pull the droplet apart. FIG. 22B illustrates the two electrode column groups keep moving apart by advancing one microelectrode column a time. The hydrophilic forces induced by the two electrode column groups 2215 and 2216 stretch the droplet. When electrode column groups 2215 and 2216 reach the outer edges of the configured-electrodes 2210 and 2212, then all configured-electrode columns are deactivated and the configured-droplets 2210 and 2212 are activated to pinch off the liquid into two daughter droplets 2251 and 2252 as shown in FIG. 22C.

Figure 23A:
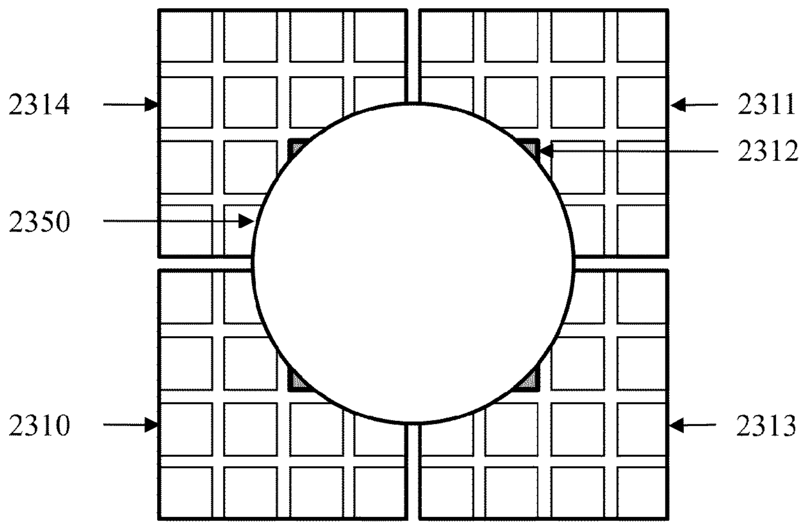
FIGS. 23A, 23B and 23C are diagrams showing the diagonal cutting of a droplet of FPLOC.
Figure 23B:
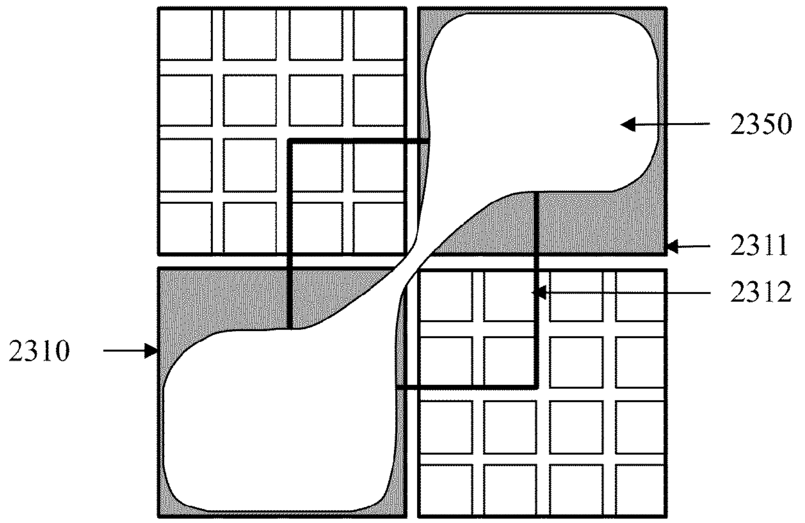
Figure 23C:
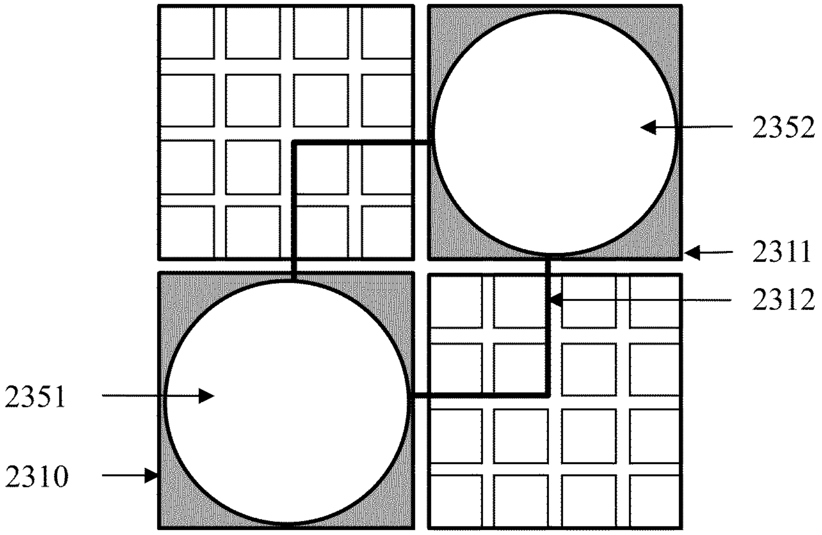

Diagonal cutting: FIGS. 23A-23C illustrates the embodiment of the present invention of performing a diagonal cutting. The diagonal cutting starts with moving the droplet to be cut onto a interim configured-electrode 2312 which is centered at the joint corner of the four configured-electrodes 2310, 2311, 2313 and 2314 in FIG. 23A. After the droplet completely centered at the joint corner of the four configured-electrodes, then the interim configured-electrode 2312 is deactivated and configured-electrode 2310 and configured-electrode 2311 are activated and the droplet 2350 is stretched into a liquid column as indicated in FIG. 23B. To pinch off the liquid into two daughter droplets, the deactivations of the inner corners of configured-electrodes 2310 and 2311 are needed to produce the necessary hydrophobic forces in the middle of droplet 2350. FIG. 23C shows the L-shaped interim configured-electrodes 2315 and 2316 are activated to further stretches the droplet with only a thin neck in between and the hydrophobic forces in the middle subsequently helps to pinch off droplet 2350 into two sub-droplets 2351 and 2352. Finally, configured-electrodes 2310 and 2311 are activated again to center-position droplets 2351 and 2352 to configured-electrodes 2310 and 2311 as illustrated in FIG. 23D.

Figure 24A:
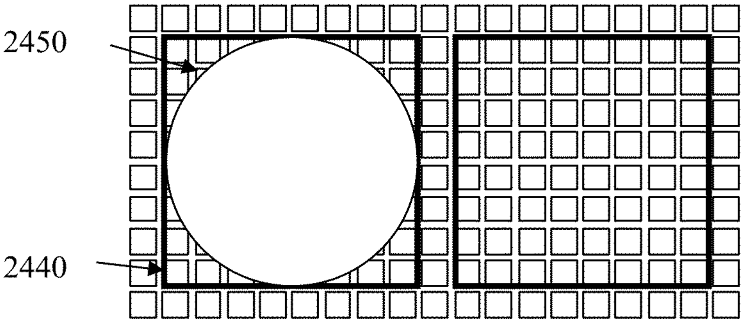
FIGS. 24A, 24B and 24C illustrate the droplet cutting procedure on an open surface of FPLOC.
Figure 24B:
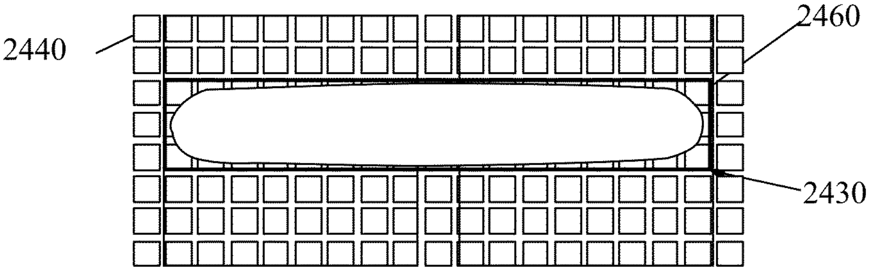
Figure 24C:
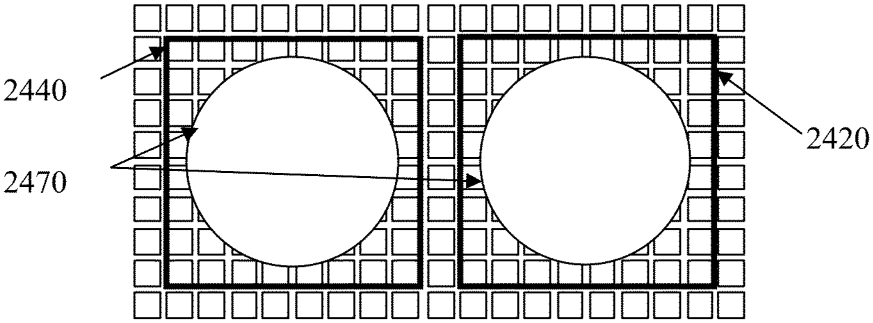

FIGS. 24A-24C illustrate the droplet cutting procedure on an open surface of FPLOC. FIG. 24A illustrates a droplet 2450 sits on the left-side configured-electrode 2440. The droplet 2450 will be cut into two daughter droplets 2470 as shown on FIG. 24C. The droplet cutting procedure generally involves the next two procedures. First, stretch the droplet-to-be-cut 2450 into a thin liquid column 2460 by activating the configured-electrode 2430 under appropriate voltages. This can be seen in FIG. 24B. Such "thin" liquid column generally refers to the liquid column with smaller width than the starting droplet diameter. Next, activate the two preselected configured-electrodes 2440 and 2420 to cut and to center-position droplets 2470 into these two configured-electrodes 2440 and 2420 as shown in FIG. 24C. The key for the coplanar cutting is to have enough overlaps between the droplet and the outer two configured-electrodes to have enough capillary force to overcome the curvature of the droplet to perform the cutting. In one embodiment, a passive cutting is presented when the liquid column 2460 is cut into multiple droplets by hydrodynamic instability. In another embodiment, both the passive and the active cutting are employed in the present invention. While the droplet is stretched into a thin liquid column, either the passive force or active force can be employed to break the starting droplet into two smaller droplets. When use the passive force, the calculation of the length of liquid column is important. When use active force, the optimized length is not important. Either passive cutting or active cutting, at the final step of the cutting procedure, configured-electrodes 2440 and 2420 are normally activated in order to position the droplets into the desired configured-electrodes. In another embodiment, either an active or a passive cutting procedure is performed under the open surface structure of FPLOC. FIG. 24C illustrates the completion of cutting when the droplet 2450 is cut into two droplets 2470.

Mixing, Incubation and Reaction: Mixing of analytes and reagents is a critical step in realizing a FPLOC. The droplets act as virtual mixing chambers, and mixing occurs by transporting the droplet across an electrode array. The ability to mix liquids rapidly while utilizing minimum area greatly improves the throughput. However, as microfluidic devices are approaching the sub nano-liter regime, reduced volume flow rates and very low Reynolds numbers make mixing such liquids difficult to achieve in reasonable time scales. Improved mixing relies on two principles: the ability to create turbulent flow at such small scales, or alternatively, the ability to create multilaminates to achieve fast mixing via diffusion.

Figure 25:
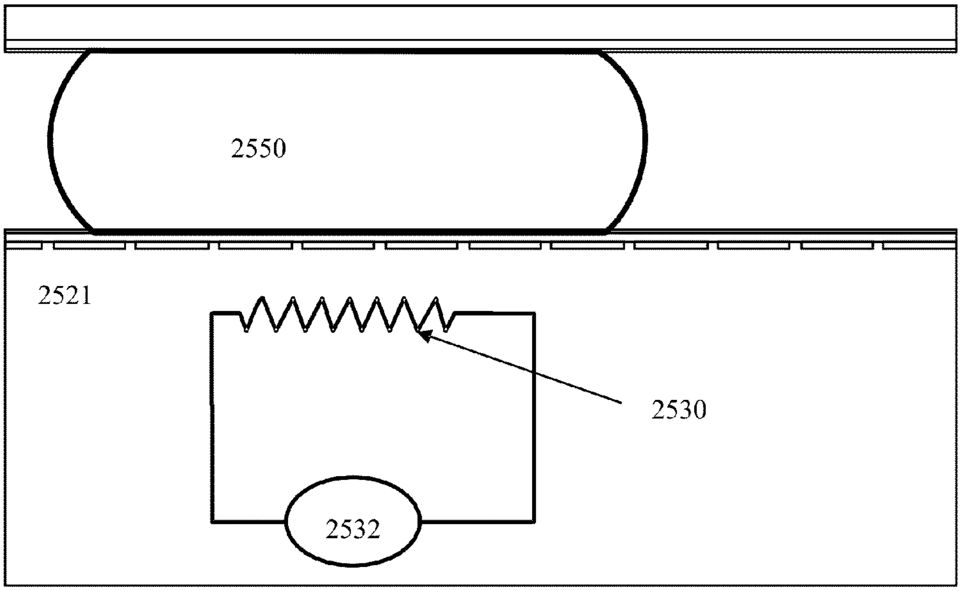
FIG. 25 is the diagram showing a micro-heating element which is integrated into the substrate of the FPLOC.

Incubation steps at elevated temperatures sometimes are also required, e.g., for a PCR amplification. In one embodiment for FPLOC as shown in FIG. 25, the liquid droplet 2550 is placed above a micro-heating element 2530 which is integrated into the substrate 2521. The heater control/monitor 2532 is also built by CMOS fabrication technique and integrated into the FPLOC.

Figure 26A:
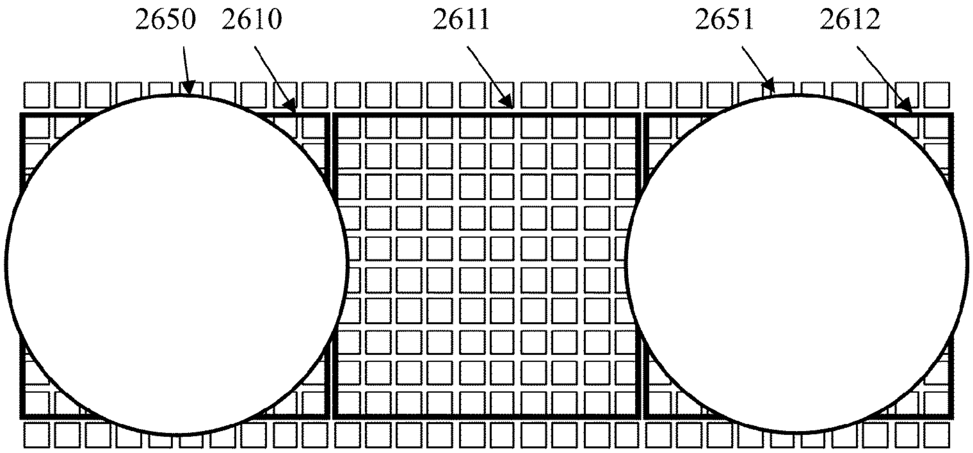
FIGS. 26A and 26B are diagrams showing the basic merger/mixing of FPLOC.
Figure 26B:
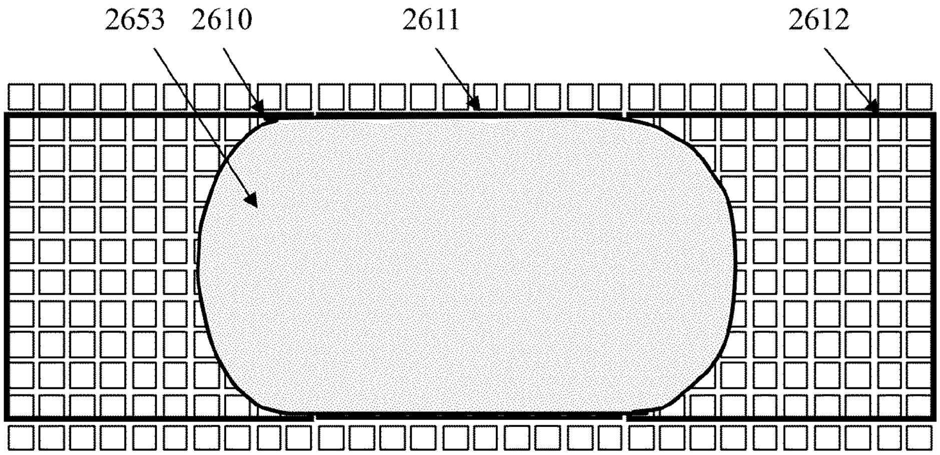

One embodiment of the present invention for performing a basic merge or mixing operation of FPLOC wherein two droplets 2650 and 2651 are combined into a single droplet 2653 as shown in FIGS. 26A-26B. In the present discussion, the terms merge and mixing have been used interchangeably to denote the combination of two or more droplets. This is because the merging of two droplets does not in all cases directly or immediately result in the complete mixing of the components of the initially separate droplets. In FIG. 26A, two droplets 2650 and 2651 are initially positioned at configured-electrodes 2610 and 2612 and separated by at least one intervening configured-electrode 2611. And both droplets 2650 and 2650 at least have partial overlaps with configured-electrode 2611. As shown in FIG. 26B, the outer two configured-electrodes 2610 and 2612 are deactivated and the central configured-electrode is activated, thereby drawing droplets 2650 and 2651 toward each other across central configured-electrode 2611 and merge into a bigger droplet 2653 as indicated by the arrows in FIG. 26B.

Figure 27A:
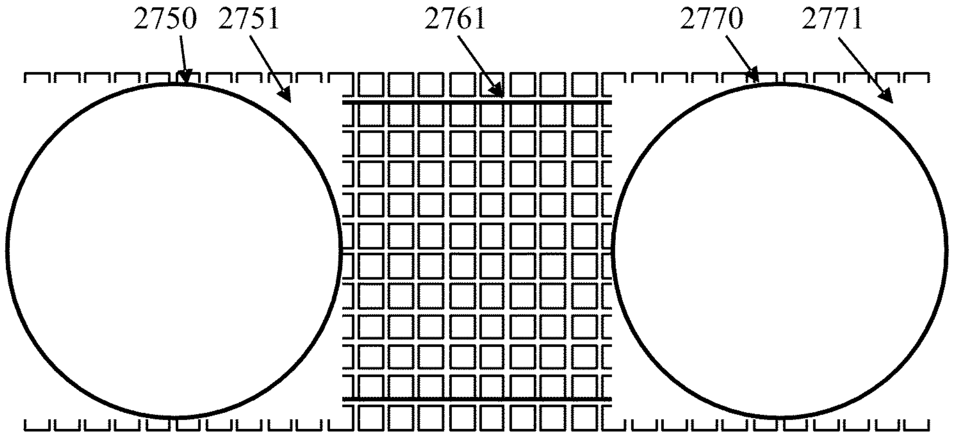
FIGS. 27A, 27B, and 27C are diagrams showing the active mixing procedure of the droplet manipulation by uneven-geometry movement to speed up the mixing.
Figure 27B:
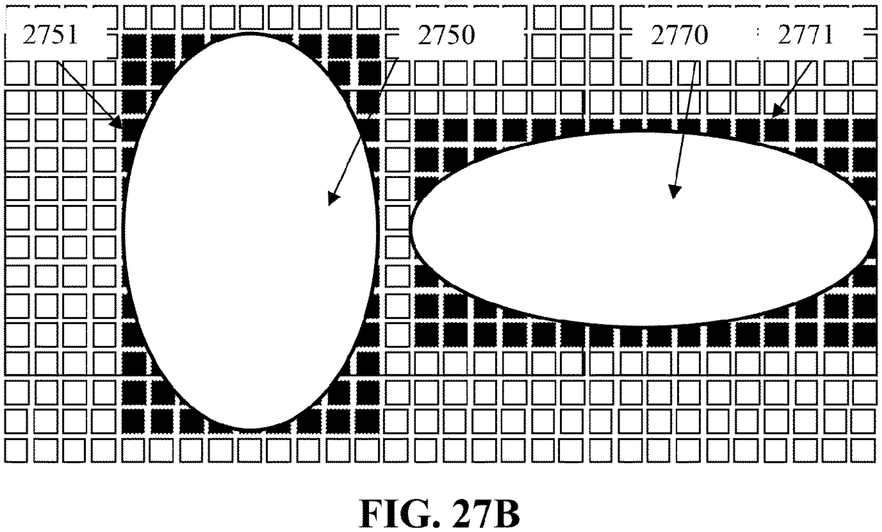
Figure 27C:
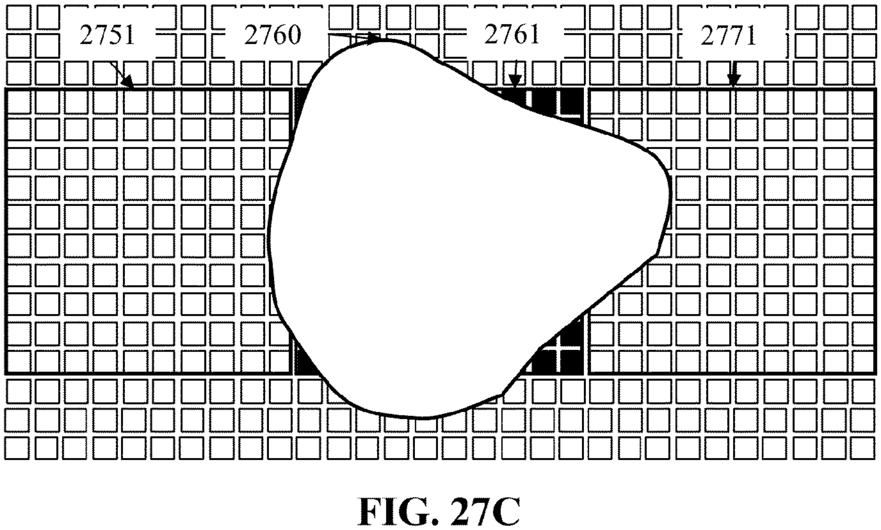

FIGS. 27A-27C illustrate the active mixing procedure of the droplet manipulation by uneven-geometry movement to create turbulent flow of FPLOC. The droplets 2750, 2770 are deformed by activating the configured-electrodes 2751 and 2771, as indicated in FIG. 27B; therefore to make the droplet 2750 tall and the droplet 2770 fat. The center configured-electrode 2760 then is activated in order to pull the droplets 2750, 2770 into the mixing configured-electrode 2760 (marked in black) as shown in FIG. 27C. In FIG. 27B, the black areas indicate two activated configured-electrodes 2751 and 2771 not only deformed the two droplets 2750 and 2770 but also drew them partially into the center configured-electrode 2760. This interim activating step shown in FIG. 27B also helps a smooth mixing movement of the two droplets. The shapes of the black area and the deformed droplets in FIGS. 27B-27C are for illustration purposes only. In the present invention, such shapes can be any types based on the needs.

Figure 28A:
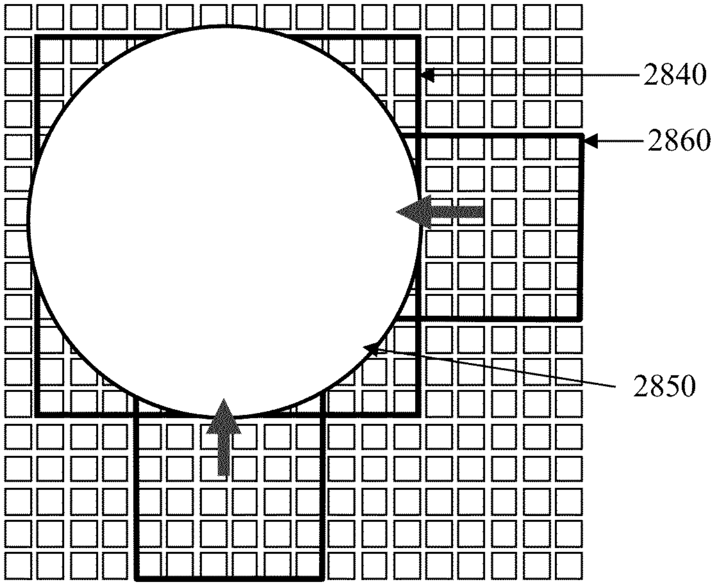
FIGS. 28A and 28B illustrate an uneven back-and-forth mixer for speeding up the droplet mixing.
Figure 28B:
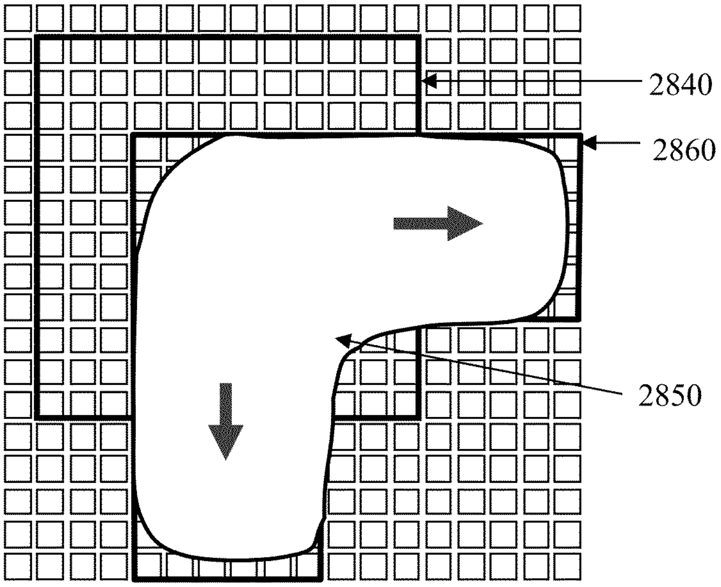

FIGS. 28A and 28B illustrate the microelectrode array mixer for improving the mixing speed. In one embodiment, an uneven back-and-forth mixer can be used to speed up the droplet mixing. This can be done by activating a group of microelectrodes to create an irreversible pattern that breaks the symmetry of the two circulations to improve the speed of mixing. The initial state is illustrated as in FIG. 28A that a droplet 2850 contains both sample and reagent sits on top of configured-electrode 2840. The first step for the uneven back-and-forth mixing is to activate configured-electrode 2860 to deform the droplet 2850 to the direction of the arrows as shown in FIG. 28B. Then configured-electrode 2860 is deactivated and configured-electrode 2840 is activated to pull the droplet back to the original position as indicated in FIG. 28A. The back-and-forth mixing can be done multiple times to achieve the optimized mixing results. Also, the shapes of the configured-electrode 2840 and the deformed droplets in FIGS. 28A and 28B are for illustration purposes only. In the present invention, such shapes can be any types of designs as long as they have the ability to create turbulent flows, or alternatively, the ability to create multilaminates.

Figure 29:
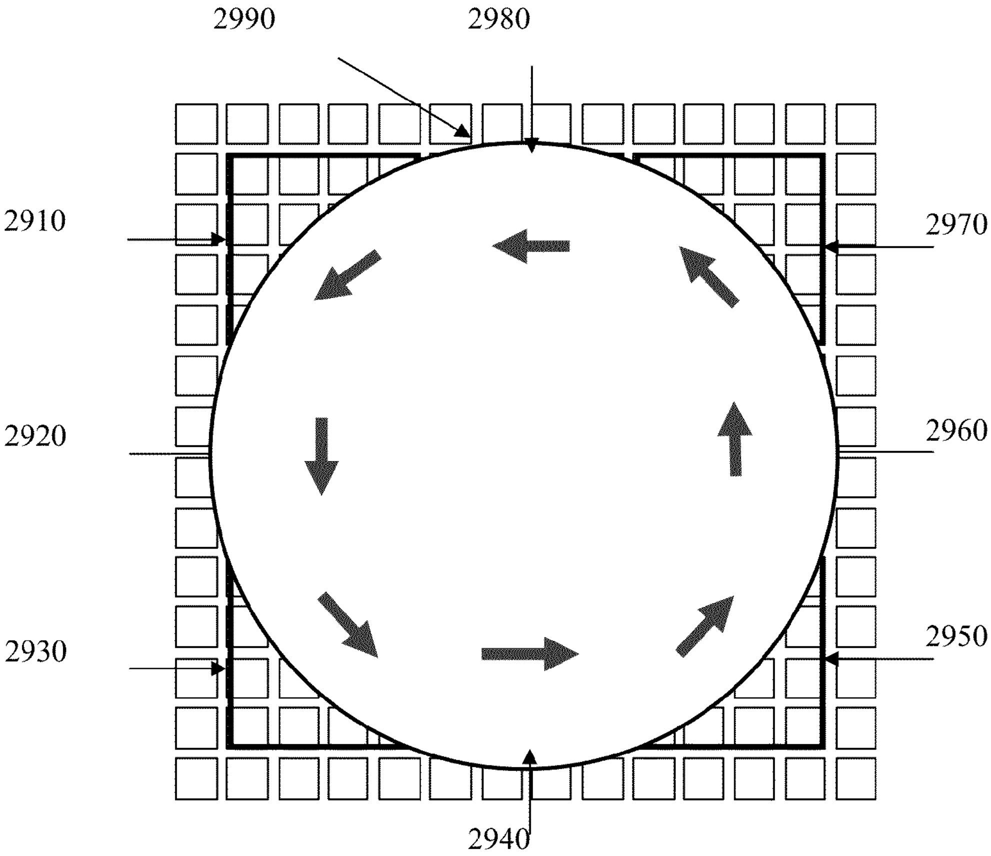
FIG. 29 is a diagram showing the fluidic circular mixer based on the EWOD Microelectrode Array Architecture.

Still in another embodiment of PFLOC droplet based mixing procedure, FIG. 29 illustrates a circular mixer for improving the mixing speed. This can be done by activating a sequence of the smaller groups of microelectrodes to create an irreversible horizontal circulation that breaks the symmetry of the vertical laminar circulation to speed up the mixing. One embodiment, as shown in FIG. 29, is to form eight configured-electrodes (2910, 2920, 2930, 2940, 2950, 2960, 2970 and 2980) that enclose the droplet 2990 and then activate the configured-electrodes one-by-one in sequence and in a circular manner. For example, as the first step, the configured-electrode 2910 is activated for a short period of time to cause surface tension change and to create circulation inside the droplet 2990 toward the configured-electrode 2910. Next, the configured-electrode 2910 is deactivated followed by activating the next adjacent configured-electrode 2920. The circular activating procedure is repeated through entire eight configured-electrodes (2910 to 2980) to create the horizontal circulation inside the droplet 2990. This circulation flow activation can be done multiple times based on the needs. Also, the circulation flow can be done clockwise, counter-clockwise or an alternative mix of the two to achieve the best mixing results. Also, the shapes of the configured-electrodes 2910 to 2980 and the circulation are for illustration purposes only. In the present invention, such circulation mixing can be any types of designs as long as they have the ability to create turbulent flow, or alternatively, the ability to create multilaminates.

Figure 30A:
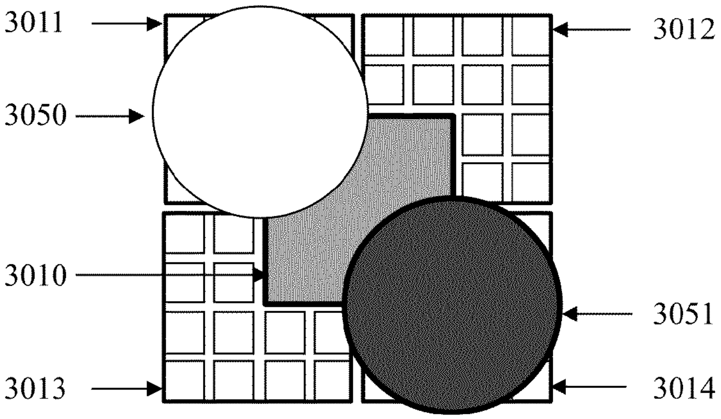
FIGS. 30A-30F are diagrams showing the Multilaminates mixer which is especially useful for low aspect ratio (<1) situation.
Figure 30B:
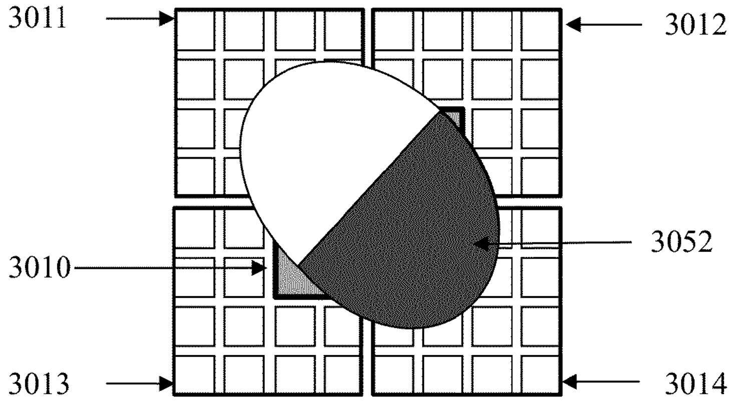
Figure 30C:
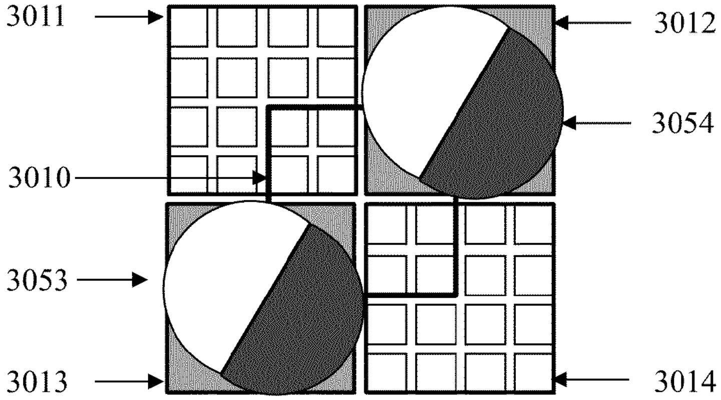
Figure 30D:
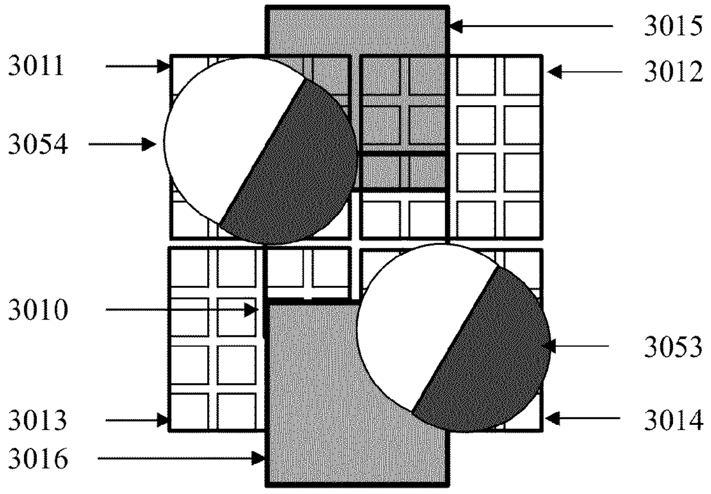
Figure 30E:
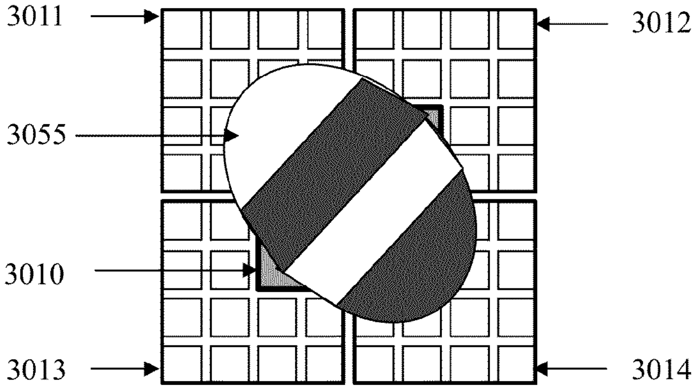
Figure 30F:
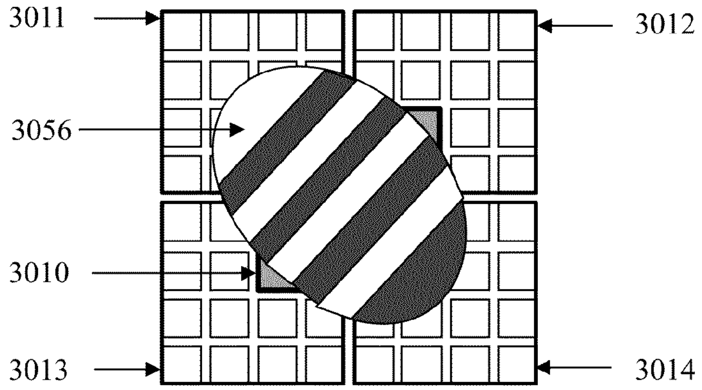

Multilaminates mixer: One embodiment of the invention to have a small footprint (2×2 configured-electrodes) but effective mixer to create multilaminates to speed up the mixing is possible as illustrated in FIGS. 30A-30F. This multilaminates mixer is especially useful for low aspect ratio (<1) situation. Aspect ratio is the ratio of the gap between electrode plate and the ground plate and the dimension of the electrode. Low aspect ratio means more difficult to create turbulent flow inside the droplet and the ability to create multilaminates becomes more important. Diagonal mixing and diagonal cutting are used in this special mixer. In FIG. 30A, the black droplet 3051 at configured-electrode 3014 will be mixed with the white droplet 3050 at configured-electrode 3011. An interim configured-electrode 3010 will be the mix chamber and will be activated to pull in both droplets 3051 and 3050. To start the multilaminates mixing, step one is to merge the two droplets diagonally. The diagonal direction of the droplet merge can be 45 degree or 135 degree but the subsequent step of diagonal cutting needs to be perpendicular to the merge operations. FIG. 30B indicates the 1st merge of droplet 3051 and droplet 3050 into a black-and-white droplet 3052. Because of the low Reynolds number and the low aspect ratio, droplet 3052 has purely diffusion-based static mixing which results in a long mixing time, so the droplet is shown as half white and half black. The second step is to do the diagonal cutting, 90 degree from the starting diagonal mixing, of droplet 3052 as illustrated in FIG. 30C. While the interim configured-electrode 3010 is deactivated, configured-electrodes 3012 and 3012 and other interim configured-electrodes are activated to diagonally cut droplet 3052 into two daughter droplets 3053 and 3054 as shown in FIG. 30C. The details of the diagonal cutting are discussed in previous section. Because of the slow mixing rate, so the two daughter droplets 3053 and 3054 keep the black/white laminates with the same orientation after the diagonal cutting. Then, the 3rd step of the multilaminates mixing is to move the two droplets back onto the starting configured-electrodes to repeat the diagonal mixing and cutting in. FIG. 30D, droplets 3054 is moved from configured-electrode 3012 onto configured-electrode 3011 and droplets 3053 is moved from configured-electrode 3013 onto configured-electrode 3014. Cares are needed to avoid the merge of droplets 3053 and 3054 while they are moving. Simple droplet move manipulations of deactivating configured-electrodes 3012 and 3013 and activating configured-electrodes 3011 and 3014 might cause a physical contact of the two droplets while they are moving and then the two droplets would merge together. So interim configured-electrodes 3015 and 3016 need to be activated first to create the safeguard zone between the two droplets to prevent any accidental merge while they are moving toward their destinations. After droplets 3053 and 3054 are moved into configured-electrodes 3016 and 3015, then it's straight forward to move the two droplets into configured-electrodes 3011 and 3014. Step one to step three can be repeated to create the necessary number of multilaminates to speed up the mixing. FIG. 30E shows four-laminated droplet 3055 as the result of repeating step one to diagonally merge droplets 3053 and 3054 in FIG. 30D into droplet 3055. FIG. 30F illustrates eight-laminated droplet 3056 after being through another cycle of step one to step 3 of the multilaminates mixing.

Figure 31:
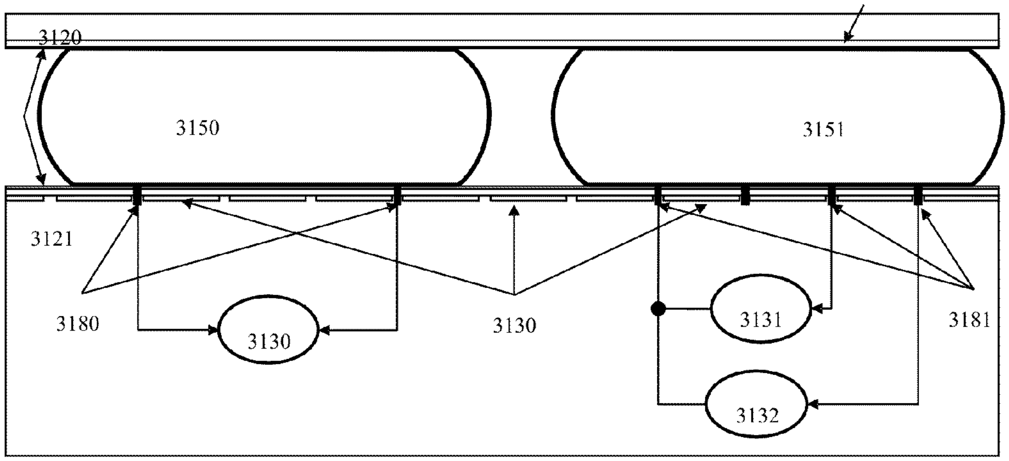
FIG. 31 is a diagram showing the integration of the sensing devices based into the FPLOC.

Detection (840 in FIG. 8): Detection is usually signaled in one of the following ways: studying the competitive binding of labeled and unlabeled analytes, using labeled molecules specific to immobilized analytes, forming a sandwich assay, or performing an enzyme-linked immunosorbent assay (ELISA), where an enzyme-active substrate is added that changes color or fluoresces upon interaction with enzyme-linked analytes. An increasing number of research papers looking at the integration of detections into microfluidic chips especially for those technologies that scale better upon miniaturization than absorbance or fluorescence detection. One embodiment of the invention is the integration of the sensing devices based on CMOS technologies into the FPLOC as illustrated in FIG. 31 wherein the sensors (3130, 3131 and 3132) may be provided in association with a bottom plate 3121, a top plate 3120, droplets 3150 & 3151, sensor probes 3180, and microelectrodes 3130. An integrated potentiometric sensor 3130 which typically functions based on the measurement of a potential under no current flow is measuring droplet 3150 through sensor probes 3180. An amperometric sensor 3132 which typically functions by the production of a current when a potential is applied between two electrodes is shown to measure droplet 3151 through sensor probes 3181. An impedimetric sensor 3131 has been integrated into the bottom plate 3121 to monitor the catalyzed reactions of enzymes or the biomolecular recognition events of specific binding proteins, lectins, receptors, nucleic acids, whole cells, antibodies or antibody-related substances. Detection I/O ports may also serve the purpose of optical sensing and feedback to control the rapid liquid motions inside the FPLOC.

Figure 32:
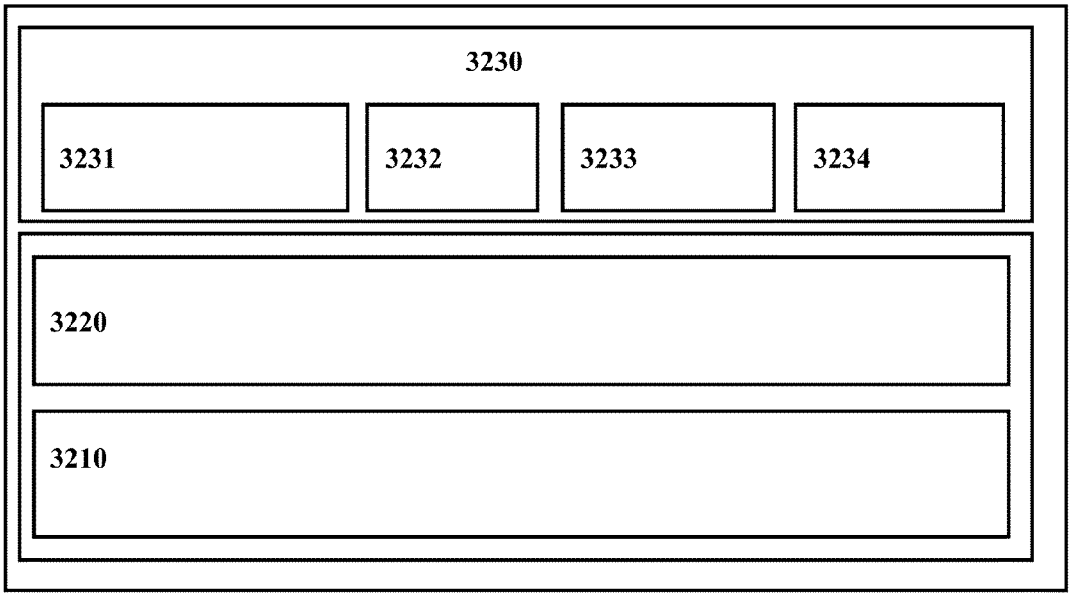
FIG. 32 is a block diagram showing hierarchical software structure for PFLOC.

System Control (850 in FIG. 8): One embodiment of the invention for the FPLOC system control block is illustrated in FIG. 32. The main function for the System Control block is to perform the field-programmable capabilities of FPLOC. There are different levels of requirements for digital programmable capabilities of FPLOC from both software and hardware point of view. FIG. 32 indicates the hierarchical software structure for PFLOC. The Field-programming Management (FPM) software 3210 is the lowest layer software which configures the FLBs into microfluidic components and the layout/networks for the microfluidic components to form the FPLOC. The Microfluidic Operations Programming Management (MOPM) 3220 software is one level up function that controls and manages microfluidic operations. The step defines how the microfluidic operations will be performed in FPLOC and the sequences of the microfluidic operations. For users who want to focus on applications, they can leverage a set of pre-defined and validated microfluidic elements and take the advantage of the programmability to sequence fluidic operations to complete the overall design of the FPLOC. For more advanced users who want to optimize the design of FPLOC and take the advantage of the flexible architecture of PFLOC, they can build microfluidic components directly and program the microfluidic operations directly. Both FPM software and MOPM software are FPLOC chip-level software. The system management 3230 is the application-level function that manages application specific requirements including System Partition and Integration 3231, Detection 3232, Data Management 3233 and Peripheral Management 3234.

System Partition and Integration (3231 in FIG. 32): The general trend in commercial devices has been to fabricate simple, disposable devices that are designed to interface with a more expensive box that houses the required control electronics, reagent supply, detectors, and programming. Thus, the microfluidic device may perform only a limited set of operations, such as liquid transport, separation, or sensing. Then the device is used once and discarded. This complexity also calls for a possible partitioning of system elements for those which are disposable and those which can be re-used reducing the cost of the overall solution.

Detection and Data Storage/Display (3232 in FIG. 32): CPU power and software will be needed for assays especially for multiple quantitative measurements happening simultaneously. Some calibrations of assays will be also needed during the process. After obtaining the assay results, how to display, report, and store the data in certain formats will have to be defined and performed.

There are at least several different possible system configurations for FPLOC: (1) Prototyping and Testing System Configurations, (2) Tabletop Machine Configurations, (3) Portable Machine Configurations, and (4) Standalone Bio-chip Configurations.

Figure 33:
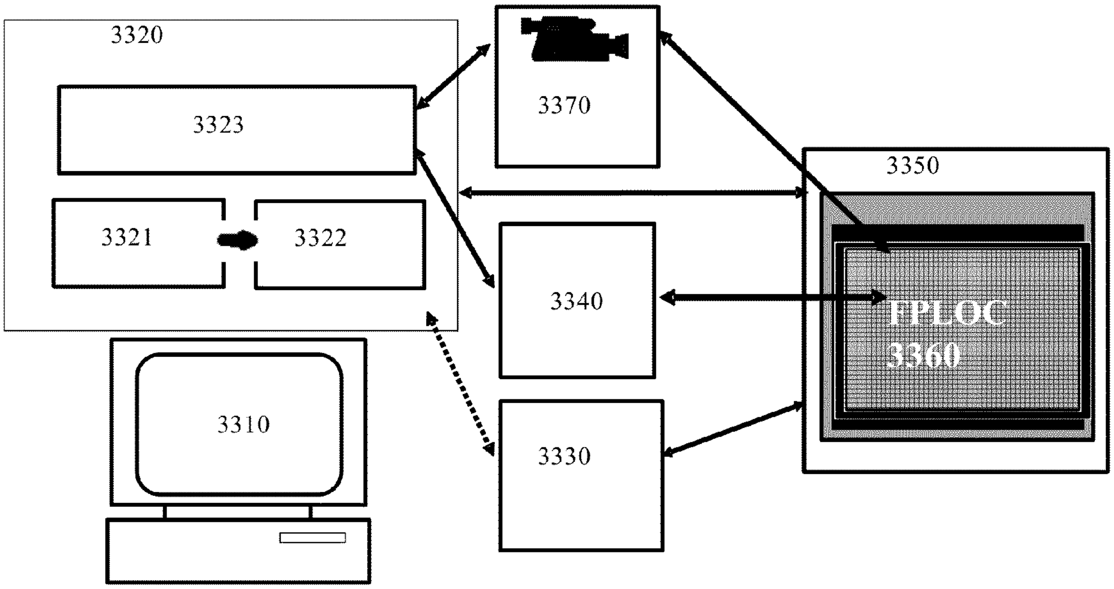
FIG. 33 is an illustration of block diagram of the Prototyping and Testing System Configuration for FPLOC.

One embodiment of the Prototyping and Testing System Configuration for FPLOC is illustrated in FIG. 33. Fundamentally, the Prototyping and Testing System Configuration delivers a technology evaluation and development tool to allow researchers to rapidly and efficiently implement their microfluidic technology in a proof of concept system level prototyping environment. The Prototyping and Testing System Configuration is relatively open and user-accessible and its implementation is via the provisioning of standard modular functional blocks and standard interfaces between these blocks. The functional blocks of the Prototyping and Testing System Configuration are illustrated in FIG. 33. The Prototyping and Testing System Configuration is comprised of a fluidic interface 3340 for fluidic pumping, a fixture 3350 to hold the FPLOC 3360, Driver Subsystem 3320 to provide ancillary drivers (Function generator 3321 and high-voltage amplifier 3322) and data management A-to-D card 3323, FPGA board 3330, optical module 3370 as well as a PC 3310 to control and analyze the chip functionality. Then Prototyping and Testing System Configuration provides hardware, software drivers, chip layouts, design checks and field-programmability for FPLOC prototyping that enables proof-of-concept research in microfluidics. The Prototyping and Testing System Configuration might support two primary tools for optical characterization of microfluidic media: Video detection and Laser induced fluorescence analysis (LIF). Video functionality is for a photographic record of the functionality of the microfluidic operations. User interface is provided to control the pump, flow meter, pressure sensor and Laser induced fluorescence analysis (LIF) unit via a computer. The Prototyping and Testing System Configuration includes a host PC which supports these functions. Connectivity to this central driver computer is through both RS-232 and USB connections.

Figure 34A:
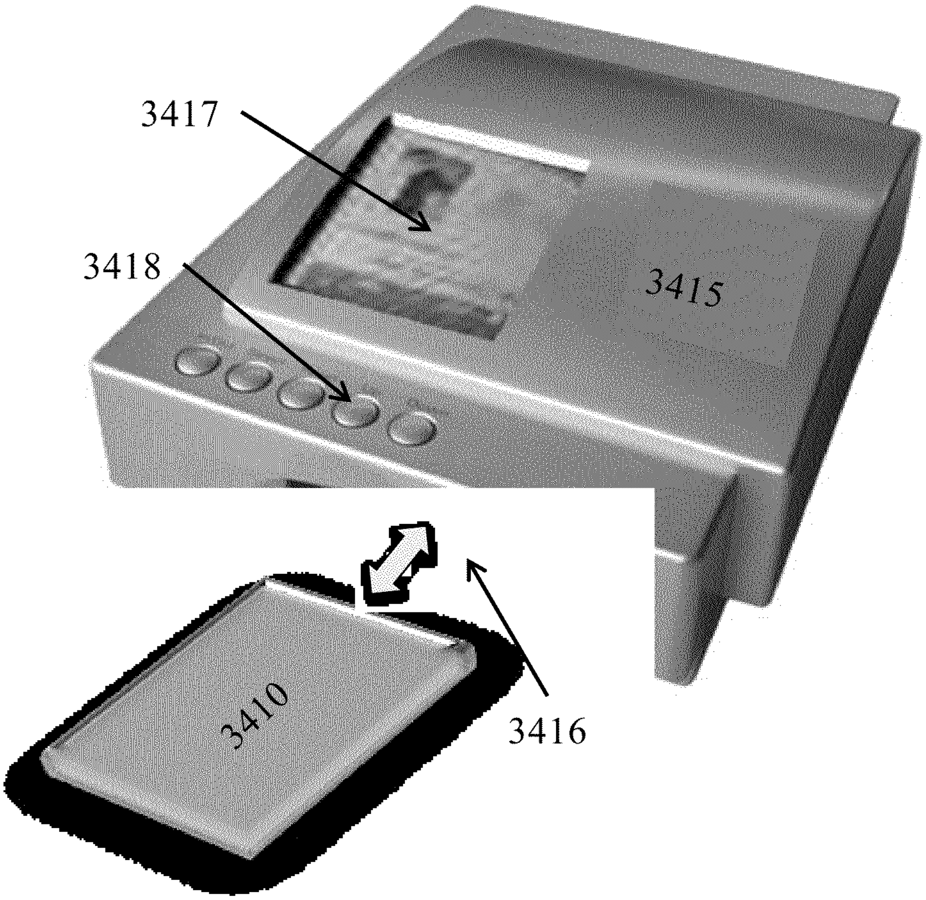
FIG. 34A is an illustration of Tabletop Machine Configurations of FPLOC applications.

Referring to FIG. 34A in some embodiments of Tabletop Machine Configurations, the programmed-FPLOC is provided as a test bio-chip 3410 with a tabletop device 3415. FIG. 34A shows the exterior of tabletop device 3415 and a slot 3416 for insertion of the programmed-FPLOC 3410. Build-in detection sensor for sensing the test results, device control bottoms 3418 and display 3417 are included in the tabletop device 3415.

Figure 34B:
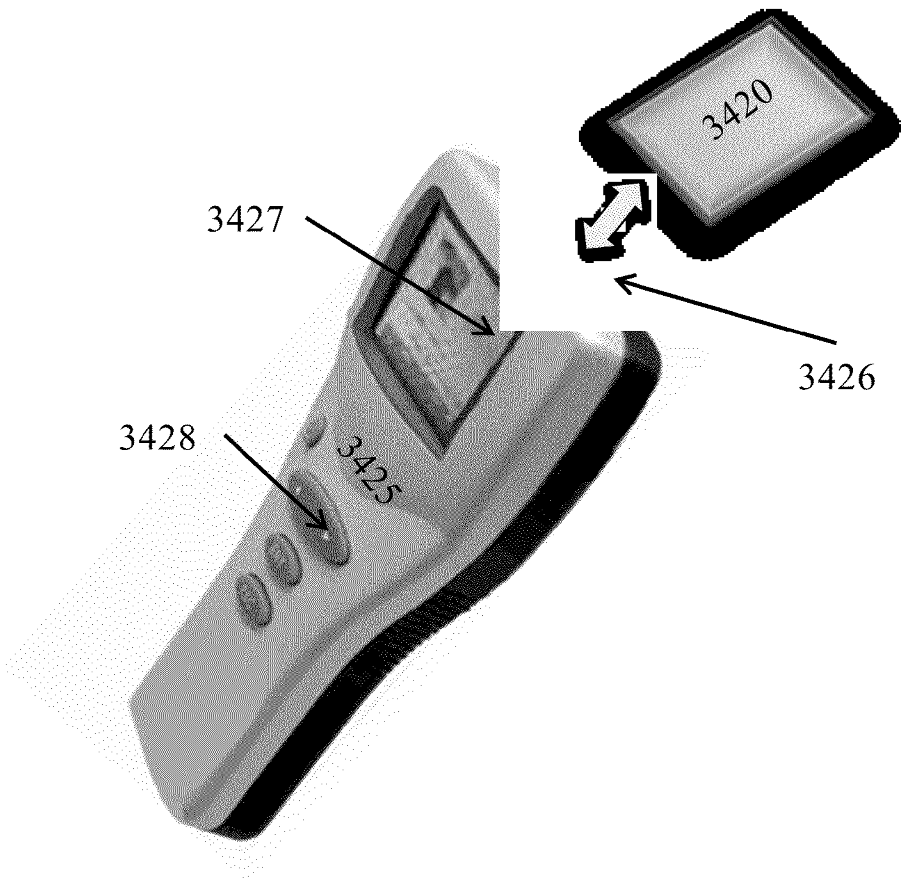
FIG. 34B is an illustration of Portable Machine Configurations of FPLOC applications.

Referring to FIG. 34B in another embodiment of Portable Machine Configurations, the programmed-FPLOC is provided as a test bio-chip 3420 with a portable device 3425. FIG. 34B shows the exterior of portable device 3425 and a slot 3426 for insertion of the programmed-FPLOC 3420. Build-in detection sensor for sensing the test results, device control bottoms 3428 and display 3427 are included in the portable device 3425. The portability of the FPLOC of the invention facilitates point-of-care or point-of-need use in a wide variety of settings in clinics, operating rooms, emergency rooms, small laboratories, and in the field for rapid diagnostics that can lead to quick turnaround times in critical situations.

Figure 34C:
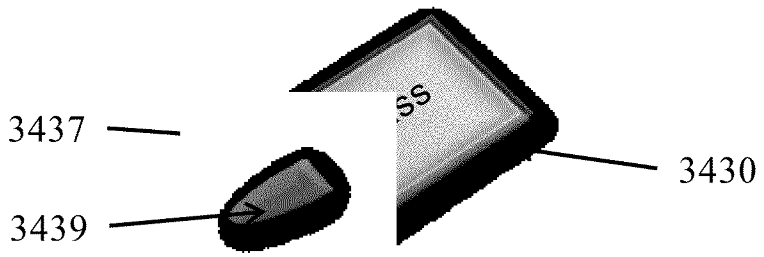
FIG. 34C is an illustration of Standalone Bio-chip Configurations of FPLOC applications.

FIG. 34C in another embodiment of Standalone Bio-chip Configurations, the programmed-FPLOC is provided as a standalone bio-chip 3430. FIG. 34C shows the exterior of Standalone Bio-chip 3430 and a sample collection device 3439 for collecting samples into the chip. Detection sensor for sensing the test results, pre-loaded reagents and system control units are all integrated into the chip. Field-programmable permanent display techniques are applied by using the microelectrode array for displaying test results 3437. Also, because the results displayed will not disappear even if the power of the chip is off, so it can be used for the records of the tests. A mass manufactured low-cost disposable invention as shown in FIG. 34C can facilitate point-of-care or point-of-need use in a wide variety of settings in clinics, operating rooms, emergency rooms, small laboratories, and in the field for rapid diagnostics that can lead to quick turnaround times in critical situations.

Data Management and Transfer (3233 in FIG. 32): One embodiment of FPLOC is to use emerging information technologies that allow different system configurations of FPLOC to be essentially connected to the healthcare information system. A FPLOC communication design is required in order to: (1) Make FPLOC analyzers accessible from an information system. (2) Organize all the heterogeneous acquired data through a standardized format. (3) Allow FPLOCs to be easy-to-use for non-specialized users. (4) Maintain different access levels for avoiding unauthorized manipulation of such sensitive data.

Other Peripherals (3234 in FIG. 32): In another embodiment of FPLOC system configuration, other peripherals such as a small thermal printer should be considered in case an immediate hardcopy of the assay results will be needed. Or USB storages which can transport the stored assay data to the LAB or other database for process. Barcode Scanner is also popular of the existing POCT devices to manage samples. Networking capabilities either wired or wireless connections are also considered as communication peripherals before the networking capabilities can be integrated into the system.

In some embodiments of the fabrications of FPLOC, depending on the application needs, the underlying fabrication technologies for FPLOC can be semiconductor, thin film transistor (TFT) array, PCB, plastic or paper based technologies. Standard COMS and TFT fabrication technologies are the preferred technologies.

Figure 35:
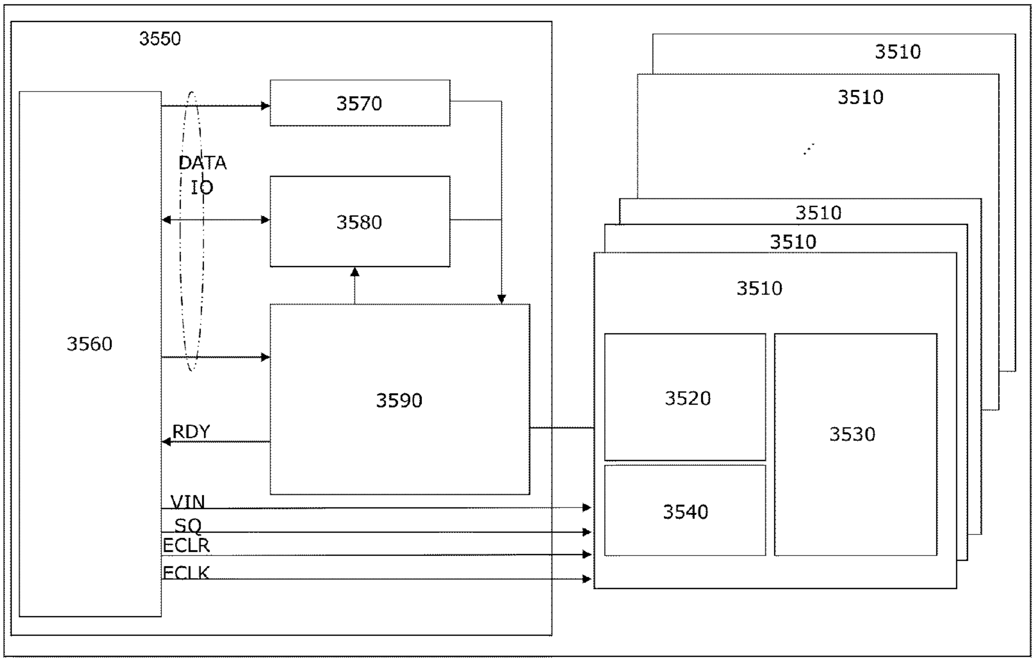
FIG. 35 is the block diagram of fabricating FPLOC by using the standard CMOS fabrication processes.

In one embodiment of fabricating FPLOC by using the standard CMOS fabrication processes is illustrated as is the block diagram in FIG. 35. The two main blocks of FPLOC are the System Control Block 3550 and the Fluidic Logic Blocks (FLB) 3510. Normally there is only one System Control block 3550 needed for a system but a plurality of FLB 3510 is required based on the applications and the limitation of the fabrication technologies.

The microelectrode array is implemented by the FLBs that are daisy-chained together. The number of FLBs is determined by the applications and mainly the limitation of the fabrication technologies. One FLB is composed of the High-Voltage Driving Microelectrode 3530, one bit Memory Map data 3520 and the Control Circuit 3540. The High-Voltage Driving Microelectrode 3530 is the physical microelectrode that can be activated by applying necessary electrical voltages to cause the actuations of the droplets. The one-bit Memory Map data 3520 holds the logic value of the activation of the microelectrode that typically a "one" means activation and a "zero" means deactivation of the microelectrode. The Control Circuit 3540 manages the control logics and forms the daisy-chain structure of the FBLs.

The System Control 3550 is composed of four main blocks: Controller 3560, Chip Layout 3570, Droplet Location Map, 3580 and Fluidic Operations Manager 3590. The Controller 3560 is the CPU plus necessary memory spaces, interface circuitries and the software programming capabilities. Depend on the fabrication technologies, the Controller 3560 can be integrated as part of the fabrication or can be an attached external device. The Chip Layout block 3570 is the memory which stores the configured-electrode configuration data and the FPLOC layout information and data. The Droplet Location Map 3580 reflects the actual locations of the droplets on the FPLOC. The Fluidic Operations Manager 3590 translates the layout information, the droplet location map and the FPLOC applications from the controller 3560 into the physical actuations of the droplets by activating a sequence of "configured-electrodes".

In one embodiment FPLOC provides the field-programmability that the electrodes and the overall layout of the LOC can be software programmable. A microfluidic device or embedded system is said to be field-programmable or in-place programmable if its firmware (stored in non-volatile memory, such as ROM) can be modified "in the field," without disassembling the device or returning it to its manufacturer. The field-programmability or the software-configuration of FPLOC is achieved by the System Control 3550 and FLBs 3510. The designs of the shapes and sizes of the electrodes and the FPLOC layout information and data are stored in non-volatile memory within the Chip Layout block 3570 as illustrated in FIG. 35. The information of activated electrodes including the interim electrodes is stored in non-volatile memory in Droplet Location Map 3580. The soft-configuration data is then delivered to every microelectrode 3530 by the one bit Memory Map data 3520. The grouping, activating, deactivating of a group of microelectrodes are actually performed through the configuration of FLBs 3510. Furthermore, all FLBs 3510 are soft-connectible and physically are in a monolithically integrated way that can be fabricated with standard fabrication technologies.

Figure 36:
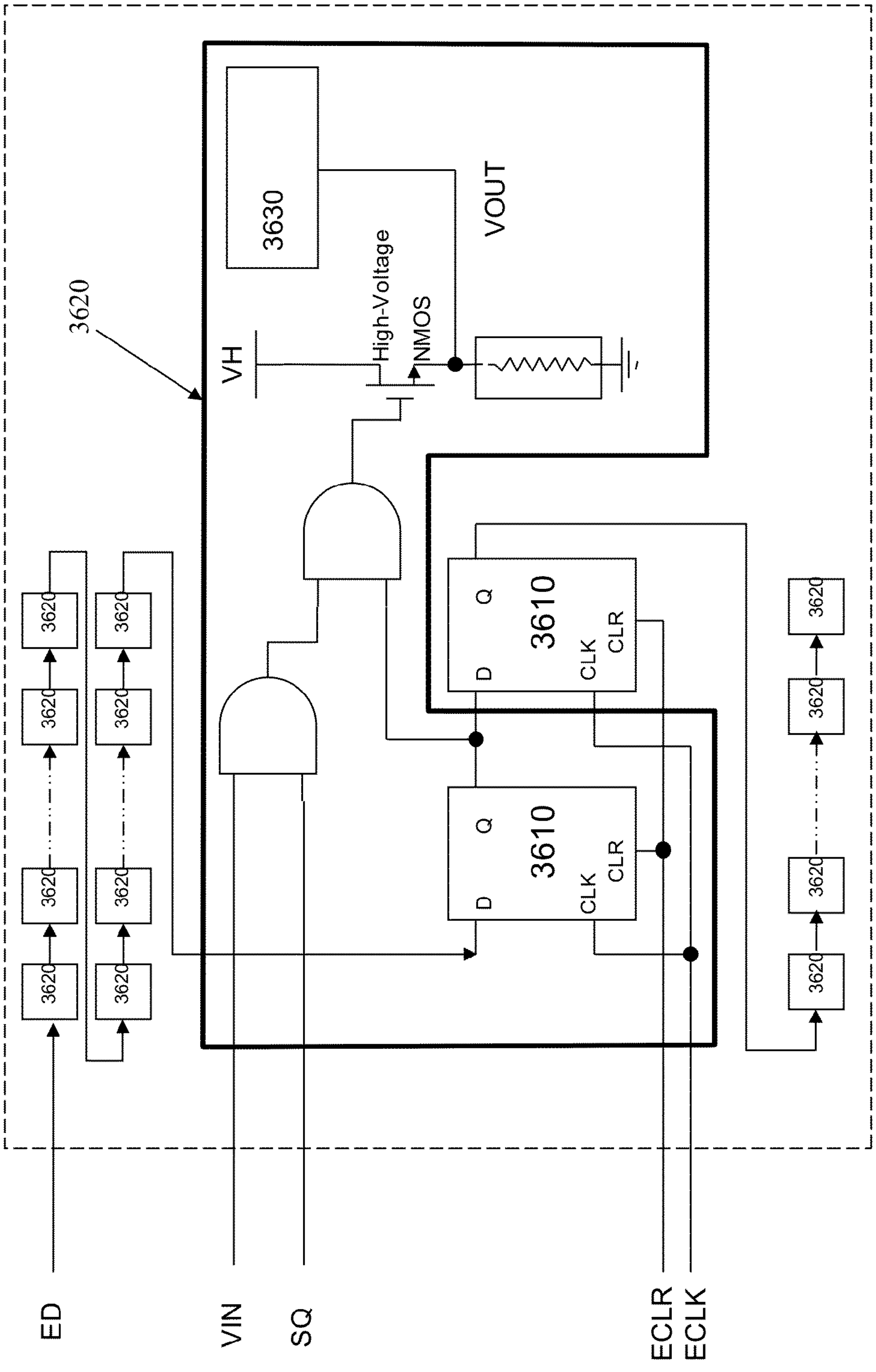
FIG. 36 shows the electrical design of the FLB array based on standard CMOS fabrication technologies.

FIG. 36 shows one embodiment of the electrical design of the FLB array 3600 that composes of many FLBs 3620"*s* in daisy chain configuration based on standard CMOS fabrication technologies. Daisy chain is a wiring scheme used in electrical engineering. The connection wires are in series and do not form webs or loops. While the size of the microelectrode keeps shrinking and the number of microelectrodes keeps growing, one inevitable challenge for the Microelectrode Array Architecture is the interconnection issue. Without the daisy chain configuration, the interconnections will grow exponentially and will be too complicated to manage to scale the system. By using the daisy chain scheme, it simplifies the connection between each FLB 3620 and the interconnections of FLBs will not grow with the increase number of FLBs and a scalable and cleaner layout design can be achieved. Each FLB 3620 contains a storage device, such as a D flip-flop 3610, that stores the activation information, and the high voltage circuit that activate the microelectrode 3630. When the signal VIN is applied, the microelectrode 3630 would be activated or deactivated depending upon the output value of the flip-flop 3610. The SQ signal controls a square waveform instead of a steady-on DC to the microelectrode. Before activating the microelectrode array, the values of the flip-flop 3620 are loaded through clocking in the data signal ED. The one-bit storage device, such as a D flip-flop 3610, can also be other flip-flop design or other data storage application.

Figure 37:
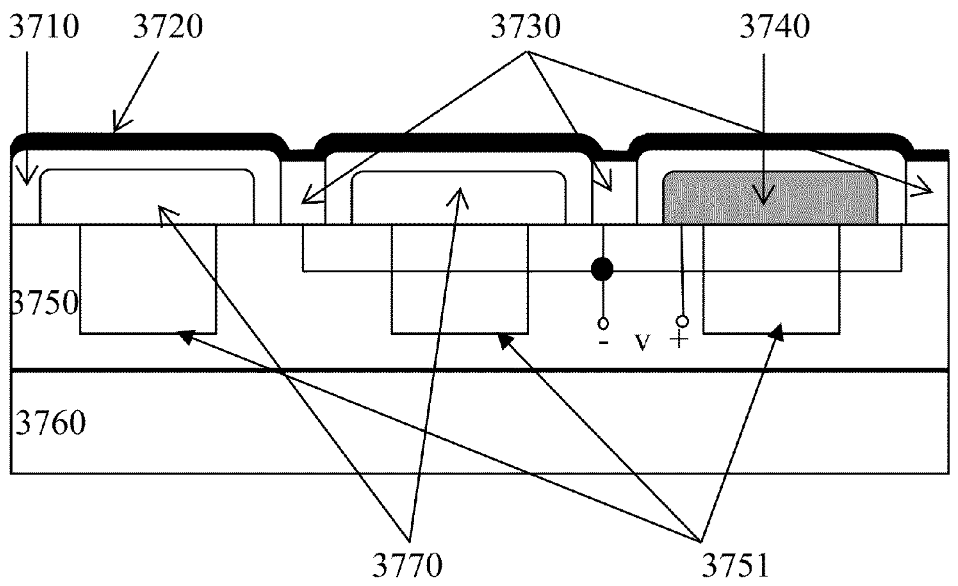
FIG. 37 shows the cross section of the FLB array fabrication based on standard CMOS fabrication technologies.

FIG. 37 shows the cross section of the FLB array fabrication. In one embodiment, there are three metal layers and one poly layer used. The bottom layer is the substrate 3760, and the layer above it is the control circuit layer 3750. The control circuit, flip-flop, and high-voltage driver are all contained in the area of 3751 which is directly beneath the microelectrode 3740 and 3770. The metal-3 layer is used to do the microelectrodes 3740 and 3770 and the ground lines 3730. The top view of this electrodes and ground lines structure is illustrated as FIG. 5A. An activated microelectrode 3740 is applied with an electrical voltage, and microelectrodes 3770"*s* are inactive. On top of the microelectrodes is the dielectric layer 3710. In this embodiment, the ground lines 3730 are not covered by the dielectric layer 3710 to reduce the necessary activate electrical voltage. On the very top, there is a coated hydrophobic film 3720 to decrease the wettability of the surface. If viewing from the top, one can only see an array of microelectrodes without any visibility of circuits that are hidden under the microelectrodes. This self-contained microelectrode structure is the key to have the great scalability in the fabrication of FLBs.

Figure 38A:
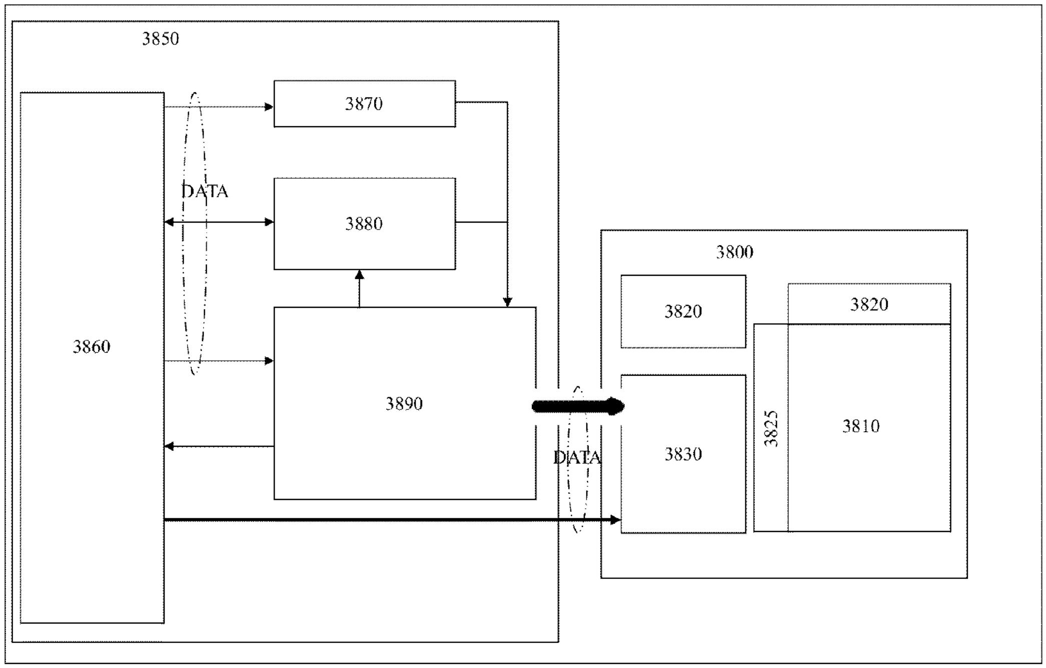
FIG. 38A is the block diagram of fabricating a FPLOC by using the thin film transistor (TFT) array fabrication processes.

In another embodiment of fabricating a PFLOC by using the thin film transistor (TFT) array fabrication processes is illustrated as is the block diagram in FIG. 38A. The two main blocks are the System Control Block 3850 and the Active-Matrix Block (AMB) 3800. The System Control Block 3850 is composed of four main blocks: Controller 3860, Chip Layout 3870, Droplet Location Map, 3880 and Fluidic Operations Manager 3890. The Controller 3860 is the CPU plus necessary memory spaces, interface circuitries and the software programming capabilities. The Chip Layout block 3870 is the memory which stores the configured-electrode configuration data and the LOC layout information and data. The Droplet Location Map 3880 reflects the actual locations of the droplets on the LOC. The Fluidic Operations Manager 3890 translates the layout information, the droplet location map and the LOC applications from the controller 3860 into the physical actuations of the droplets by activating a sequence of "configured-electrodes".

In one embodiment, the field-programmability or the software-configuration of LOC is achieved by the System Control 3850. The Controller 3860 is the CPU plus necessary memory spaces, interface circuitries and the software programming capabilities. Depend on the fabrication technologies, the Controller can be integrated as part of the fabrication or can be an attached external device. The designs of the shapes and sizes of the electrodes and the LOC layout information and data are stored in non-volatile memory within the Chip Layout block 3870 as illustrated in FIG. 38A. The Droplet Location Map reflects the actual locations of the droplets on the FPLOC. The information of activated electrodes including the interim electrodes is stored in non-volatile memory in Droplet Location Map 3880. The Fluidic Operations Manager 3890 translates the layout information, the droplet location map and the FPLOC applications from the controller into the physical actuations of the droplets by activating a sequence of "configured-electrodes". The data of grouping, activating, deactivating of configured-electrodes then are sent to Active-Matrix Block (AMB) 3800 in a "frame-by-frame" manner.

Figure 38B:
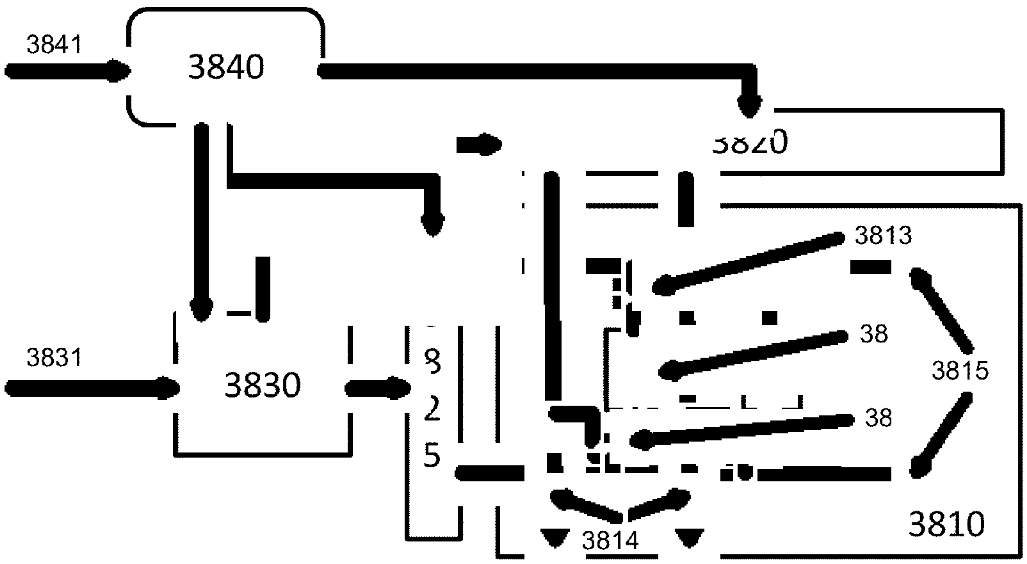
FIG. 38B is the illustration of the block diagram of Active-Matrix Block (AMB).

In another embodiment, AMB 3800 is composed of five main blocks: Active-Matrix Panel 3810, Source Driver 3820, Gate Driver 3825, DC/DC Converter 3840 and AM Controller 3830 as shown in FIG. 38B. In Active-Matrix Panel 3810, the gate bus-line 3815 and source bus-line 3814 are used on a shared basis, but each microelectrode 3812 is individually addressable by selecting the appropriate two contact pads at the ends of the rows and columns as shown in FIG. 38B. The switching devices use transistors made of deposited thin films, which are therefore called thin-film transistors (TFTs) 3811. The TFT-array substrate contains the TFTs 3811, storage capacitors 3813, microelectrodes 3812, and interconnect wiring 3814 and 3815. A set of bonding pads are fabricated on each end of the gate bus-lines 3815 and data-signal bus-lines 3814 to attach Source Driver IC 3820 and Gate Driver IC. AM Controller 3830 using the data 3831 from System Control 3850 and to drive the TFT-array by a driving circuit unit consisting of a set of LCD driving IC (LDI) chips 3820 and 3825. DC power 3841 applied to DC/DC Converter 3840 which applies a positive pulse to a gate electrode through a gate bus-line 3815 to turn the TFT on. The storage capacitor is charged and the voltage level on the microelectrode 3812 rises to the voltage level applied to the source bus-line 3814. The main function of the storage capacitor 3813 is to maintain the voltage on the microelectrode until the next signal voltage is applied.

Figure 38C:
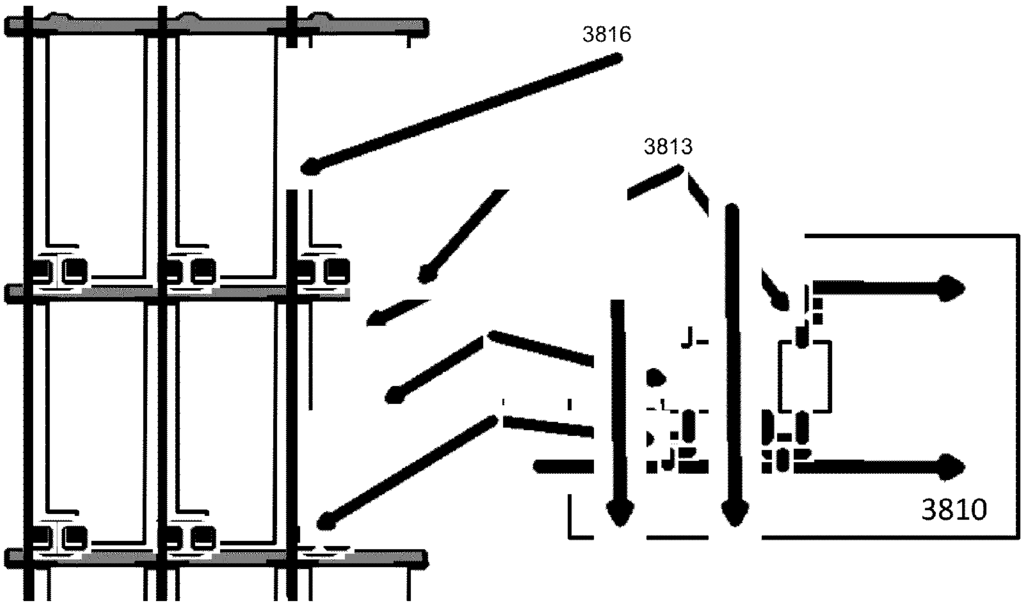
FIG. 38C is the top view of a TFT-array based microelectrode array.

In one embodiment, the top view of a TFT-array based microelectrode array is illustrated in FIG. 38C. Microelectrodes 3812, TFTs 3811, and storage capacitors 3813 are shown in a typical TFT LCD layout. In another embodiment, a hexagon TFT-array layout as shown in FIG. 4B is implemented to reduce the impact from the relatively big gaps 3816 among adjacent microelectrodes.

Figure 38D:
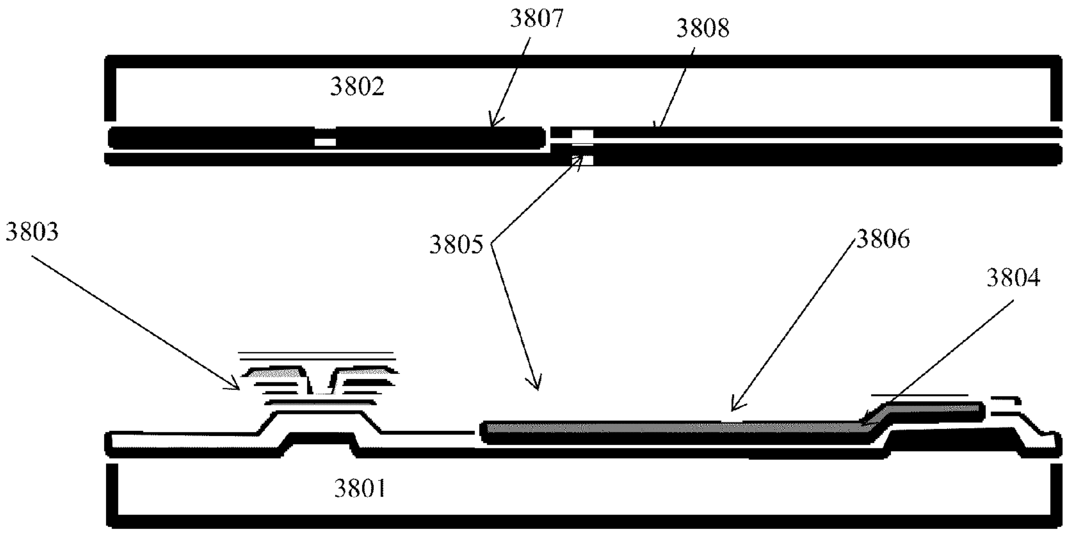
FIG. 38D is the illustration of the cross section view of FPLOC fabrication based on the TFT technology in a bi-planar structure.

In another embodiment, FPLOC fabrication based on the TFT technology is in a bi-planar structure as shown in FIG. 38D. TFT 3803 is fabricated on the glass substrate 3801 with microelectrode 3804 and a dielectric insulator 3806 coated with a hydrophobic film 3805 is added to decrease the wettability of the surface and to add capacitance between the droplet and the microelectrode. On the top plate 3802, besides the continuous ground electrode 3808 coated with a hydrophobic film 3805 a black matrix (BM) 3807 made of an opaque metal which shields the a-Si TFTs from stray light might be needed.

Figure 39A:
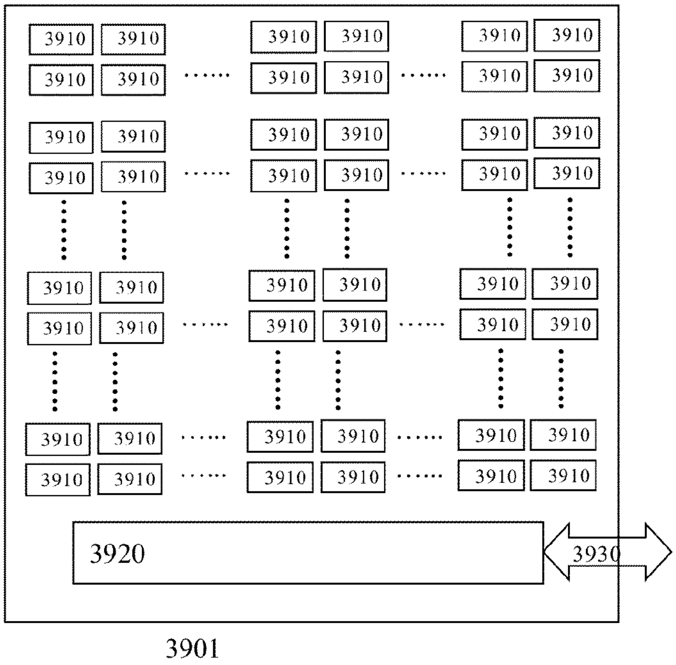
FIG. 39A shows a blank FPLOC before any programming or configuration.

Before any programming or configuration, a blank FPLOC will look like what shown in FIG. 39A. It has a matrix of FLBs (Fluidic Logic Blocks) 3910 and each FLB physically is a microelectrode which can be grouped together and activated simultaneously. Various embodiments of programming the blank FPLOC at least including: (1) Manual Bottom-up Programming Process and (2) Top-down Design Methodology.

Figure 39B:
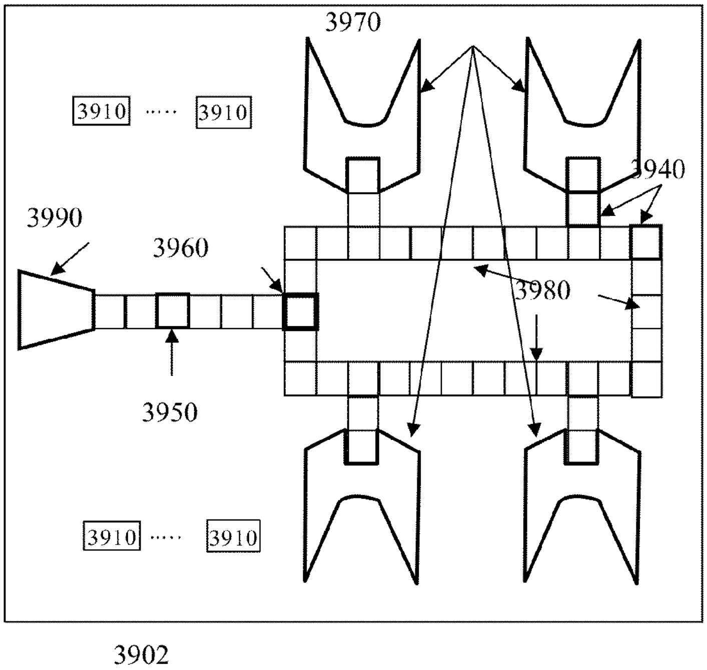
FIG. 39B illustrates an example of a configured-LOC design.

One embodiment of programming FPLOC by using Manual Bottom-up Programming Process is illustrated in FIGS. 39A and 39B. Before any programming or configuration, a blank FPLOC 3901 can be illustrated and shown in FIG. 39A. This blank FPLOC 3901 comprises the array of a plurality of FLBs 3910, the FPLOC System Control 3920, and the I/O Interface 3930. In one embodiment of the present invention, the number of I/O Interface 3930 can be singular or plural according to the design needs. In another embodiment, the location of placement of the I/O Interface 3930 and the FPLOC System Control 3920 can be placed under the array of FLBs 3910 or next to the array of FLBs 3910 on the same chip (as shown in FIG. 39A). The FPLOC System Control 3920 provides the system partition, configuration, control, management and other system related functions. The I/O Interface 3930 provides the functions of connection between FPLOC and external devices for programming the chip, displaying the test results, calibration, and data management. In another embodiment, the I/O Interface 3930 can also provide the connection to the printer, USB memory storage devices, or network interface. The I/O Interface 3930 also provides the passage for necessary power source to power the FPLOC. Manually, the first design step (or the lowest-level work) for the FPLOC is to do the field programming of physical locations, sizes, and shapes of all microfluidic components such as reservoirs, mixing areas, detection areas, and transportation paths and the overall layout of the FPLOC. FIG. 39B illustrates one embodiment that a blank FPLOC 3901 is programmed to implement a configured-LOC design 3902. This configured-LOC 3902 has microfluidic components including the electrodes 3940 and reservoirs 3970, the waste reservoir 3990, mixing chamber 3960, detection window 3950 and transportation path 3980 consist of electrodes that connect different areas of the FPLOC. After the layout design of the FPLOC, there are also some unused microelectrodes 3910 in FIG. 39B. The second step of designing a FPLOC is to define microfluidic operations for the chip. Basic fluidic operations include: the creation of droplet, transportation, cutting and mixing. There are more advanced fluidic operations can be done as discussed in previous sections based on Microelectrode Array Architecture. Designers of the FPLOC can choose to use the fundamental building blocks FLBs to build the entire FPLOC including the fluidic operations. But to bring the convenience to the designers and to be able to scale up the design of FPLOC, an application level representation for the microfluidic operations is highly desirable.

Figure 40:
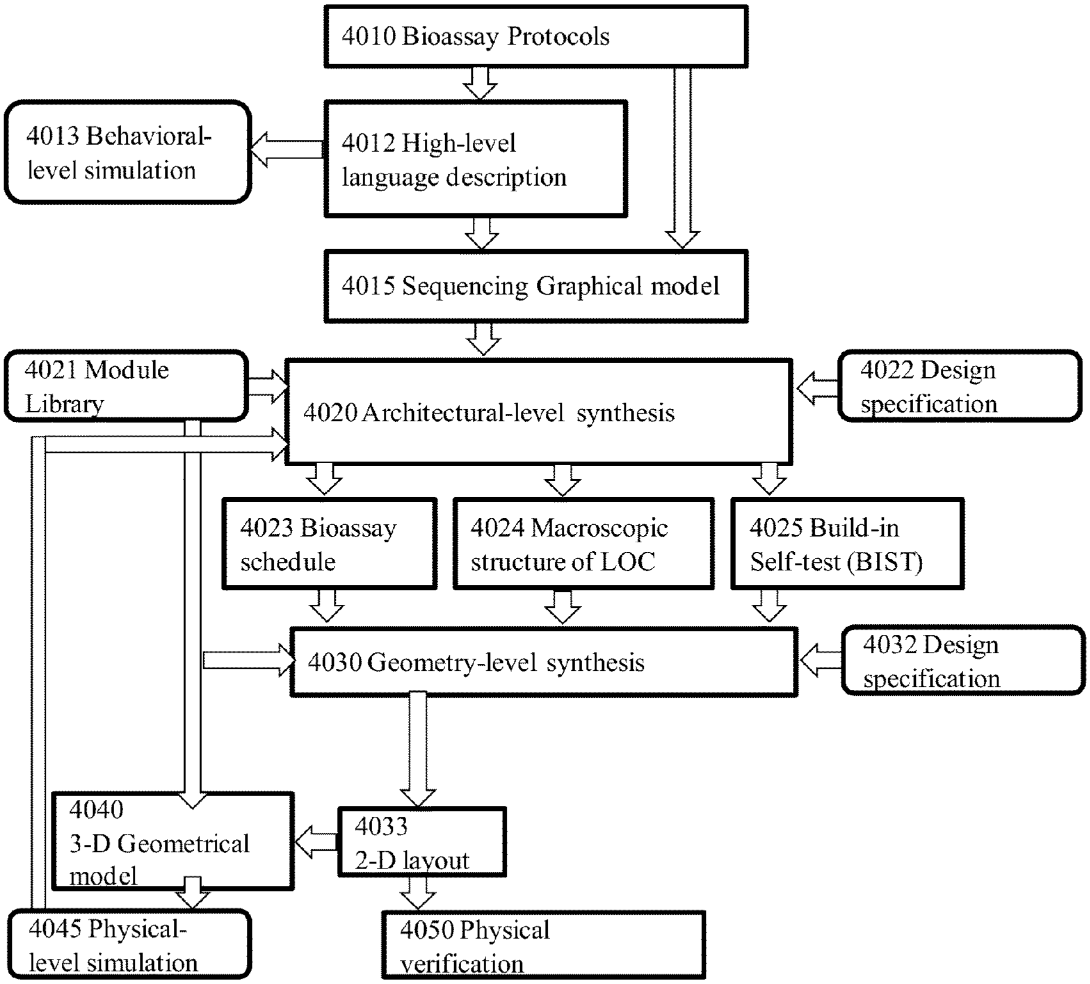
FIG. 40 is the illustration of the flow chart of a top-down design methodology for FPLOC design and programming.

FPLOC design and programming: In one embodiment, a top-down design methodology of FPLOC is illustrated in FIG. 40. The top-down design for FPLOC starts from the Bioassay Protocols 4010 provided by the biochip users. To define the behavior of the FPLOC, the user provides a hardware description language (HDL) as "High-level Language description" 4012 or a schematic design as "sequencing graph model" 4015. A "sequencing graph model" 4015 can be generated from "High-level Language description" 4012 to describe this assay protocol. This model can be used to perform "behavioral-level simulation" 4013 to verify the assay functionality at the high level. The HDL form is more suited to work with large structures because it's possible to just specify them numerically rather than having to draw every piece by hand. However, schematic entry can allow for easier visualization of a design. At this layer, application-level functions and the purposes of the LOCs are defined. Next, "Architectural-level Synthesis" 4020 is used to generate detailed implementations from the sequencing graph model. A "microfluidic module library" 4021 and "Design Specification" 4022 are also provided as an input of the synthesis procedure. This module library, analogous to a standard cell library used in cell-based VLSI design, includes different microfluidic functional modules, such as mixers and storage units. Compact models are used to different microfluidic functional modules and parameters such as width, length and operation duration through device simulations or laboratory experiments. In addition, some design specifications are also given a priori, for example, an upper limit on the completion time, an upper limit on the size of chip footprint, and the set of non-reconfigurable resources such as on-chip reservoirs/dispensing ports and integrated optical detectors. The output of the synthesis process 4020 includes a mapping of assay operation to on-chip resources 4024, a schedule for the assay operations 4023, and Build-in Self-test (BIST) 4025. Then the geometry level synthesis 4030 takes place with input of Design specification on geometry-level 4032. The synthesis procedure attempts to find a desirable design point that satisfies the input specifications and also optimizes some figures of merit, such as performance and area. After synthesis, the 2-D physical design 4033 of the biochip (i.e., module placement and routing) can be coupled with detailed physical information from the module library (associated with some fabrication technology) to obtain a 3-D geometrical model 4040. This model can be used to perform physical-level simulation 4045 and design verification 4050 at a low level. After physical verification, the FPLOC design can be loaded into the blank FPLOC.

Going from schematic/HDL source files to actual FPLOC configuration: In one embodiment, the source files are fed to a software suite for the FPLOC design that through different steps will produce a file. This file is then transferred to the FPLOC via a serial interface (JTAG) or to an external memory device like an EEPROM.

The most common HDLs are VHDL and Verilog, although in an attempt to reduce the complexity of designing in HDLs, which have been compared to the equivalent of assembly languages, there are moves to raise the abstraction level through the introduction of alternative languages. Graphical programming language such as National Instrument's LabVIEW can be leveraged to have an FPLOC add-in module available to target and program FPLOC hardware. The Graphical programming language approach drastically simplifies the FPLOC programming process.

In yet another embodiment, to simplify the design of complex systems in FPLOCs, libraries of predefined complex functions that have been tested and optimized can be used to speed up the FPLOC design process. These predefined microfluidic libraries can be an advanced microfluidic operations such as "diagonal cutting" or "Display "OK" at x:y". In a typical design flow, an FPLOC application developer will simulate the design at multiple stages throughout the design process. Initially the description in VHDL or Verilog is simulated by creating test benches to simulate the system and observe results. Then, after the synthesis engine has mapped the design to a netlist, the netlist is translated to a gate level description where simulation is repeated to confirm the synthesis proceeded without errors. Finally the design is laid out in the FPLOC at which point propagation delays can be added and overall system simulations run again with these values back-annotated onto the netlist.

Figure 41A:
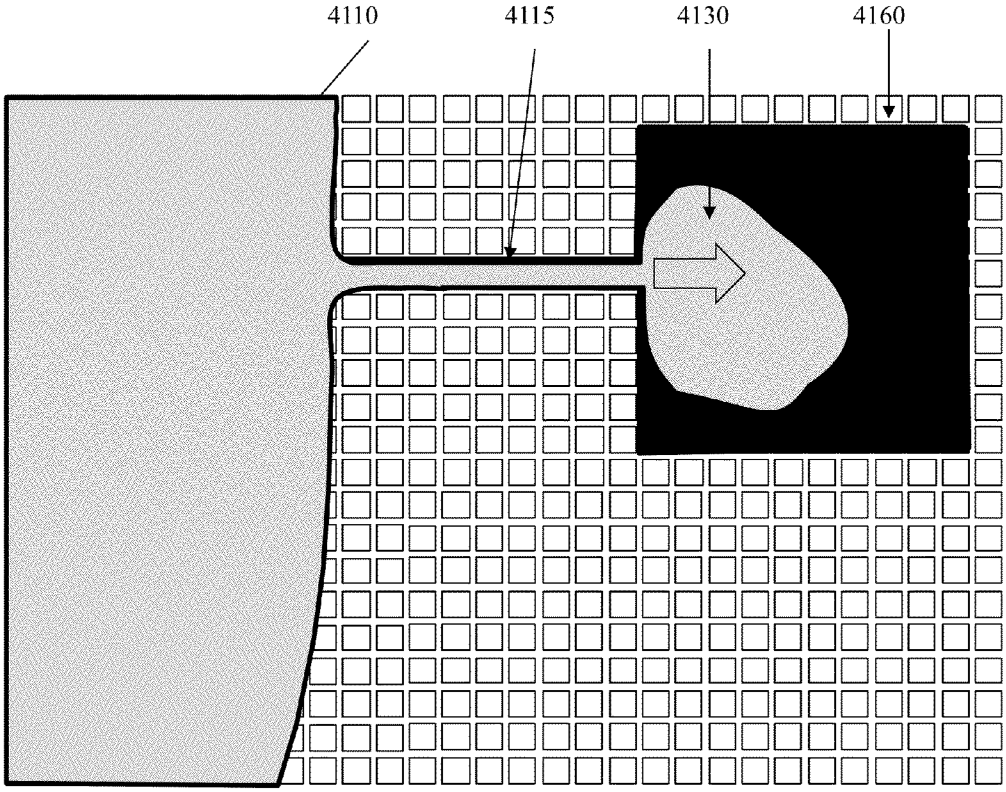
FIGS. 41A, 41B and 41C are illustrations of the creation of liquids by continuous-flow actuations.
Figure 41B:
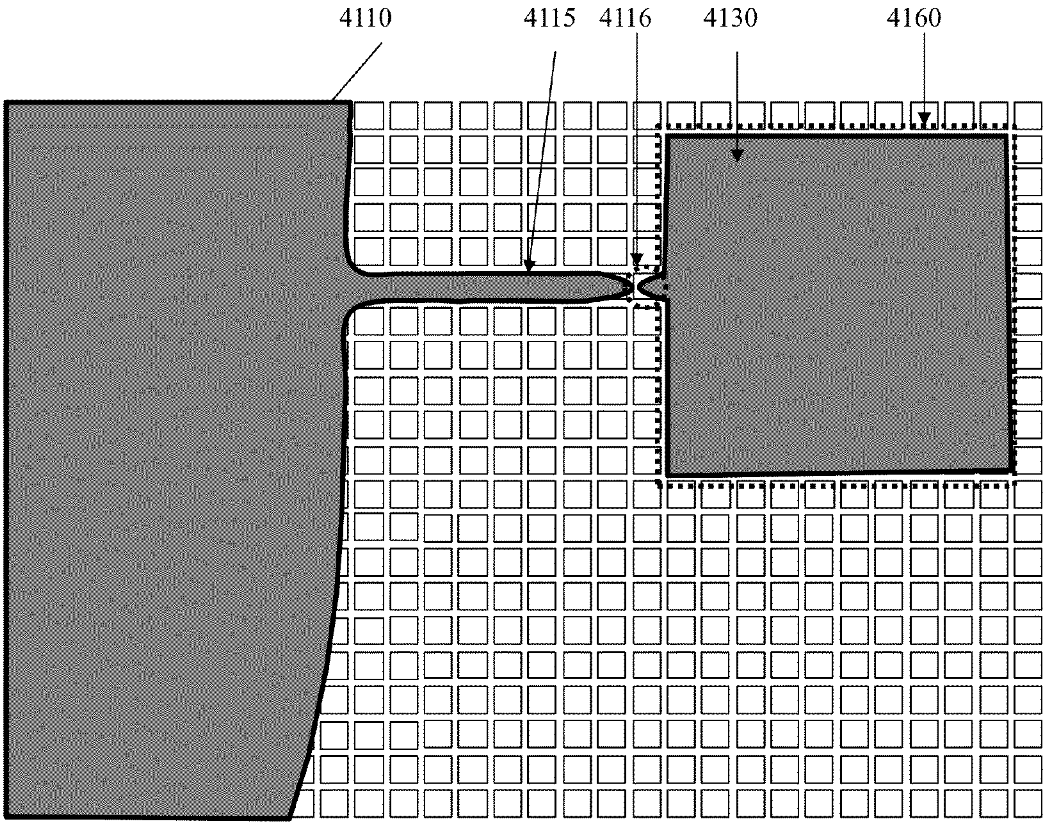
Figure 41C:
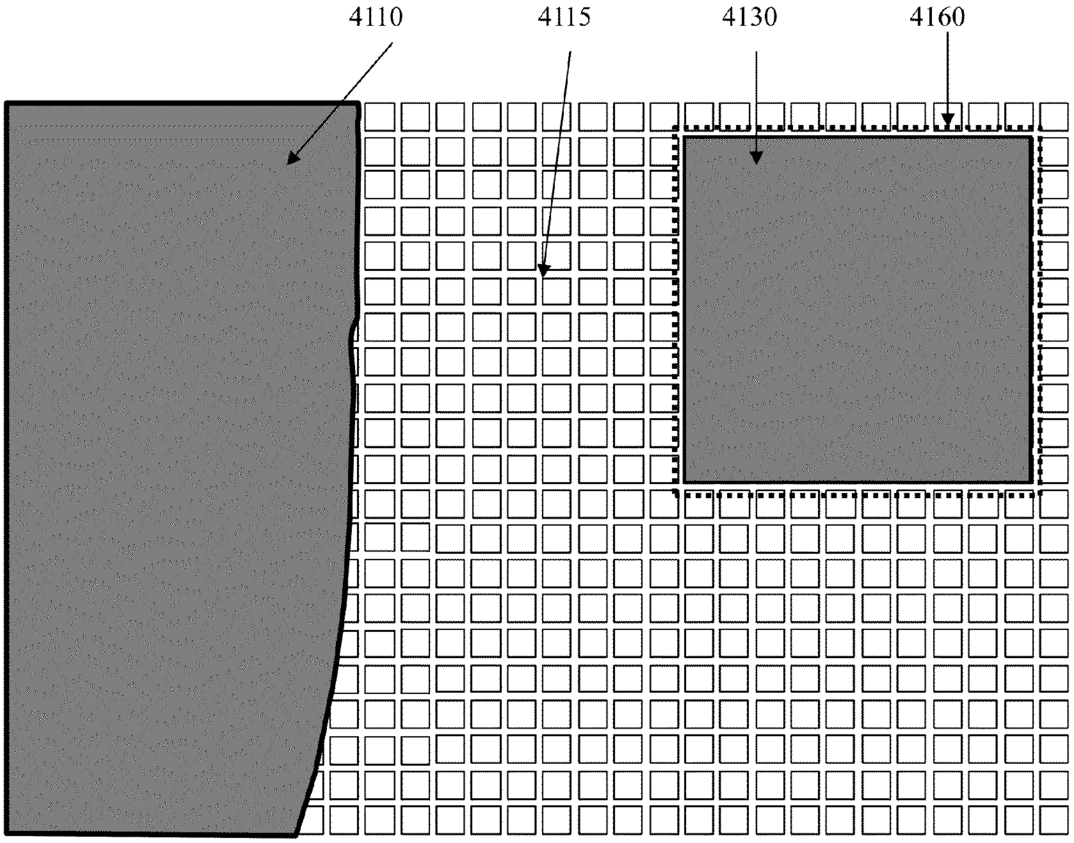

In various embodiments, EWOD Microelectrode Array Architecture can perform continuous-flow microfluidic operations instead of droplet-based microfluidic operations. Continuous microfluidic operations provide very simple in control but very effective way of doing microfluidic operations. FIGS. 41A-C illustrate the creation of a certain volume of liquid 4130 from the reservoir 4110. As shown in FIG.

41A, a small line of microelectrodes formed a bridge 4115 between the targeted configured-electrode 4160 and the reservoir 4110. When the bridge 4115 and the targeted configured-electrode 4160 are activated that causes a liquid flow from the reservoir into the targeted configured-electrode 4160. 4130 indicates the liquid flows from the bridge into the configured-electrode 4160. The bridge here is a single line of microelectrodes. This bridge configuration has the characteristics of both continuous-flow and droplet-based systems. It has all the benefits of a channel that once the bridge configured-electrode is activated the liquid will flow through it without extra controls and concerns on the activating timing and speeds. But it also has all the advantages of droplet-based system that once the bridge 4115 is deactivated all liquid will be pulled back to either the reservoir or the targeted configured-electrode 4160 and it has no dead-volume in the channel. Once the targeted configured-electrode 4160 is filled up then deactivated the bridge 4115 to cut the liquid 4130 from the reservoir 4110 as shown in FIG. 41B. The liquid fill-up of the configured-electrode 4160 is automatic that once all microelectrodes of the bridge and the configured-electrode are filled up with liquid then the liquid flow from the reservoir 4110 will stop, so the timing control of the procedure is not critical. The creation of liquid 4130 can be precisely controlled by activating the appropriate microelectrodes 4160 and the breaking point of the bridge. As shown in FIG. 41B, liquid 4130 is breaking out from the reservoir 4110 by deactivating microelectrode 4116 first then the bridge is deactivated. This procedure will make sure most of the liquid formed the bridge will be pull back to the reservoir 4110 and the liquid 4130 will be precisely controlled by the number of microelectrodes of the configured-electrode 4160. In FIG. 41B, the configured-electrode 4160 is composed of 10×10 microelectrodes. Other sizes and shapes of the configured-electrodes can be defined to create different liquid sizes and shapes. FIG. 41C shows the disappearing of the liquid bridge and the liquid 4130 is created by activating reservoir 4110 and the configured-electrode 4160.

Figure 41D:
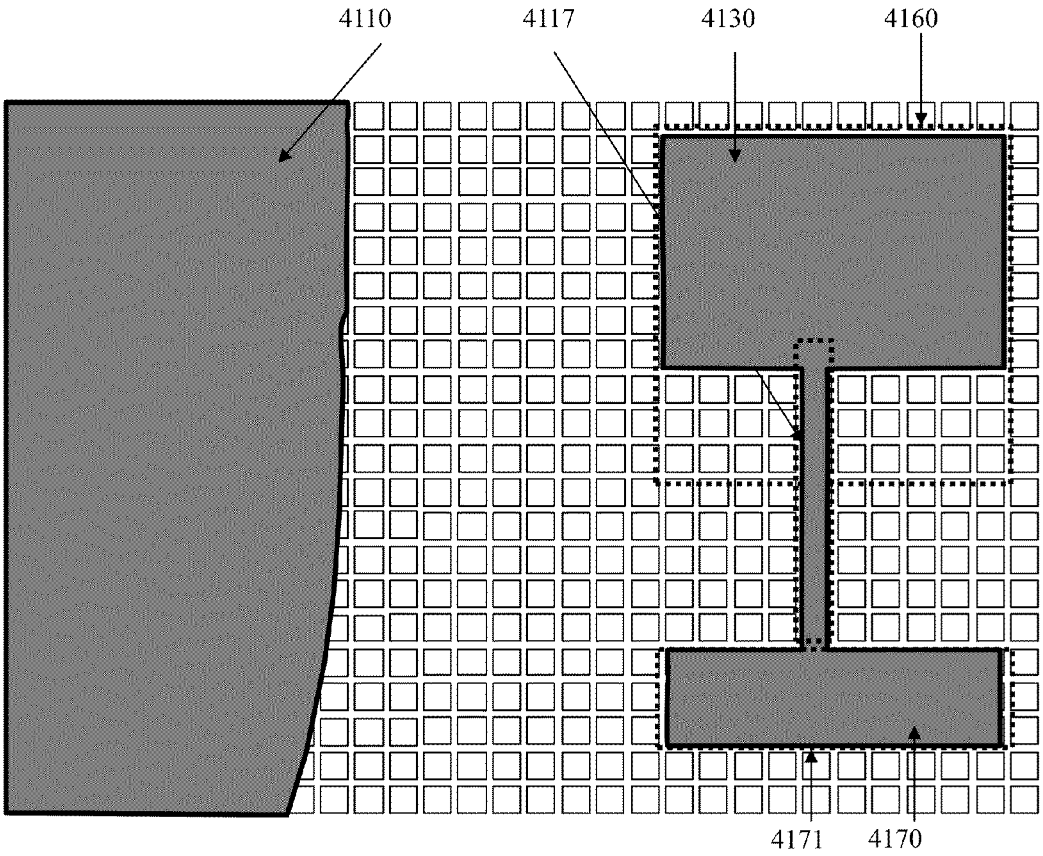
FIGS. 41D and 41E are illustrations of the cutting of liquid by continuous-flow actuations.
Figure 41E:
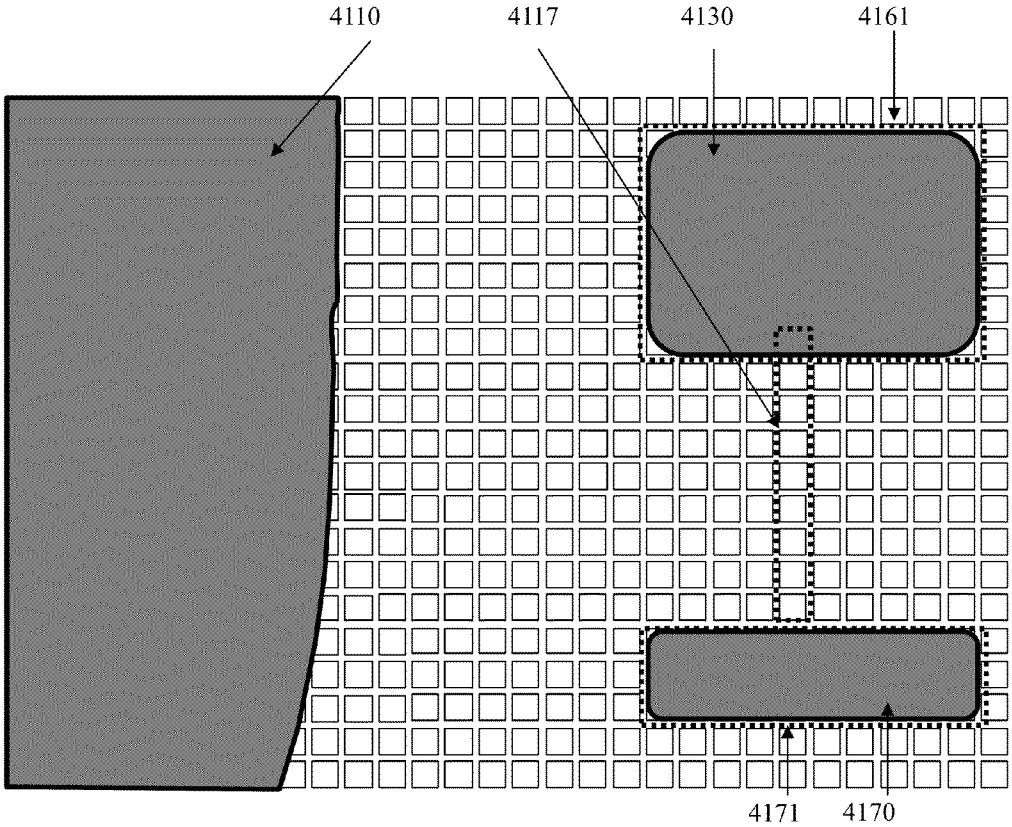

In one embodiment, the same creating procedure of liquid can be used to perform the cutting of the liquid into two sub-liquids as illustrated in FIG. 41D. After deactivating configured-electrode 4160, configured-bridge-electrode 4117 and targeted configured-electrode 4171 are activated and liquid flows from the bridge into the area of 4170. Deactivating the configured-bridge-electrode 4117, then activating configured-electrodes 4161 and 4171 breaks up and forms the two sub-liquids 4170 and 4130 as illustrated in FIG. 41E. This cutting process can generate the two sub-liquids in different sizes as long as the size of the configured-electrodes 4161 and 4171 are pre-calculated to the desired sizes.

Figure 42A:
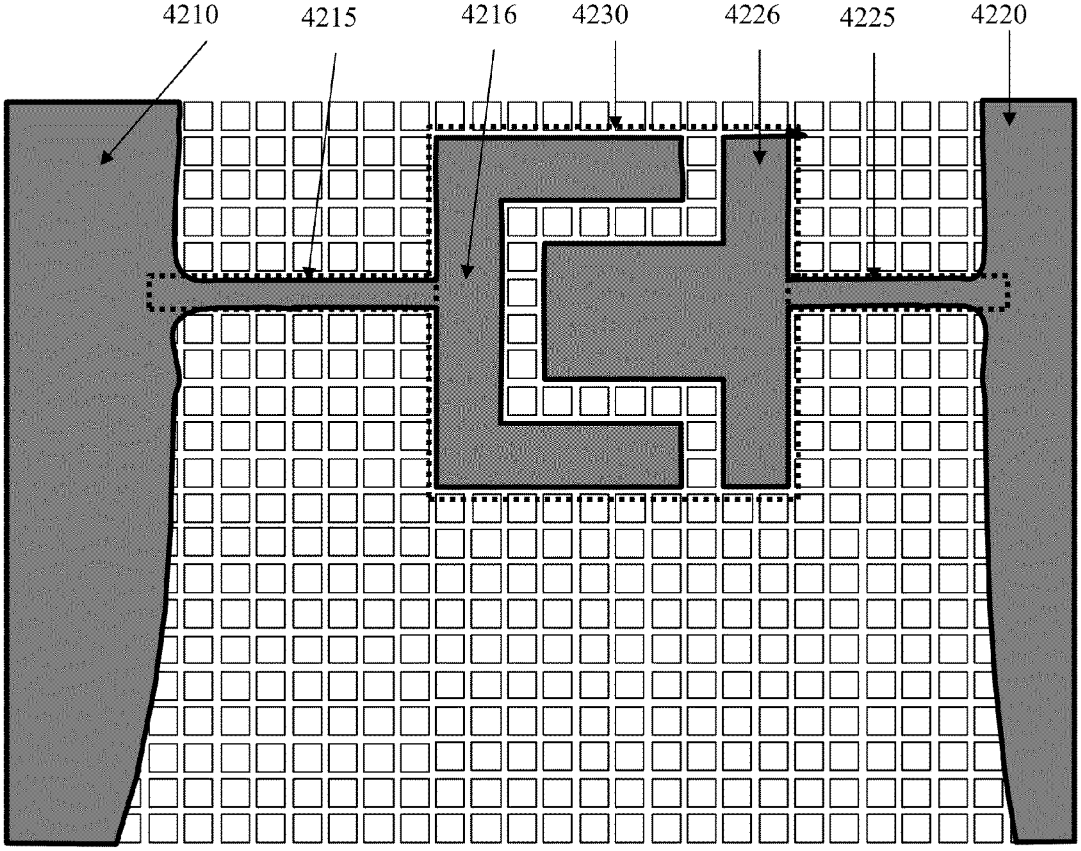
FIGS. 42A, 42B and 42C are illustrations of the merge/mixing of liquids by continuous-flow actuations.
Figure 42B:
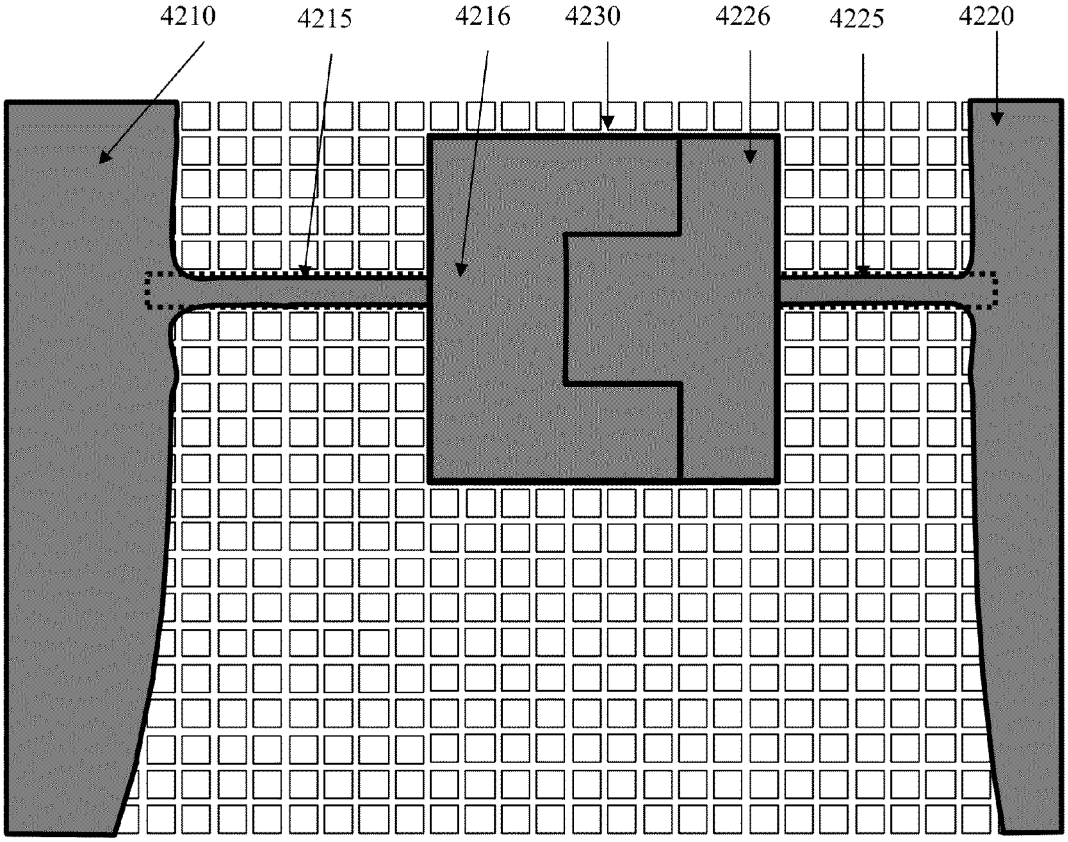
Figure 42C:
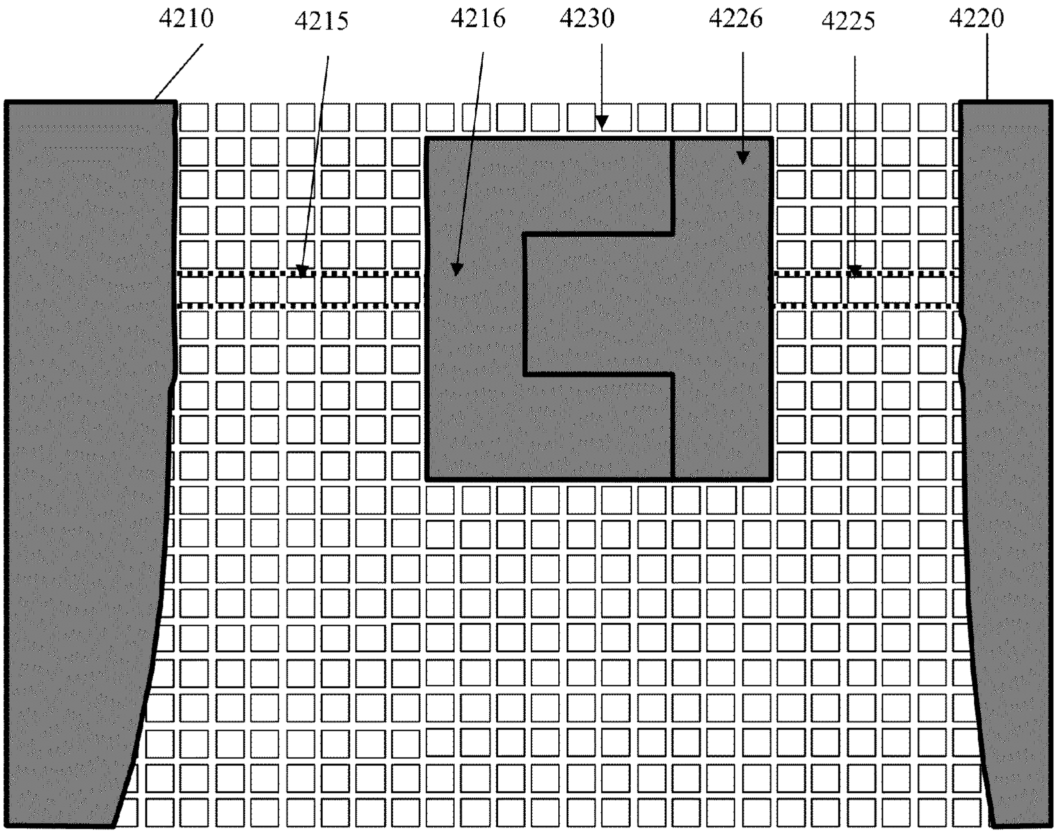

In another embodiment, FIGS. 42A-C illustrate the mixing procedure by the continuous-flow microfluidic operations. FIG. 42A shows the activating of bridges 4215 and 4225 and the activating of configured-electrodes 4216 and 4226, liquids are flowing from reservoirs 4210 and 4220 through the bridges into the mixing chamber 4230. Here liquids associate with configured-electrodes 4216 and 4226 are in de-formed shapes for better mixing and also liquids also are in different size for a ratio mixing. Gap is between configured-electrodes 4216 and 4226 to prevent the premature mixing. Once the liquid fill up both configured-electrodes 4216 and 4226, then configured-electrode 4230 (10×10-microelectrodes) is activated and the two liquid will be mixed as indicated in FIG. 42B. Then two bridge-electrodes are deactivated as illustrated in FIG. 42C.

In this simple mixing microfluidic operations, actually all fundamental microfluidic operations are demonstrated: (1) Creating: liquids 4216 and 4226 are created from reservoirs 4210 and 4220 in a precise way, (2) Cutting: liquid 4216 is cut off from liquid 4210 and liquid 4226 is cut from liquid 4220, (3) Transporting: Bridges 4215 and 4225 transport liquids to the mixing chamber, and (4) Mixing: liquid 4216 and 4226 are mixed at 4230. It's very obvious that this continuous-flow technique not only can be used to perform all microfluidic operations but also in a more precise way because the resolution of the precision is depend on the small microelectrode.

Although the present invention has been described with reference to preferred embodiments, persons skilled in the art will recognize that changes may be made in form and detail without departing from the spirit and scope of the invention.

What is claimed is:

1. A device of field-programmable lab-on-a-chip (FPLOC) by employing the microelectrode array architecture comprising: a. a bottom plate comprising an array of multiple microelectrodes disposed on a top surface of a substrate covered by a dielectric layer; wherein each of the microelectrode is coupled to at least one grounding elements of a grounding mechanism, wherein a hydrophobic layer is disposed on the top of the dielectric layer and the grounding elements to make hydrophobic surfaces with droplets; b. a field programmability mechanism for programming a group of configured-electrodes to generate microfluidic components and layouts with selected shapes and sizes; and c. a FPLOC functional block, comprising: i. I/O ports; ii. a sample preparation unit; iii. a droplet manipulation unit; iv. a detection unit; v. a system control unit comprising: a. a hierarchical FPLOC chip-level module comprising: i. a field-programming management unit for configuring the microelectrodes into microfluidic components and layout/networks for the microfluidic components; ii. a microfluidic operations programming management unit for controlling and managing microfluidic operations; and b. an application system management module comprising: i. a system partition and integration unit for partitioning the device; ii. a detection and display unit for obtaining, displaying, reporting and storing assay results; iii. a data management and transfer unit for connecting to the device to external information system; iv. a peripheral management block for connecting to external systems.

2. The device of claim 1, wherein the configured-electrodes in the field programmability mechanism comprising: a first configured-electrode comprising multiple microelectrodes arranged in array, and at least one second adjacent configured-electrode adjacent to the first configured-electrode, the droplet being disposed on the top of the first configured-electrode and overlapped with a portion of the second adjacent-configured-electrode.

3. The device of claim 2, wherein the configured-electrodes comprise at least one microelectrode.

4. The device of claim 3, wherein the microfluidic components of the group of configured-electrodes in the field programmability mechanism comprise reservoirs, electrodes, mixing chambers, detection windows, waste reservoirs, droplet pathways and special functional electrodes.

5. The device of claim 4, wherein the layout of the microfluidic components comprises the physical allocations of input/output ports, reservoirs, electrodes, mixing chambers, detection windows, waste reservoirs, pathways and electrode networks.

6. The device of claim 5 wherein the reservoir is loaded with liquid.

7. The device of claim 1 wherein the grounding mechanism is fabricated on the top plate of a bi-planar structure wherein the top plate is above the bottom plate with a gap in-between.

8. The method of claim 1, wherein the grounding mechanism is a coplanar structure comprises a passive top cover or without a top cover.

9. The device of claim 1, wherein the grounding mechanism is a coplanar structure comprising ground grids.

10. The device of claim 1, wherein the grounding mechanism is a coplanar structure comprising ground pads.

11. The device of claim 1, wherein the grounding mechanism is a coplanar structure comprising programmed ground pads.

12. The device of claim 1, wherein the grounding mechanism is a hybrid structure, a combination of the bi-planar structure and the coplanar structure with a selectable switch.

13. The device of claim 1, wherein the microelectrode can be generally round, square, hexagon bee-hive, or stacked-brick shapes arranged in array.

14. The device of claim 1, wherein the I/O ports comprise: a. a droplet I/O port unit; b. a detection I/O port unit; and c. a system control I/O port unit.

15. The device of claim 14, wherein the droplet I/O port unit in the I/O ports comprises: a. a sample I/O port unit for loading the samples; b. a reagent I/O port unit for interfacing the reagent cartridges; and c. a waste I/O port unit for flushing out the waste.

16. The device of claim 14, wherein the detection I/O port unit is connected with the video detection, Laser induced fluorescence analysis (LIF), and magnetic nanoparticle detection.

17. The device of claim 14, wherein the system control I/O port unit is connected to the external units including processors, display units, printers, USB memory storages, network interfaces, power sources.

18. The device of claim 1, wherein a micro-heating element integrated into the substrate of the device can heat up the droplet under selected temperature.

19. The device of claim 1, wherein the detection unit in the FPLOC functional block comprises the sensing devices integrated in the substrate, comprising a potentiometric sensor, an amperometric sensor, or an impedimetric sensor.

20. The device of claim 1 can be configured to tabletop machine configurations.

21. The device of claim 1 can be configured to portable machine configurations.

22. The device of claim 1 is an EWOD device wherein the driving voltage is in the range from DC to 10 kHz of AC with less than 150V.

23. The device of claim 1 is a DEP device wherein the driving voltage is in the range from 50 kHz to 200 kHz of AC with 100 to 300 Vrms.

* * * * *